US012809564B2

(12) United States Patent
Matsumoto et al.

(10) Patent No.: US 12,809,564 B2
(45) Date of Patent: Nov. 24, 2026

(54) TECHNIQUE FOR DIAGNOSING COMPONENT USED IN IMAGE FORMING APPARATUS

(71) Applicant: CANON KABUSHIKI KAISHA, Tokyo (JP)

(72) Inventors: Yasuhisa Matsumoto, Shizuoka (JP); Masaki Kobayashi, Shizuoka (JP); Kaoru Tsunoda, Shizuoka (JP); Yuki Sugiyama, Shizuoka (JP); Daisuke Momiyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 513 days.

(21) Appl. No.: 18/446,675

(22) Filed: Aug. 9, 2023

(65) Prior Publication Data

US 2024/0053937 A1 Feb. 15, 2024

(30) Foreign Application Priority Data

Aug. 12, 2022 (JP) ................................ 2022-129000
Aug. 12, 2022 (JP) ................................ 2022-129001

(51) Int. Cl.
*G06F 11/07* (2006.01)
*G06F 3/12* (2006.01)

(52) U.S. Cl.
CPC ............ *G06F 3/1234* (2013.01); *G06F 3/121* (2013.01)

(58) Field of Classification Search
CPC .. G06F 3/1234; G06F 3/1235; G06F 11/3051; G06F 11/3055; G06F 11/321; G06F 11/324
USPC .......... 358/1.15, 1.14; 399/9, 10, 18, 19, 21, 399/24, 31, 33, 34
See application file for complete search history.

(56) References Cited

U.S. PATENT DOCUMENTS

2011/0026067 A1* 2/2011 Hamaguchi .......... B41J 13/0009 358/1.14
2013/0195474 A1* 8/2013 Miyamoto ............. G03G 15/70 399/21
2020/0257586 A1* 8/2020 Kobayashi .......... G06F 11/0793

FOREIGN PATENT DOCUMENTS

JP 2003043867 A * 2/2003
JP 2003167396 A 6/2003
JP 2004-086033 A 3/2004
JP 2006092183 A 4/2006
(Continued)

OTHER PUBLICATIONS

Japanese Office Action dated Jun. 5, 2026 in counterpart Japanese Patent Appln. No. 2022-129001.
(Continued)

*Primary Examiner* — Jamares Q Washington
(74) *Attorney, Agent, or Firm* — Venable LLP

(57) ABSTRACT

An image forming system includes one or more server computers, an image forming apparatus, and a client computer. The one or more server computers obtain state information indicating an operating state of the image forming apparatus, execute a first analysis on the state information, and determine countermeasure content to be applied to the image forming apparatus based on at least an analysis result of the first analysis, and determine the image forming apparatus or the client computer as a notification destination of the countermeasure content. The image forming apparatus or the client computer determined as the notification destination receives the countermeasure content; and applies the countermeasure content.

16 Claims, 38 Drawing Sheets

(56) References Cited

FOREIGN PATENT DOCUMENTS

| | | | | |
|---|---|---|---|---|
| JP | 2008-003495 | A | | 1/2008 |
| JP | 2008227914 | A | * | 9/2008 |
| JP | 2015-187822 | A | | 10/2015 |
| JP | 2016185831 | A | * | 10/2016 |
| JP | 2017-076331 | A | | 4/2017 |
| JP | 6313658 | B2 | * | 4/2018 |
| JP | 2018140867 | A | | 9/2018 |
| JP | 6398959 | B2 | * | 10/2018 |
| JP | 6566913 | B2 | | 8/2019 |
| JP | 2021-071657 | A | | 5/2021 |
| JP | 2022122454 | A | * | 8/2022 |

OTHER PUBLICATIONS

Japanese Office Action dated May 29, 2026 in counterpart Japanese Patent Appln. No. 2022-129000.

* cited by examiner

FIG. 6A

| FEED DATE/TIME | FEED TIME(ms) |
|---|---|
| 2021/1/1 10:00:01 | 1438 |
| 2021/1/1 10:00:04 | 1437 |
| 2021/1/1 10:00:07 | 1405 |
| 2021/1/1 10:00:10 | -1 |
| 2021/1/1 10:00:13 | 1414 |
| ... | ... |
| 2021/5/24 21:05:30 | 1856 |
| 2021/5/25 21:16:50 | 1405 |
| 2021/5/25 21:16:53 | 1398 |

FIG. 6B

| COMMAND | DETERMINATION CONDITION |
|---|---|
| DEACTIVATE RETRY | IF LEADING EDGE OF SHEET HAS NOT BEEN DETECTED WITHIN PREDETERMINED PERIOD OF TIME FROM STARTING FEED OPERATION, JAM IS DETERMINED TO HAVE OCCURRED AND FEED OPERATION IS STOPPED. |
| ACTIVATE RETRY | IF LEADING EDGE OF SHEET HAS NOT BEEN DETECTED WITHIN PREDETERMINED PERIOD OF TIME FROM STARTING FEED OPERATION, FEED OPERATION WILL BE REDONE (RETRY). IF LEADING EDGE OF SHEET HAS NOT BEEN DETECTED WITHIN PREDETERMINED PERIOD OF TIME EVEN IF FEED OPERATION WILL BE REDONE, JAM IS DETERMINED TO HAVE OCCURRED AND FEED OPERATION IS STOPPED. |

FIG. 6C

| VARIANCE OF FEED TIME V | ANALYSIS RESULT |
|---|---|
| NOT CALCULATED | UNKNOWN |
| $V<240$ | VERY GOOD |
| $240 \leq V<280$ | GOOD |
| $280 \leq V<320$ | POOR |
| $320 \leq V$ | VERY POOR |

FIG. 7

| FEED STATE | OCCURRENCE | COUNTERMEASURE CONTENT | NOTIFICATION DESTINATION |
|---|---|---|---|
| UNKNOWN | ANY | NONE | NONE |
| VERY GOOD; GOOD | ANY | DEACTIVATE RETRY | PRINTER |
| POOR | J<0.01% | ACTIVATE RETRY | PRINTER |
| | 0.01%≤J | REPLACEMENT PREPARATION DISPLAY | MONITORING TOOL |
| VERY POOR | ANY | REPLACEMENT REQUIRED DISPLAY | MONITORING TOOL |

FIG. 12A

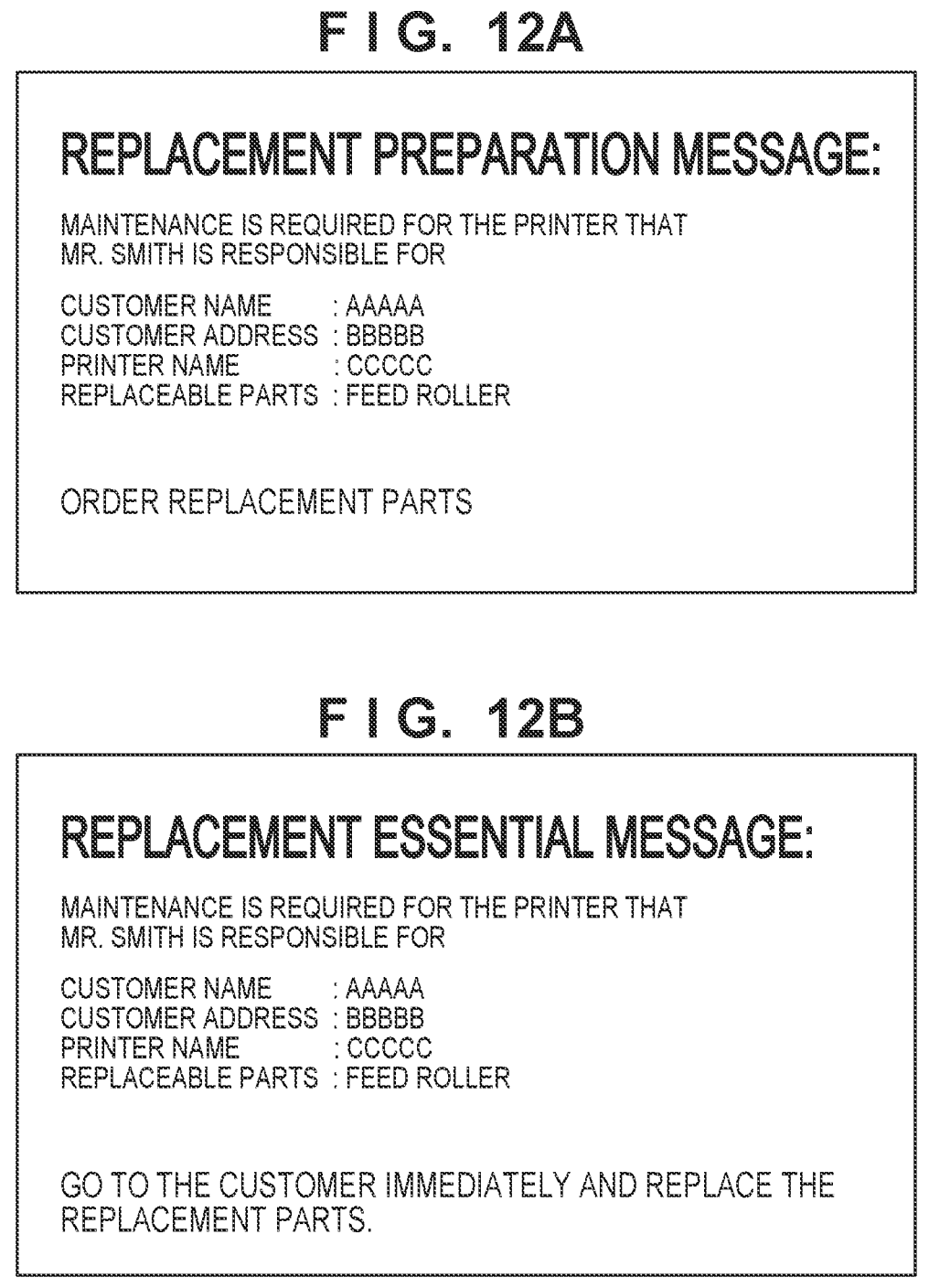

REPLACEMENT PREPARATION MESSAGE:

MAINTENANCE IS REQUIRED FOR THE PRINTER THAT MR. SMITH IS RESPONSIBLE FOR

CUSTOMER NAME : AAAAA
CUSTOMER ADDRESS : BBBBB
PRINTER NAME : CCCCC
REPLACEABLE PARTS : FEED ROLLER

ORDER REPLACEMENT PARTS

FIG. 12B

REPLACEMENT ESSENTIAL MESSAGE:

MAINTENANCE IS REQUIRED FOR THE PRINTER THAT MR. SMITH IS RESPONSIBLE FOR

CUSTOMER NAME : AAAAA
CUSTOMER ADDRESS : BBBBB
PRINTER NAME : CCCCC
REPLACEABLE PARTS : FEED ROLLER

GO TO THE CUSTOMER IMMEDIATELY AND REPLACE THE REPLACEMENT PARTS.

FIG. 14

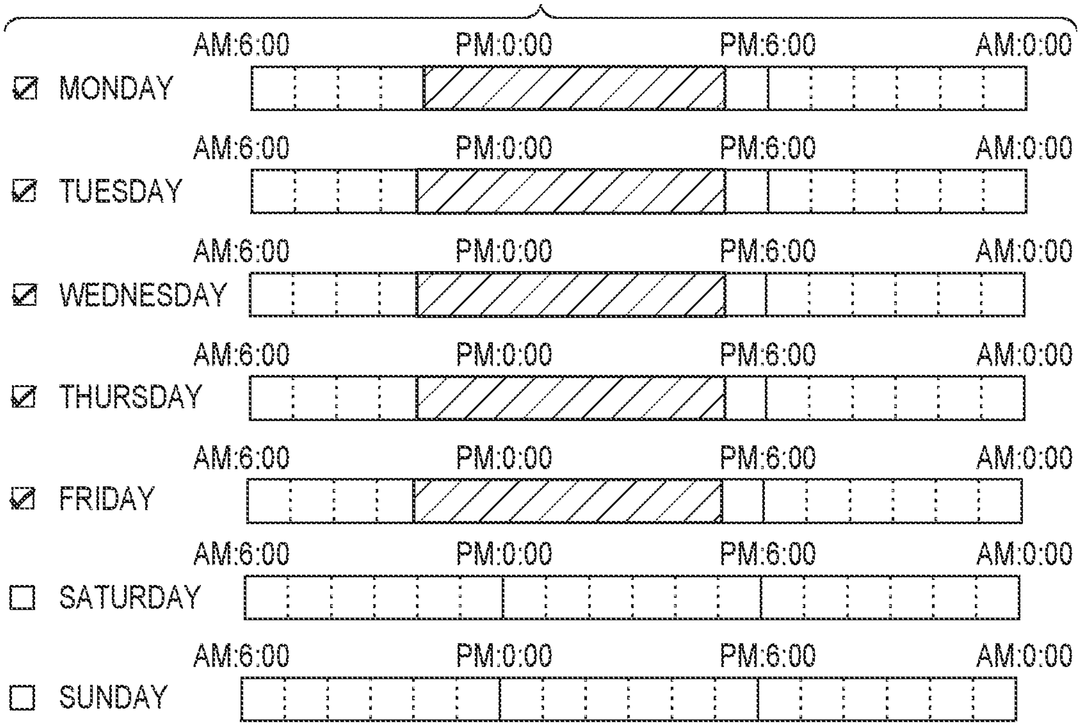

FIG. 15

| STATE OF MAINTENANCE PERSON | FEED STATE | COUNTERMEASURE CONTENT | NOTIFICATION DESTINATION |
|---|---|---|---|
| ABLE TO BE DISPATCHED | UNKNOWN | NONE | NONE |
| | VERY GOOD; GOOD | NONE | NONE |
| | POOR | REPLACEMENT PREPARATION DISPLAY | MONITORING TOOL |
| | VERY POOR | REPLACEMENT REQUIRED DISPLAY | MONITORING TOOL |
| UNABLE TO BE DISPATCHED | UNKNOWN | NONE | NONE |
| | VERY GOOD; GOOD | NONE | NONE |
| | POOR | ACTIVATE RETRY | PRINTER |
| | VERY POOR | ACTIVATE RETRY | PRINTER |

FIG. 27A

531

| DATE/TIME | TYPE CODE | FEED TIME(ms) |
|---|---|---|
| 2023/1/1 10:00:01 | 0 | 1402 |
| 2023/1/1 10:00:04 | 0 | 1423 |
| 2023/1/1 10:00:07 | 0 | 1432 |
| 2023/1/1 10:00:10 | 0 | 1440 |
| 2023/1/1 10:00:13 | 0 | 1391 |
| ... | ... | ... |
| 2023/1/1 10:12:11 | 1 | – |
| 2023/1/1 10:13:22 | 0 | 1391 |
| 2023/1/1 10:13:25 | 0 | 1436 |
| 2023/1/1 10:13:28 | 0 | 1546 |
| 2023/1/1 10:13:31 | 0 | 1622 |
| 2023/1/1 10:13:34 | 0 | 1702 |
| 2023/1/1 10:13:37 | 0 | -1 |
| 2023/1/1 10:16:21 | 1 | – |
| 2023/1/1 10:17:02 | 0 | 1691 |
| 2023/1/1 10:17:05 | 0 | 1480 |

FIG. 27B

533

| DIFFERENCE OF STATISTICAL VALUE Di | ANALYSIS RESULT |
|---|---|
| NOT CALCULATED | UNKNOWN |
| -50<Di<+50 | NO CHANGE |
| +50=<Di | INSTALLATION POSITION IS INAPPROPRIATE |
| Di=<-50 | IMPROVED |

FIG. 28A

532

| DATE/TIME | NOTIFICATION DESTINATION | COUNTERMEASURE CONTENT |
|---|---|---|
| 2023/1/1 10:00:01 | PRINTER | INSTRUCTION TO MODIFY INSTALLATION POSITION OF REGULATION PLATE |
| 2023/1/1 10:00:04 | PRINTER | INSTRUCTION TO MODIFY INSTALLATION POSITION OF REGULATION PLATE |
| 2023/1/1 10:00:07 | PRINTER | INSTRUCTION TO MODIFY INSTALLATION POSITION OF REGULATION PLATE |
| 2023/1/1 10:00:10 | MONITORING TOOL | INSTRUCTION TO MODIFY INSTALLATION POSITION OF REGULATION PLATE |

FIG. 28B

534

| ANALYSIS RESULT OF STATE | NOTIFICATION FREQUENCY N | COUNTERMEASURE CONTENT | NOTIFICATION DESTINATION |
|---|---|---|---|
| UNKNOWN | – | NONE | NONE |
| NO CHANGE | N=0 | NONE | NONE |
| INAPPROPRIATE | N=0 | INSTRUCTION TO MODIFY INSTALLATION POSITION OF REGULATION PLATE | PRINTER |
| NO CHANGE | 1=<N<3 | INSTRUCTION TO MODIFY INSTALLATION POSITION OF REGULATION PLATE | PRINTER |
| NO CHANGE | 3=<N | INSTRUCTION TO MODIFY INSTALLATION POSITION OF REGULATION PLATE | MONITORING TOOL |
| IMPROVED | – | NONE | NONE |

FIG. 29A

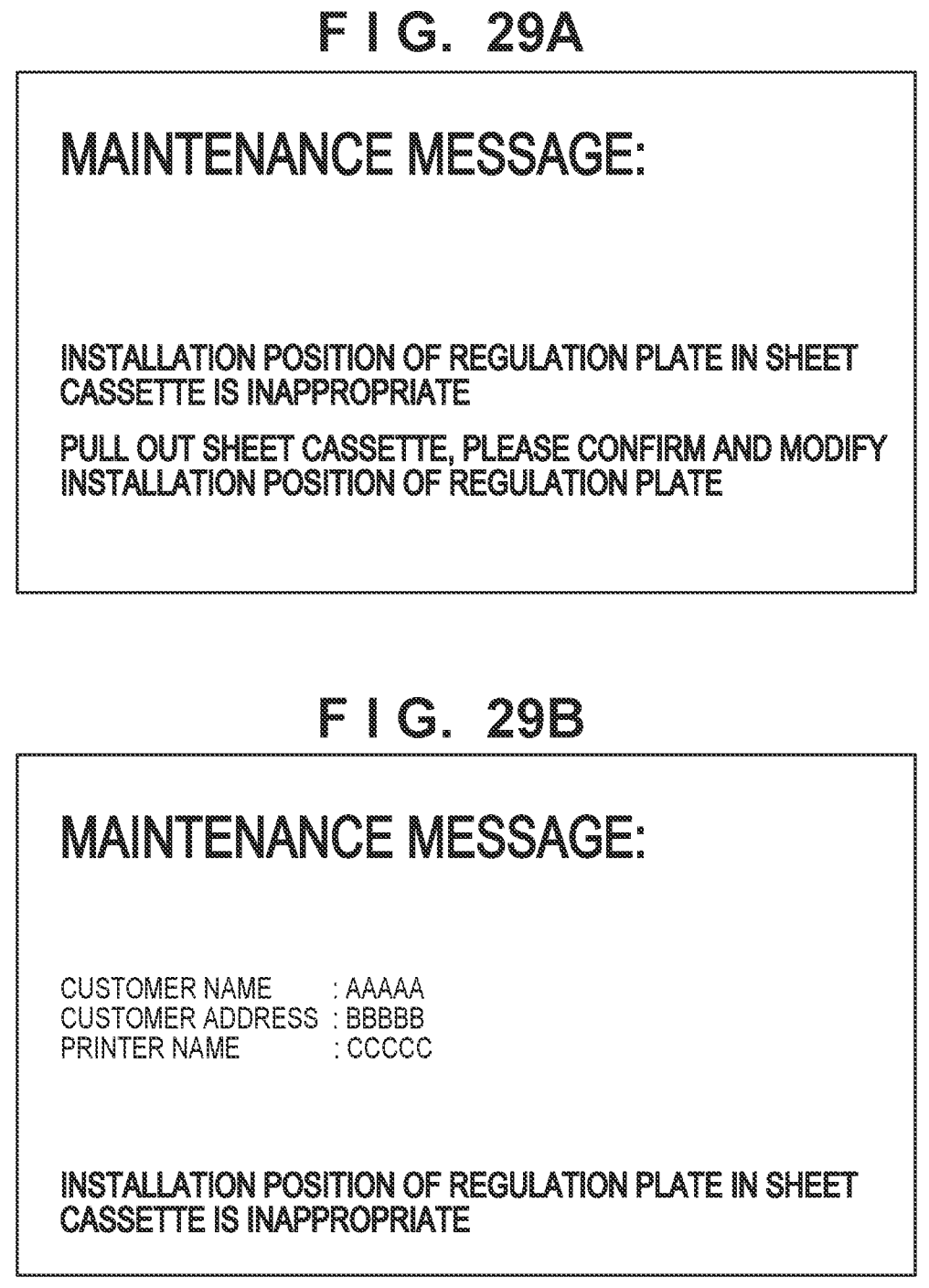

MAINTENANCE MESSAGE:

INSTALLATION POSITION OF REGULATION PLATE IN SHEET CASSETTE IS INAPPROPRIATE

PULL OUT SHEET CASSETTE, PLEASE CONFIRM AND MODIFY INSTALLATION POSITION OF REGULATION PLATE

FIG. 29B

MAINTENANCE MESSAGE:

CUSTOMER NAME : AAAAA
CUSTOMER ADDRESS : BBBBB
PRINTER NAME : CCCCC

INSTALLATION POSITION OF REGULATION PLATE IN SHEET CASSETTE IS INAPPROPRIATE

FIG. 34A

531

| DATE/TIME | TYPE CODE | FEED TIME(ms) |
|---|---|---|
| 2023/1/1 10:00:01 | 0 | 1402 |
| 2023/1/1 10:00:04 | 0 | 1423 |
| 2023/1/1 10:00:07 | 0 | 1432 |
| 2023/1/1 10:00:10 | 0 | 1440 |
| 2023/1/1 10:00:13 | 0 | 1391 |
| ... | ... | ... |
| 2023/5/24 21:05:30 | 0 | 1856 |
| 2023/5/25 21:16:50 | 2 | 1405 |
| 2023/5/25 21:16:53 | 0 | 1398 |

FIG. 34B

535

| VARIANCE V | ANALYSIS RESULT |
|---|---|
| NOT CALCULATED | UNKNOWN |
| V<240 | GOOD |
| 240=<V<280 | NORMAL |
| 280=<V | NOT GOOD |

FIG. 35A

532

| DATE/TIME | NOTIFICATION DESTINATION | COUNTERMEASURE CONTENT |
|---|---|---|
| 2023/1/1 10:20:00 | MONITORING TOOL | INSTRUCT REPLACE OF ROLLER |
| 2023/1/1 10:40:00 | MONITORING TOOL | INSTRUCT REPLACE OF ROLLER |
| 2023/1/1 11:00:00 | MONITORING TOOL | INSTRUCT REPLACE OF ROLLER |
| 2023/1/1 11:20:00 | MONITORING TOOL | INSTRUCT CHANGE OF FEED SECTION |

FIG. 35B

534

| ANALYSIS RESULT OF STATE | NOTIFICATION FREQUENCY N | COUNTERMEASURE CONTENT | NOTIFICATION DESTINATION |
|---|---|---|---|
| UNKNOWN | – | NONE | NONE |
| GOOD | – | NONE | NONE |
| NORMAL | – | NONE | NONE |
| NOT GOOD | N=3 | INSTRUCT REPLACE OF ROLLER | MONITORING TOOL |
| NOT GOOD | 3=<N | INSTRUCT CHANGE OF FEED SECTION | MONITORING TOOL |

FIG. 36A

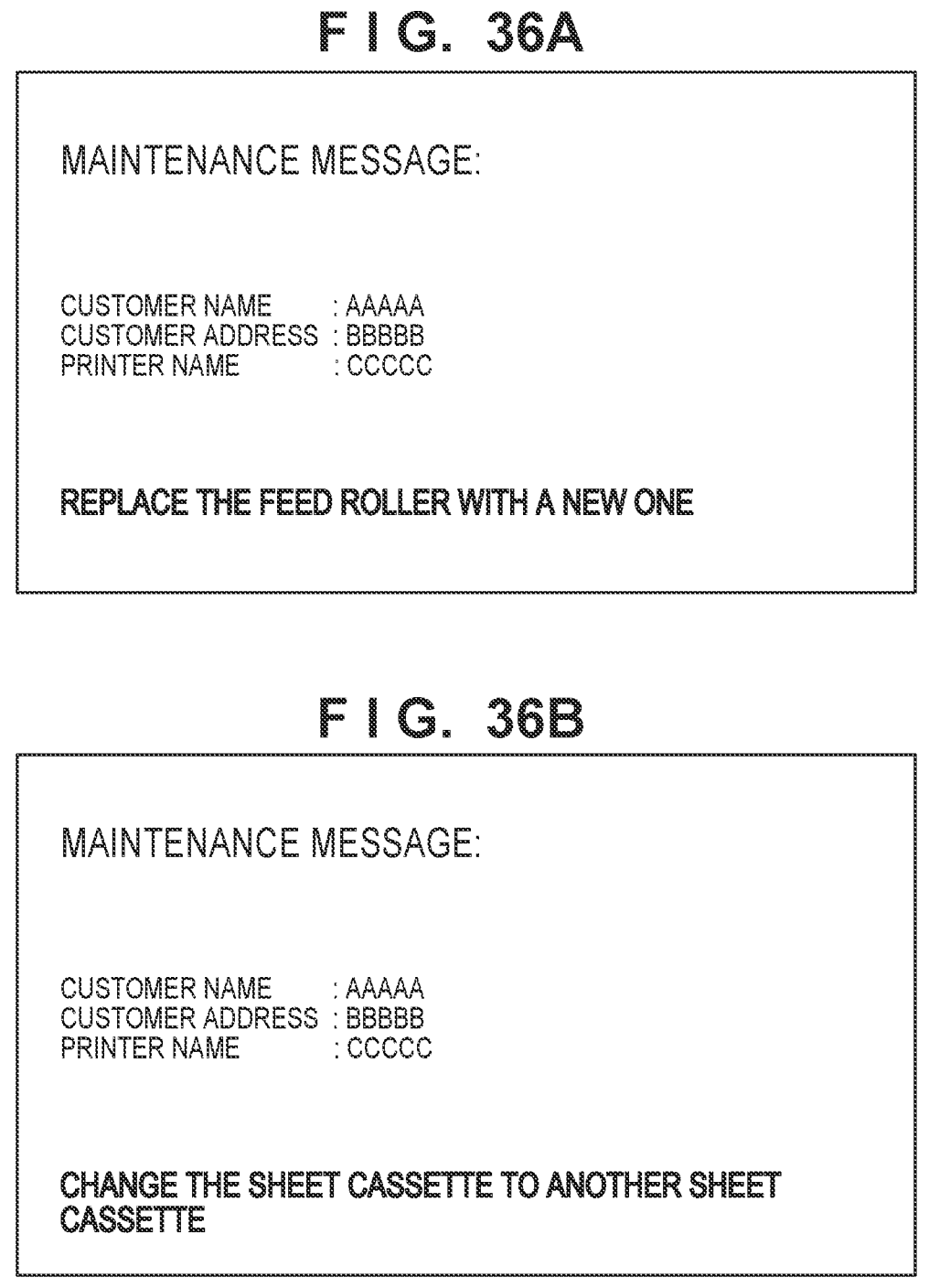

MAINTENANCE MESSAGE:

CUSTOMER NAME : AAAAA
CUSTOMER ADDRESS : BBBBB
PRINTER NAME : CCCCC

REPLACE THE FEED ROLLER WITH A NEW ONE

FIG. 36B

MAINTENANCE MESSAGE:

CUSTOMER NAME : AAAAA
CUSTOMER ADDRESS : BBBBB
PRINTER NAME : CCCCC

CHANGE THE SHEET CASSETTE TO ANOTHER SHEET CASSETTE

TECHNIQUE FOR DIAGNOSING COMPONENT USED IN IMAGE FORMING APPARATUS

BACKGROUND OF THE INVENTION

Field of the Invention

The present invention relates to a technique for diagnosing a component used in an image forming apparatus.

Description of the Related Art

An image forming apparatus is constituted by a large number of consumable components, and thus preventive maintenance or emergency maintenance is required from time to time. Japanese Patent Laid-Open No. 2021-071657 proposes an analysis program installed in a server analyzing an operation history of a printer and notifying a dealer of the analysis results, and then feeding back the details of the maintenance actually performed after the notification to the analysis program. The "dealer" is the company responsible for the maintenance of the image forming apparatus or the company that sells the image forming apparatus.

Japanese Patent No. 6566913 proposes changing corrective maintenance information or preventive maintenance information in accordance with worker information (a user, a dealer, a maintenance worker, or the like) designated by a maintenance terminal and malfunction information indicating a malfunction that has occurred. "Corrective maintenance information" refers to corrective maintenance work for recovering from the malfunction that occurred in the maintenance target apparatus. "Preventive maintenance information" refers to preventive maintenance work for preventing malfunctions from occurring in the maintenance target apparatus.

Incidentally, a dealer dispatches a maintenance worker (a maintenance person) to a maintenance site when there is an urgent need for maintenance, and has the maintenance person perform maintenance work on the image forming apparatus (called a "service dispatch" hereinafter). As the information to be communicated and the image forming apparatuses managed by the dealer increase, service costs increase for the dealer, maintenance work is delayed, and the like. The maintenance work includes maintenance work to be performed by a maintenance person, and maintenance work which can be performed by the image forming apparatus itself. Accordingly, if the destinations of notifications pertaining to maintenance work can be optimized, service costs for the dealer can be reduced, and delay in the maintenance work can also be reduced.

SUMMARY OF THE INVENTION

The present disclosure provides an image forming system including one or more server computers, an image forming apparatus, and a client computer, wherein the one or more server computers includes a first processor configured to: obtain state information indicating an operating state of the image forming apparatus; execute a first analysis on the state information; and determine countermeasure content to be applied to the image forming apparatus based on at least an analysis result of the first analysis, and determine the image forming apparatus or the client computer as a notification destination of the countermeasure content, and the image forming apparatus or the client computer determined as the notification destination includes a second processor configured to: receive the countermeasure content; and apply the countermeasure content.

Further features of the present invention will become apparent from the following description of exemplary embodiments (with reference to the attached drawings).

BRIEF DESCRIPTION OF THE DRAWINGS

FIGS. 6A to 6C are diagrams illustrating an operation history, countermeasure content, and analysis results.

FIG. 7 is a diagram illustrating a method for determining countermeasure content and a notification destination.

FIGS. 12A and 12B are diagrams illustrating examples of messages displayed in the client apparatus.

FIG. 14 is a diagram illustrating a screen for setting schedule information for a maintenance person.

FIG. 15 is a diagram illustrating a method for determining countermeasure content and a notification destination according to the second embodiment.

FIGS. 27A and 27B are diagrams illustrating an operation history and position analysis rules.

FIGS. 28A and 28B are diagrams illustrating a countermeasure history, and a method for determining countermeasure content and a notification destination.

FIGS. 29A and 29B are diagrams illustrating a maintenance message.

FIGS. 34A and 34B are diagrams illustrating an operation history and state analysis rules.

FIGS. 35A and 35B are diagrams illustrating a countermeasure history and countermeasure rules.

FIGS. 36A and 36B are diagrams illustrating maintenance messages.

DESCRIPTION OF THE EMBODIMENTS

Figure 1:
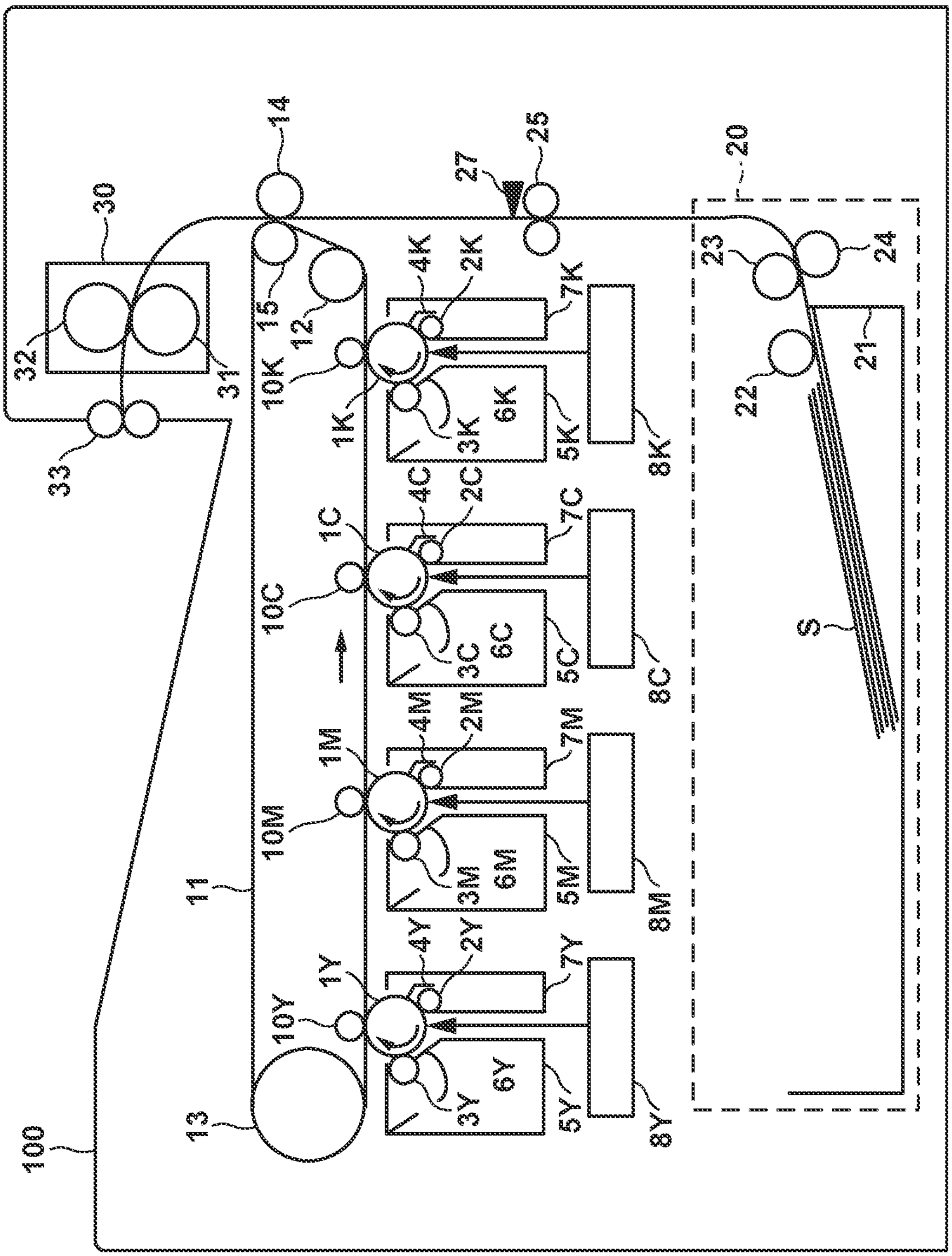
FIG. 1 is a cross-sectional view of an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Image Forming Apparatus

As illustrated in FIG. 1, a printer 100 is an electrophotographic image forming apparatus. However, the electrophotographic method is only one example, and another recording method, such as the ink jet recording method and the thermal transfer method, may be used instead. The printer 100 outputs a color image by superimposing toners of four colors, namely yellow (Y), magenta (M), cyan (C), and black (K). Although the letters Y, M, C, and K are appended to the reference signs in FIG. 1, those letters will be omitted from the reference signs when describing items common to all four colors.

A process cartridge 5 includes a toner receptacle 6 that holds the toner. The process cartridge 5 also includes a photosensitive drum 1, which is an image carrier. Furthermore, the process cartridge 5 includes a charging roller 2, a developing roller 3, a cleaning blade 4, and a waste toner receptacle 7.

The photosensitive drum 1 rotates in the direction indicated by the arrow. A predetermined negative-polarity voltage (a charging voltage) is applied to the charging roller 2, which charges the surface of the photosensitive drum 1 to a predetermined negative-polarity potential. A laser unit 8 is disposed below the process cartridge 5. The laser unit 8 is an exposure apparatus or an optical scanning apparatus that forms an electrostatic latent image by irradiating the photosensitive drum 1 with light based on an image signal. The developing roller 3 forms a toner image by causing toner supplied from the toner receptacle 6 to adhere to the electrostatic latent image. Note that a predetermined negative-polarity voltage (a developing voltage) is applied to the developing roller 3.

An intermediate transfer member unit is constituted by an intermediate transfer member 11, a drive roller 12, a tension roller 13, and an opposing roller 15. The intermediate transfer member 11 is an endless belt, for example. The drive roller 12 is a roller that rotates the intermediate transfer member 11. The tension roller 13 and the opposing roller 15 are rollers which are rotated by the intermediate transfer member 11.

A primary transfer roller 10 is provided on an inner side of the intermediate transfer member 11 opposite the photosensitive drum 1. A transfer voltage is applied to the primary transfer roller 10. When the photosensitive drum 1 rotates, the toner image on the photosensitive drum 1 is transported to a primary transfer nip. The primary transfer nip is located at the position where the photosensitive drum 1 and the primary transfer roller 10 are opposite each other. The primary transfer roller 10 transfers the toner image from the photosensitive drum 1 to the intermediate transfer member 11. Through this, each of the Y, M, C, and K toner images is superimposed on the intermediate transfer member 11, producing a full-color image. The cleaning blade 4 is a cleaning member that cleans the toner remaining on the photosensitive drum 1 and holds that toner in the waste toner receptacle 7. A feed section 20 is constituted by a feed cassette 21, a feed roller 22, a transport roller 23, a separation roller 24, and the like. The feed cassette 21 holds a plurality of sheets S. The feed cassette 21 may be called as a sheet holder or a sheet storage. The feed roller 22 feeds a sheet S from the feed cassette 21 into a transport path. The term “transport” may be replaced as “convey” or “conveyance”. The transport roller 23 transports the sheet S further downstream in the transport path. The separation roller 24 is a roller that separates a single sheet S from the plurality of sheets S.

A registration roller pair 25 is disposed further downstream from the feed section 20 in the transport path. The registration roller pair 25 corrects skew in the sheet S transported from the feed section 20, and transports the sheet S further downstream. A sheet sensor 27 is disposed downstream from the registration roller pair 25. The sheet sensor 27 detects the arrival of a leading edge of the sheet S, detects the timing at which a trailing edge of the sheet S passes, and the like.

A secondary transfer roller 14 is provided further downstream from the registration roller pair 25. The secondary transfer roller 14 is disposed opposite the opposing roller 15, and forms a secondary transfer nip in tandem with the intermediate transfer member 11. The secondary transfer roller 14 transfers the toner image from the intermediate transfer member 11 to the sheet S. To facilitate the transfer of the toner image, a positive-polarity voltage (a secondary transfer voltage) is applied to the secondary transfer roller 14.

A fixing apparatus 30 is disposed downstream from the secondary transfer nip. The fixing apparatus 30 includes a fixing film 31 and a pressure roller 32, and fixes the toner image onto the sheet S by applying heat and pressure to the sheet S and the toner image. A discharge roller pair 33 is provided downstream from the fixing apparatus 30. The discharge roller pair 33 discharges the sheet S to the exterior of the image forming apparatus.

A detection result from the sheet sensor 27 is used to determine whether the sheet S has arrived early or late. "Arriving early" refers to the sheet S arriving at the sheet sensor 27 earlier than the expected timing. "Arriving late" refers to the sheet S arriving at the sheet sensor 27 later than the expected timing. These phenomena may be called "transport errors". A jam of the sheet S is determined to have occurred when the sheet sensor 27 cannot detect the sheet S even after the feed roller 22 retries the feeding.

Feed Section

Figure 2A:
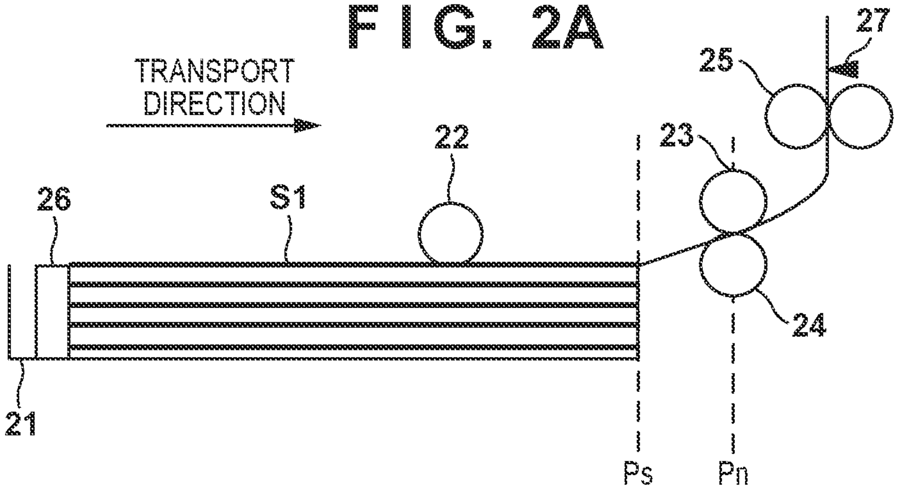
FIGS. 2A to 2C are cross-sectional views of a feed section.
Figure 2B:
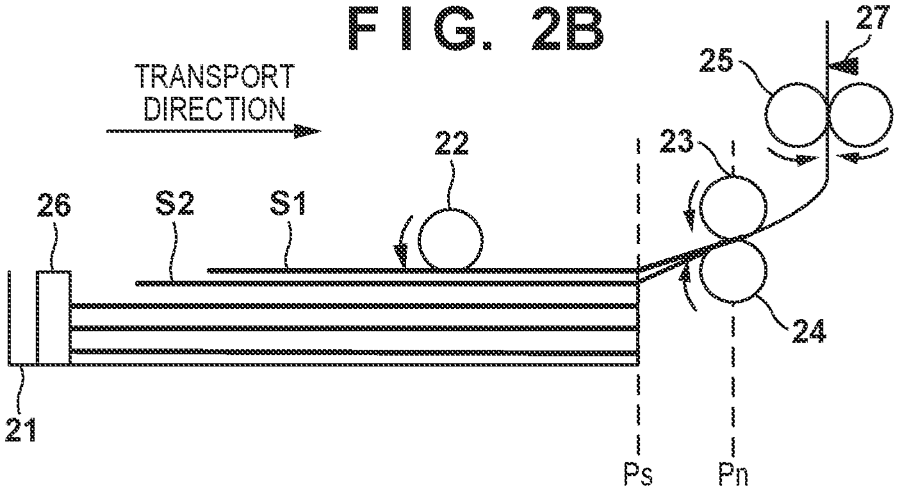
Figure 2C:
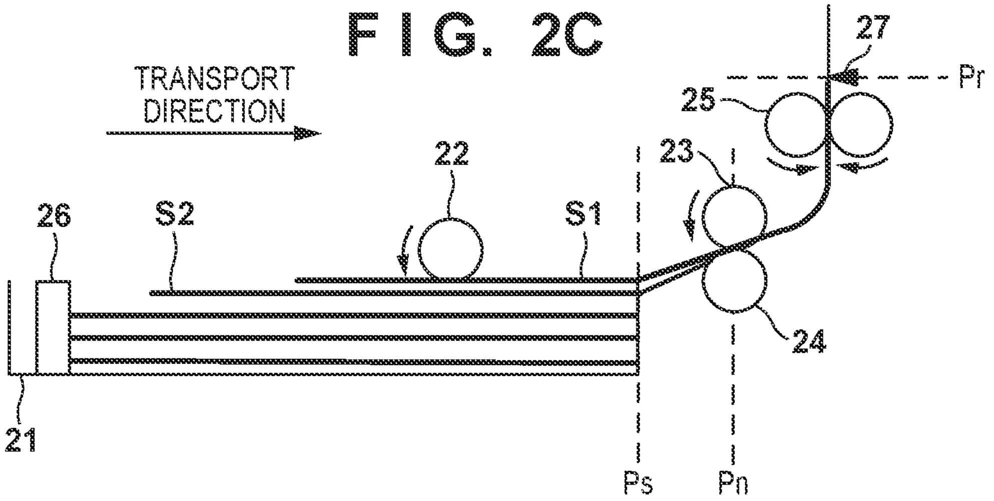

FIGS. 2A to 2C illustrate a feed operation performed by the feed section 20. As illustrated in FIG. 2A, a sheet S1, which is the uppermost of the plurality of sheets S held in the feed cassette 21, is fed by the feed roller 22. The plurality of sheets S in the feed cassette 21 are positioned by a trailing edge regulation plate 26. The leading edge of the sheet S1 is located at a transport start position Ps. When the feed operation is started, the feed roller 22 and the transport roller 23 both rotate. The sheet S1 moves to the right (a transport direction) due to friction between the feed roller 22 and the sheet S1.

Then, as illustrated in FIG. 2B, the sheet S1 reaches a separation nip Pn formed by the transport roller 23 and the separation roller 24. Friction also acts between the sheet S1 and a sheet S2 located under the sheet S1. Accordingly, the sheet S2 may also move in the transport direction. When at least two sheets S are transported to the separation nip Pn by the feed roller 22, the separation nip Pn separates one sheet S from the at least two sheets S and transports the one sheet S downstream. A torque limiter (not shown) is connected to the separation roller 24. A predetermined torque is applied to the separation roller 24. As a result, the separation roller 24 applies resistance to the sheet S2 in a direction opposite from the transport direction of the sheet S1. This torque is set such that the separation roller 24 is rotated along with the transport roller 23 when there is one sheet S at the separation nip Pn, and the separation roller 24 is stopped when at least two sheets S enter the separation nip Pn. Accordingly, the separation nip Pn can separate and transport the sheets S one at a time.

Thereafter, as the feed roller 22 and the transport roller 23 continue to rotate, the sheet S1 passes through the registration roller pair 25, as illustrated in FIG. 2C. As a result, the leading edge of the sheet S1 reaches a position at which that leading edge is detected by the sheet sensor 27 (a detection position Pr). The time that passes from the timing at which the feed operation starts to the timing at which the sheet S1 reaches the sheet sensor 27 is called a "feed time".

Figure 3A:
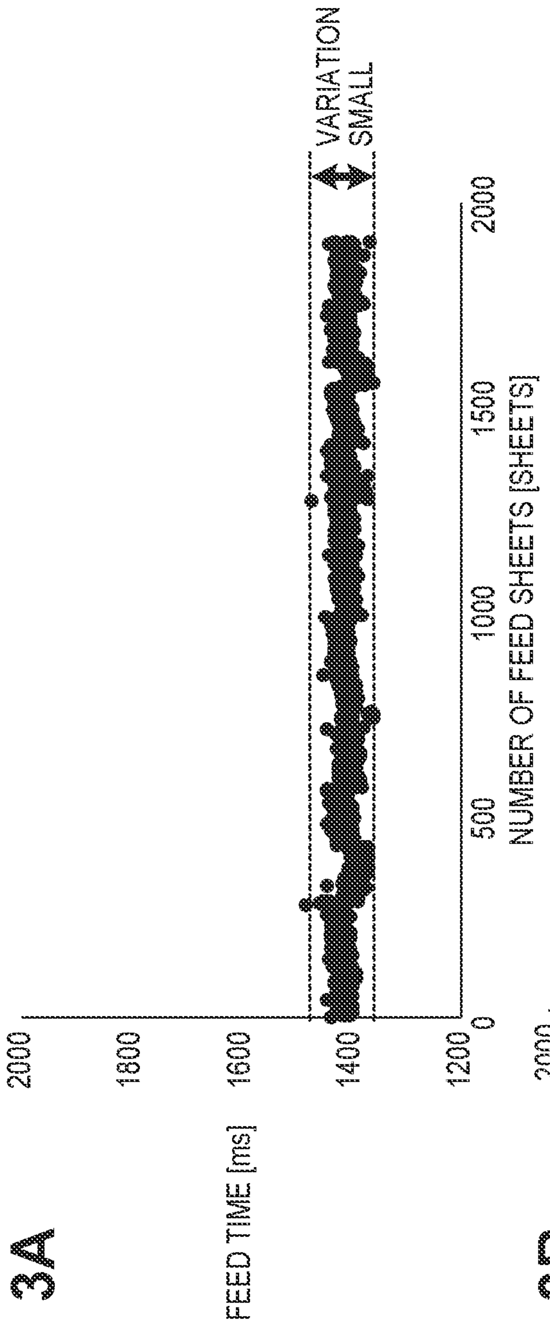
FIGS. 3A and 3B are diagrams illustrating variation in a feed time.
Figure 3B:
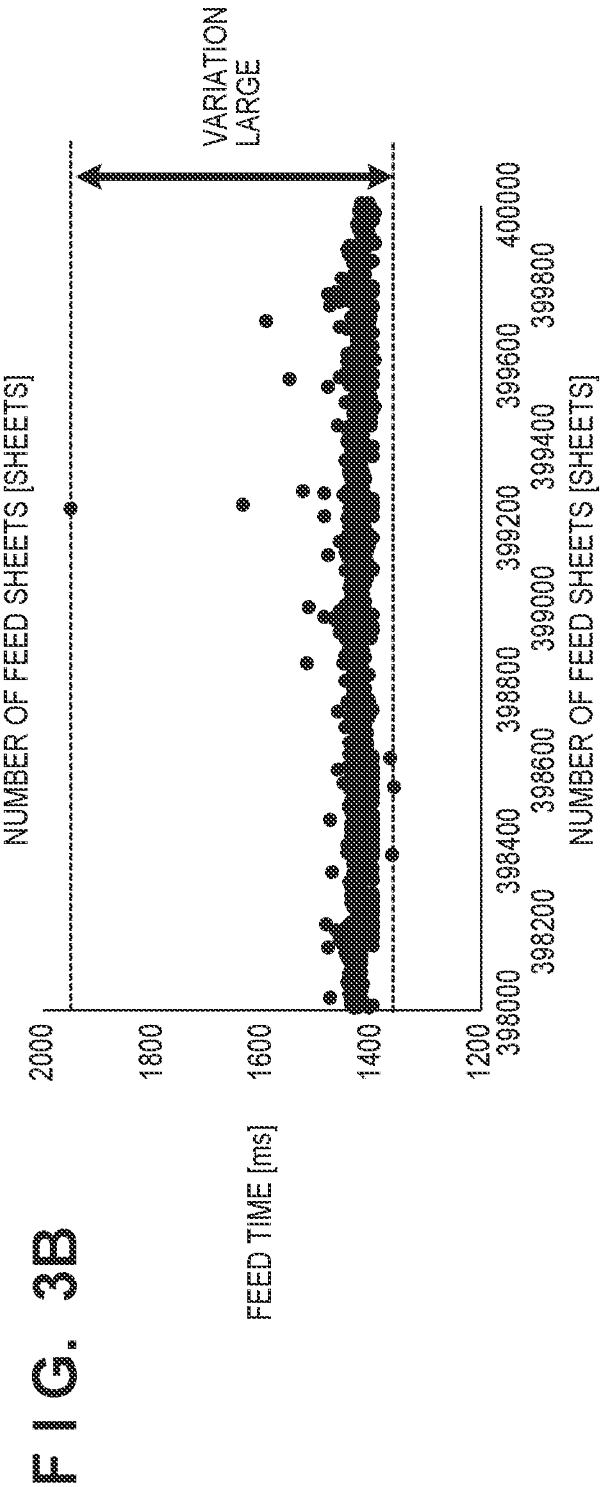

FIGS. 3A and 3B illustrate a plurality of feed times when the feed operation is repeatedly executed. Specifically, FIG. 3A illustrates the feed time from the first sheet to the 2,000th sheet when the feed operation is executed for 400,000 sheets. FIG. 3B illustrates the feed time from the 398,001th sheet to the 400,000th sheet. When the feed operation is repeated, sudden delays arise in the sheets S, which produces increased variation in the feed times. The feed roller 22 gradually wears out as the feed operation is repeated. As a result, the friction acting between the feed roller 22 and the sheet S decreases at locations on the circumferential surface of the feed roller 22 that are more worn. This leads to variations in the feed time.

Hardware

Figure 4:
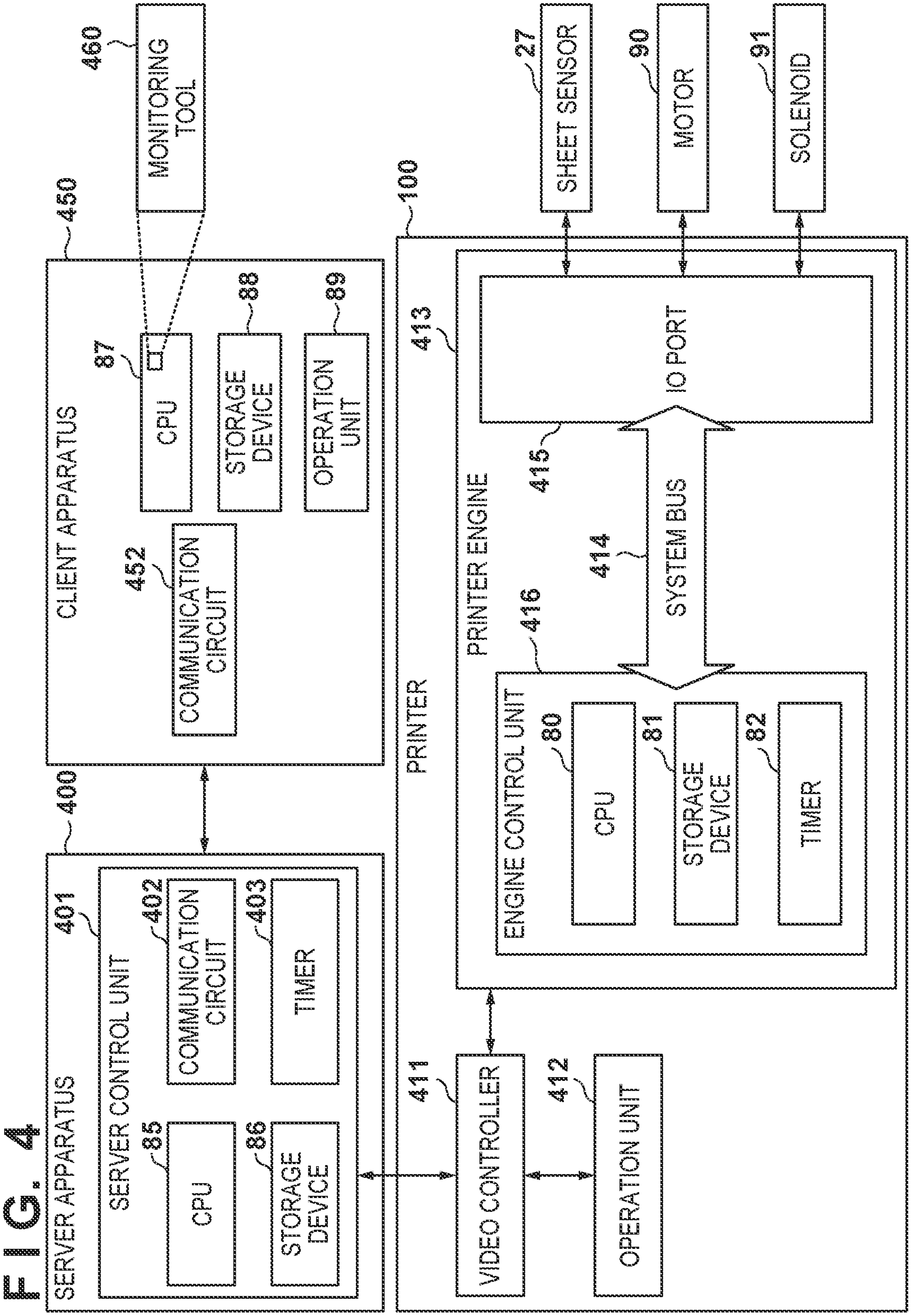
FIG. 4 is a diagram illustrating hardware.

FIG. 4 is a diagram illustrating the hardware configurations of the printer 100, a server apparatus 400, and a client apparatus 450. The server apparatus 400 can communicate with at least one printer 100 and at least one client apparatus 450 over a network such as the Internet. The server apparatus 400 is a computer (information processing apparatus) responsible for the maintenance and management of at least one printer 100. The client apparatus 450 is a computer that can communicate with the server apparatus 400 over a network, and can be operated by, for example, a maintenance person working for a dealer.

The printer 100 includes a video controller 411, an operation unit 412, and a printer engine 413. The video controller 411 includes a communication circuit that receives image data from a host computer, an image scanner, or the like, and an image processing circuit that generates an image signal for the printer engine 413 by converting the image data. The video controller 411 can communicate with the server apparatus 400 through the communication circuit. The operation unit 412 includes a display apparatus that displays information to a user and an input apparatus that accepts inputs of instructions from the user. The input apparatus may be realized by a touch panel sensor that detects touches made by the user. As such, the operation unit 412 may be called an "operation panel". The input apparatus may include a power switch, an operation button, and the like. The video controller 411 transmits the image signal and a print instruction to the printer engine 413.

The printer engine 413 includes an engine control unit 416, a system bus 414, and an IO port 415. The engine control unit 416 includes a CPU 80, a storage device 81, and a timer 82. "CPU" is an acronym for "central processing unit". The storage device 81 includes a read-only memory (ROM) and a random access memory (RAM). A ROM region of the storage device 81 stores programs and various types of data. A RAM region is used as a work region. The timer 82 can include a real-time clock (RTC), a counter circuit, and the like.

The CPU 80 implements various functions by executing programs. The CPU 80 receives detection results from the sheet sensor 27 through the system bus 414 and the TO port 415, and supplies drive signals to a motor 90 and a solenoid 91. Note that a drive circuit that generates drive current for the motor 90 may be provided between the TO port 415 and the motor 90. A drive circuit that generates drive current for the solenoid 91 may be provided between the TO port 415 and the solenoid 91. The motor 90 drives various rotating members, such as the transport roller 23 and the registration roller pair 25. Although one motor 90 is illustrated here, a plurality of motors may be provided. The solenoid 91 causes the feed roller 22 to make one rotation, which in turn causes the feed roller 22 to feed a sheet S.

The server apparatus 400 includes a server control unit 401. The server control unit 401 is a control board including a CPU 85, a storage device 86, a communication circuit 402, and a timer 403. The CPU 85 executes programs stored in the storage device 86, and reads and writes various types of data. The CPU 85 includes a CPU core and a GPU core. "GPU" is an acronym for "graphics processing unit". The storage device 86 includes a RAM, a ROM, a hard disk drive (HDD), and a solid-state drive (SSD). Note that the CPU 85 may implement a virtual environment in accordance with a program, and the server may be implemented by the virtual environment. The server control unit 401 can pass information to the engine control unit 416 via the video controller 411. The server control unit 401 exchanges information with a monitoring tool 460 implemented by the client apparatus 450 over a network such as the Internet. The communication circuit 402 includes circuitry for communicating with the printer 100 and the client apparatus 450. The timer 403 can include a real-time clock (RTC), a counter circuit, and the like.

The client apparatus 450 is a computer including a CPU 87, a storage device 88, an operation unit 89, and a communication circuit 452. The client apparatus 450 may be a personal computer (PC), a smartphone, or a tablet terminal. The CPU 87 is a processor that functions as the monitoring tool 460 by executing a program stored in the storage device 88. The storage device 88 can include a RAM, a ROM, an HDD, and an SSD. The operation unit 89 includes a display apparatus (a liquid crystal display) and an input apparatus (a keyboard, a mouse, a touch detection sensor, and the like). The communication circuit 452 includes circuitry for communicating with the server apparatus 400. The monitoring tool 460 receives information from the server control unit 401, and displays the received information in the operation unit 89. The monitoring tool 460 may be implemented by a PC or a server computer, or may be implemented in a virtual environment such as a virtual machine. Note that the monitoring tool 460 may refer to a program itself executed by the CPU 87, may refer to an instance of that program, or may refer to the client apparatus 450 itself

Descriptions of Functions

Figure 5:
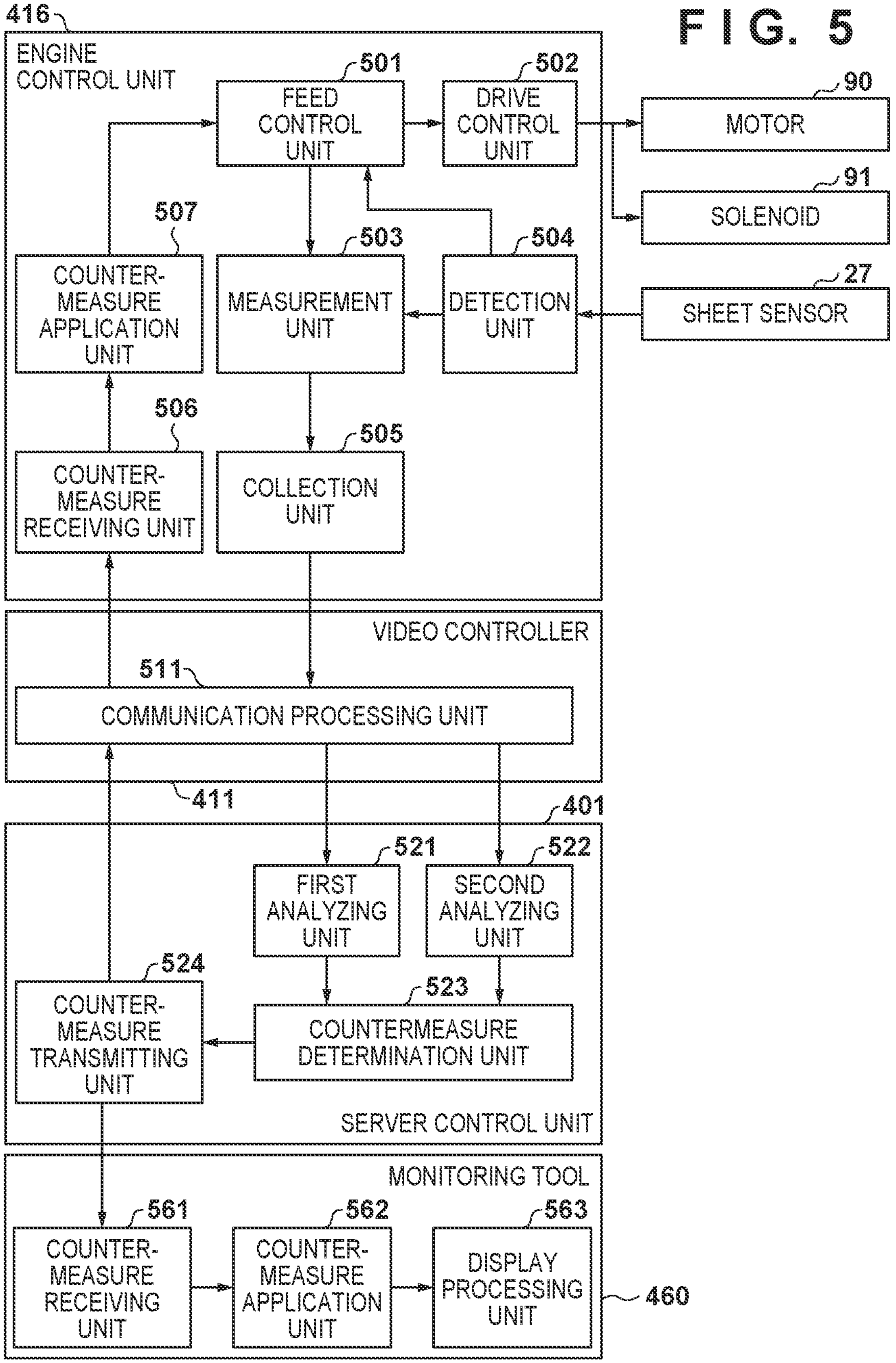
FIG. 5 is a block diagram illustrating functions of a control unit.

FIG. 5 illustrates the functions of the engine control unit 416, the video controller 411, the server control unit 401, and the monitoring tool 460. The functions of the engine control unit 416 are implemented by the CPU 80 executing a program stored in the storage device 81. The functions of the video controller 411 are implemented by a processor in the video controller 411 executing a program stored in a ROM in the video controller 411. The functions of the server control unit 401 are implemented by the CPU 85 executing a program stored in the storage device 86. The functions of the monitoring tool 460 are implemented by the CPU 87 executing a program in the storage device 88.

The engine control unit 416 controls feeding, measures the feed time, collects an operation history, and applies countermeasure content (maintenance content). The server control unit 401 analyzes the operating state of the feed section 20, analyzes a jam occurrence rate, determines countermeasure content, selects a notification destination, and transmits the countermeasure content. The monitoring tool 460 displays the countermeasure content.

A feed control unit 501 is responsible for controlling the feeding by the feed section 20. When the printer engine 413 receives a print instruction, the feed control unit 501 instructs a drive control unit 502 to perform the feed operation. The drive control unit 502 rotates the transport roller 23 and the separation roller 24 by driving the motor 90. Furthermore, the feed control unit 501 causes the drive control unit 502 to drive the solenoid 91 at the timing at which feeding starts. As a result, the feed roller 22 makes one rotation, and the sheets S pushed up within the feed cassette 21 are separated one at a time and fed. The sheet S is then is transported to the sheet sensor 27. Based on an input signal from the sheet sensor 27, a detection unit 504 detects the leading edge of the sheet S and notifies the feed control unit 501 and a measurement unit 503 that the leading edge of the sheet S has been detected. If the detection unit 504 cannot detect the leading edge of the sheet S within a predetermined period of time after the feed operation has started, the feed control unit 501 determines that a jam has occurred, and instructs the drive control unit 502 to stop the feed operation.

The measurement unit 503 measures the feed time. Using the timer 82, the measurement unit 503 measures the time that passes from the timing at which the feed control unit 501 instructs the feed operation to be performed to the timing at which the leading edge of the sheet S reaches the sheet sensor 27. The measurement unit 503 adds date/time data indicating the date and time at which the measurement was executed (called a "feed date/time" hereinafter) to the elapsed time each time a single sheet S is fed, and saves the resulting data in the storage device 81. Note that if a jam has occurred, a negative value (e.g., −1), indicating that a measurement cannot be taken, is stored as the feed time.

A collection unit 505 collects an operation history of the printer 100. For example, the collection unit 505 reads out the feed date/time and the feed time saved in the storage device 81 by the measurement unit 503, and transmits those items to a communication processing unit 511 of the video controller 411. The communication processing unit 511 communicates the feed date/time, the feed time, and identification information of the printer 100 (e.g., a model number or a manufacturing serial number) to the server control unit 401. The server control unit 401 saves the received feed date/time, feed time, and identification information in the storage device 86.

FIG. 6A illustrates an example of the operation history stored in the storage device 86. The operation history is stored in association with the identification information of the printer 100.

The engine control unit 416 further includes a countermeasure receiving unit 506 and a countermeasure application unit 507. In the present embodiment, the operation of the feed control unit 501 may be changed by the server apparatus 400 based on the operating state of the feed section 20 and an analysis result for the jam occurrence rate. The countermeasure receiving unit 506 receives countermeasure content from a countermeasure transmitting unit 524 of the server control unit 401. The countermeasure content is, for example, an instruction to activate/deactivate a feed retry. This instruction is expressed as a command to the engine control unit 416. The countermeasure application unit 507 sets the countermeasure content received by the countermeasure receiving unit 506 in the feed control unit 501.

FIG. 6B is a diagram illustrating a relationship between a command and a jam determination condition. If the received command is a command to deactivate feed retry, the feed control unit 501 determines that a jam has occurred when the sheet S is not detected within a predetermined period of time following the start of the feed operation. Additionally, the feed control unit 501 instructs the drive control unit 502 to stop the feeding.

On the other hand, if the received command is a command to activate feed retry, the feed control unit 501 instructs the drive control unit 502 to perform a feed retry when the sheet S is not detected within the predetermined period of time following the start of the feed operation. Furthermore, the feed control unit 501 determines that a jam has occurred when a sheet S is not detected within the predetermined period of time following the start of the feed retry. Additionally, the feed control unit 501 instructs the drive control unit 502 to stop the feeding. Activating feed retry reduces the jam occurrence rate, but may delay jam determination, reduce throughput, and the like. Accordingly, feed retry is activated only when countermeasures are necessary.

The server control unit 401 includes a first analyzing unit 521 for analyzing the operating state of the feed section 20. The first analyzing unit 521 finds a variance V for N feed times received from the collection unit 505 within a predetermined period. Here, of the plurality of feed times, −1 is a unique value indicating the occurrence of a jam, and is therefore not used to calculate the variance V. Additionally, the N feed times are the feed times for the N most recent sheets of the sheets S, excluding the sheet S that caused the jam. For example, N=1000. When the number of collected feed times is less than 1000, the first analyzing unit 521 does not calculate the variance V, and thus the variance V remains uncalculated. Furthermore, the first analyzing unit 521 may classify the current performance or wear state of the feed section 20 based on the variance V.

FIG. 6C illustrates an analysis result from the first analyzing unit 521. The performance of the feed section 20 decreases as the amount of wear of feed roller 22 increases. The amount of wear correlates with the variance V of the feed times. Accordingly, the first analyzing unit 521 finds the analysis result for the state of the feed section 20 based on the variance V, and stores the analysis result in the storage device 86 in association with the feed date/time.

The server control unit 401 may further include a second analyzing unit 522 (optional). The second analyzing unit 522 analyzes a jam occurrence rate J. The second analyzing unit 522 calculates the jam occurrence rate J for the most recent M sheets S from the feed time received from the collection unit 505. For example, the second analyzing unit 522 counts a number of feed times that are −1 (a number of occurrences D) among the feed times for the most recent M sheets S. The second analyzing unit 522 calculates the occurrence rate J by dividing the number of occurrences D of a jam by the parameter M (J=D/M). For example, M is 5,000. If the number of data is less than M, the second analyzing unit 522 substitutes 0 for J.

A countermeasure determination unit 523 may determine countermeasure content and a notification destination of the countermeasure content based on the analysis result from the first analyzing unit 521. In other words, the countermeasure determination unit 523 may determine the countermeasure content and the notification destination of the countermeasure content using analysis results from at least one analytical method. Furthermore, the countermeasure determination unit 523 may determine the countermeasure content and the notification destination of the countermeasure content based on a combination of the analysis result from the first analyzing unit 521 and the analysis result from the second analyzing unit 522. In other words, the countermeasure determination unit 523 may determine the countermeasure content and the notification destination of the countermeasure content using analysis results from a plurality of analytical methods.

FIG. 7 illustrates combinations of countermeasure content and notification destinations corresponding to combinations of the state of the feed section 20 and the occurrence rate J. If the state of the feed section 20 (a feed state) is "unknown", countermeasures are not necessary. If the feed state is "very good" or "good", the countermeasure determination unit 523 sets the countermeasure content to deactivate feed retry, and sets the printer 100 as the notification destination. In other words, a command to deactivate feed retry is transmitted to the printer 100.

If the feed state is "poor" and the occurrence rate J is less than a threshold, the countermeasure determination unit 523 sets the countermeasure content to activate feed retry, and sets the printer 100 as the notification destination. In other words, a command to activate feed retry is transmitted to the printer 100.

In this manner, even if the feed state is poor, when the jam occurrence rate J is low, the dealer is not notified. This reduces service costs and also reduces the occurrence of jams. The threshold is 0.01%, for example. It is known from experience that the rate at which the feed state deteriorates is slow when the jam occurrence rate J is less than 0.01%, which means that it is not very urgent to make a service dispatch.

If the feed state is "poor" and the occurrence rate J is at least the threshold, the countermeasure determination unit 523 sets the countermeasure content to a feed roller 22 replacement preparation display, and sets the monitoring tool 460 as the notification destination. In other words, a message indicating that the feed roller 22 should be replaced is transmitted to the monitoring tool 460.

If the feed state is "very poor", the countermeasure determination unit 523 sets the countermeasure content to a feed roller 22 replacement required display, and sets the monitoring tool 460 as the notification destination. In other words, a message indicating that it is necessary to replace the feed roller 22 is transmitted to the monitoring tool 460. In this case, a service dispatch is highly urgent.

If the notification destination is "printer", the countermeasure transmitting unit 524 of the server control unit 401 transmits the countermeasure content to the countermeasure receiving unit 506 of the engine control unit 416 via the communication processing unit 511 of the video controller 411. The countermeasure receiving unit 506 passes the received countermeasure content (a deactivation command or an activation command) to the countermeasure application unit 507. The countermeasure application unit 507 sets the feed control unit 501 by executing the countermeasure content (the deactivation command or the activation command).

If the notification destination is "monitoring tool", the countermeasure transmitting unit 524 transmits the countermeasure content to a countermeasure receiving unit 561 of the monitoring tool 460. In the present embodiment, the countermeasure content may be communicated as a command to the notification destination. The monitoring tool 460 includes the countermeasure receiving unit 561, a countermeasure application unit 562, and a display processing unit 563. In the present embodiment, display content displayed in the operation unit 89 by the display processing unit 563 is changed based on the analysis results for the state of the feed section and the occurrence rate J. The countermeasure receiving unit 561 receives the countermeasure content transmitted from the countermeasure transmitting unit 524 of the server control unit 401. The countermeasure content corresponds to displaying, in the monitoring tool 460, an instruction to the dealer, such as "prepare to replace feed roller" or "feed roller requires replacement". The countermeasure receiving unit 561 passes the countermeasure content to the countermeasure application unit 562. When a "replacement preparation display" command is received as the countermeasure content, the countermeasure application unit 562 displays an instruction to order a feed roller 22 in the operation unit 89 through the display processing unit 563. When a "replacement required display" command is received, the countermeasure application unit 562 displays an instruction for service dispatch and to replace the feed roller 22 in the operation unit 89 through the display processing unit 563. This makes it possible for a maintenance person from the dealer to confirm the countermeasure content displayed in the operation unit 89.

Flowcharts

Figure 8:
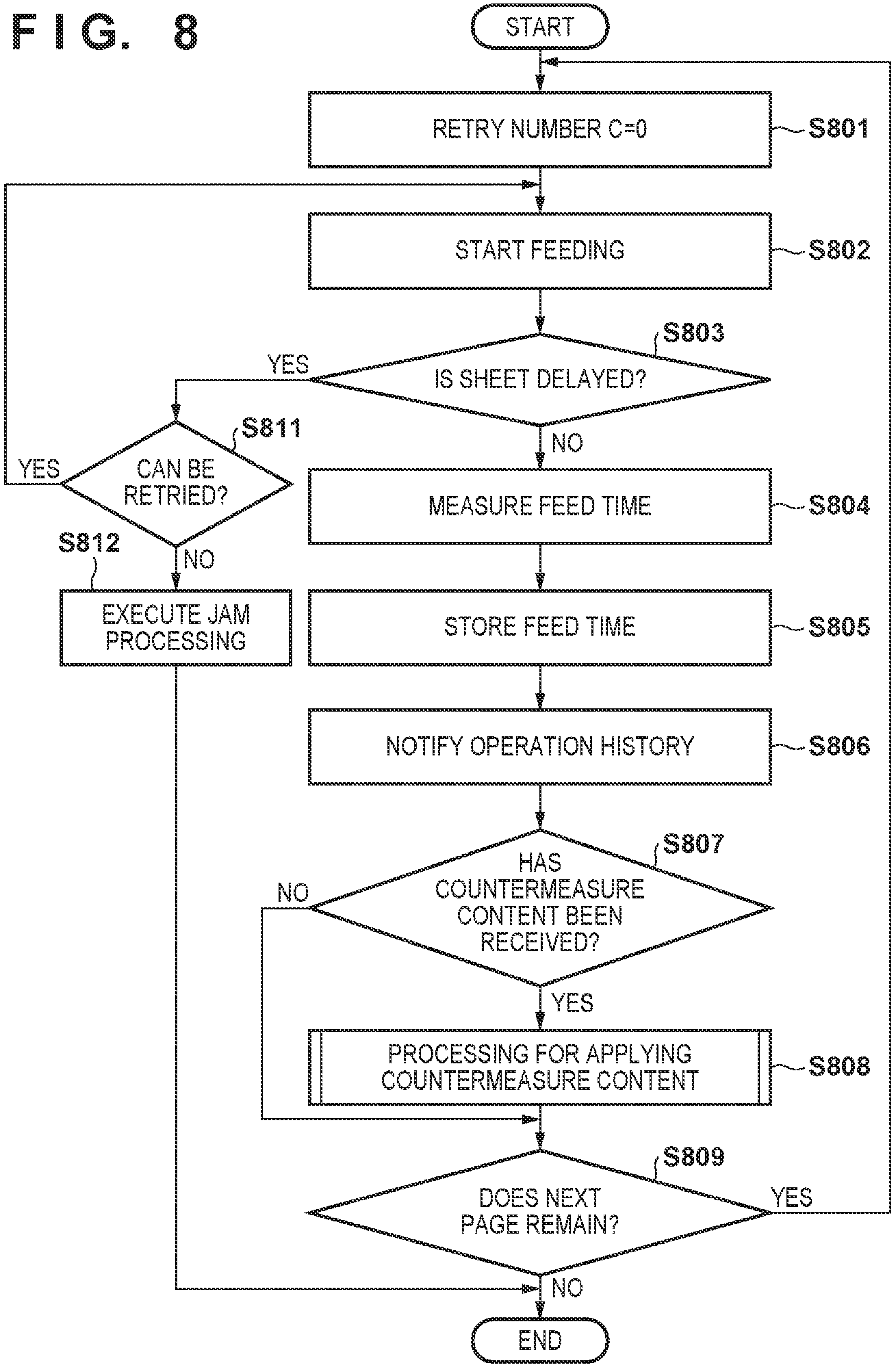
FIG. 8 is a flowchart illustrating processing by the image forming apparatus.

FIG. 8 is a flowchart illustrating a sequence of processing executed by the printer 100. This processing is started using the printer engine 413 receiving a print instruction as a trigger.

In step S801, the CPU 80 (the feed control unit 501) resets a retry number C for the feed operation to 0. The retry number C is a variable stored in the storage device 81.

In step S802, the CPU 80 (the feed control unit 501) starts feeding a sheet S. The feed control unit 501 rotates the motor 90 through the drive control unit 502 and drives the solenoid 91. The feeding of the sheet S is started as a result. Meanwhile, the feed control unit 501 instructs the measurement unit 503 to start measuring the elapsed time (the feed time). The measurement unit 503 measures the elapsed time using the timer 82.

In step S803, the CPU 80 (the feed control unit 501) determines whether the sheet S is delayed based on the elapsed time and a detection result from the sheet sensor 27. For example, when the sheet sensor 27 detects the leading edge of the sheet S before the elapsed time reaches a threshold time, the feed control unit 501 determines that a jam has not occurred. In this case, the CPU 80 moves the sequence to step S804. On the other hand, if the leading edge of the sheet S cannot be detected by the sheet sensor 27 by the time the elapsed time reaches the threshold time, the feed control unit 501 determines that a jam has occurred. In this case, the CPU 80 moves the sequence to step S811. In step S811, the CPU 80 (the feed control unit 501) determines whether the feed operation for the sheet S can be retried based on the retry number C. For example, if the retry number C is 0, the feed control unit 501 determines that the feed operation can be retried. In this case, the CPU 80 adds 1 to the retry number C, moves the sequence to step S802, and retries the feed operation. On the other hand, if the retry number C is a threshold (e.g., 1), the feed control unit 501 determines that the feed operation cannot be retried. In this case, the CPU 80 moves the sequence to step S812. In step S812, the CPU 80 (the feed control unit 501) executes jam processing. For example, the feed control unit 501 stops the motor 90, substitutes −1 for the feed time, and transmits the operation history to the server apparatus 400.

In step S804, the CPU 80 (the measurement unit 503) measures the feed time. The measurement unit 503 sets the time that has passed from the timing at which the feed operation was started to the timing at which the leading edge of the sheet S was detected by the sheet sensor 27 as the feed time.

In step S805, the CPU 80 (the measurement unit 503) stores the feed time in the storage device 81 along with the feed date/time.

In step S806, the CPU 80 (the collection unit 505) reads out the feed date/time and the feed time (and the identification information of the printer 100) from the storage device 81, generates the operation history, and notifies the server apparatus 400. The identification information of the printer may be appended to the operation history.

In step S807, the CPU 80 (the countermeasure receiving unit 506) determines whether countermeasure content has been received from the server apparatus 400. If no countermeasure content has been received, the CPU 80 moves the sequence to step S809. If countermeasure content has been received, the CPU 80 moves the sequence to step S808.

In step S808, the CPU 80 (the countermeasure application unit 507) applies the countermeasure content to the printer 100.

In step S809, the CPU 80 (the feed control unit 501) determines, based on the print instruction, whether a next page which needs to be printed remains. If no next page remains, the CPU 80 ends the print job. If a next page remains, the CPU 80 moves the sequence to step S801.

Figure 9:
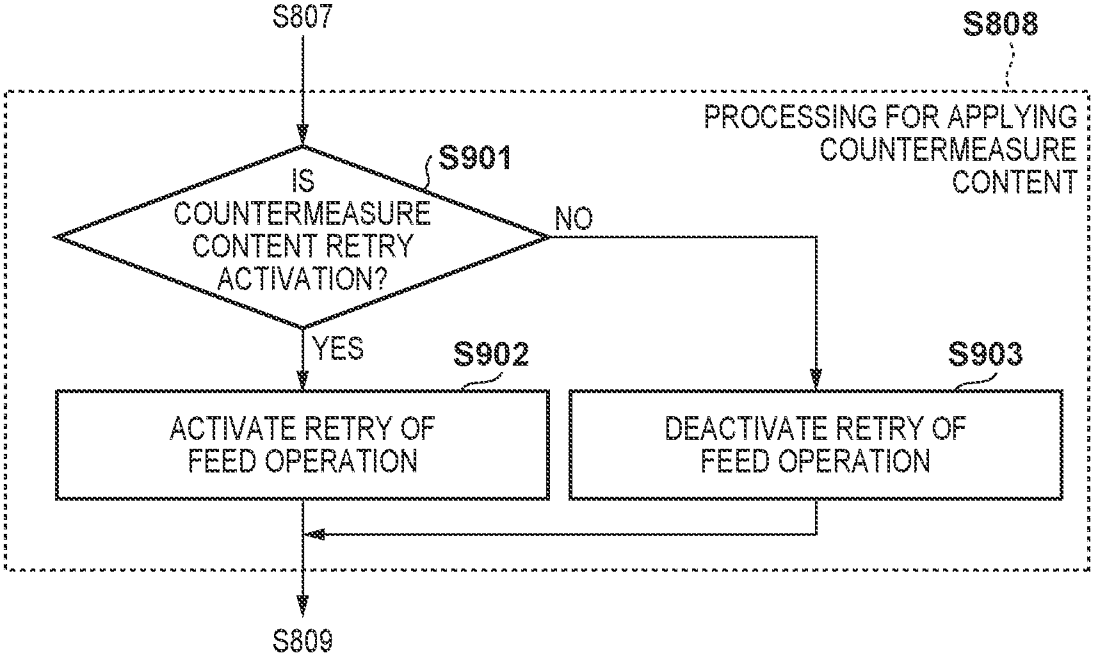
FIG. 9 is a flowchart illustrating processing for applying countermeasure content.

FIG. 9 is a flowchart illustrating details of step S808.

In step S901, the CPU 80 (the countermeasure application unit 507) determines whether the countermeasure content indicates that the feed operation is to be retried. If the received countermeasure content is a retry activation command, the countermeasure application unit 507 moves the sequence to step S902. If the received countermeasure content is a deactivation command, the countermeasure application unit 507 moves the sequence to step S903.

In step S902, the CPU 80 (the countermeasure application unit 507) activates retries for the feed operation. For example, the countermeasure application unit 507 sets a retry flag held in the storage device 81 to 1.

In step S903, the CPU 80 (the countermeasure application unit 507) deactivates retries for the feed operation. For example, the countermeasure application unit 507 resets the retry flag held in the storage device 81 to 0.

Figure 10:
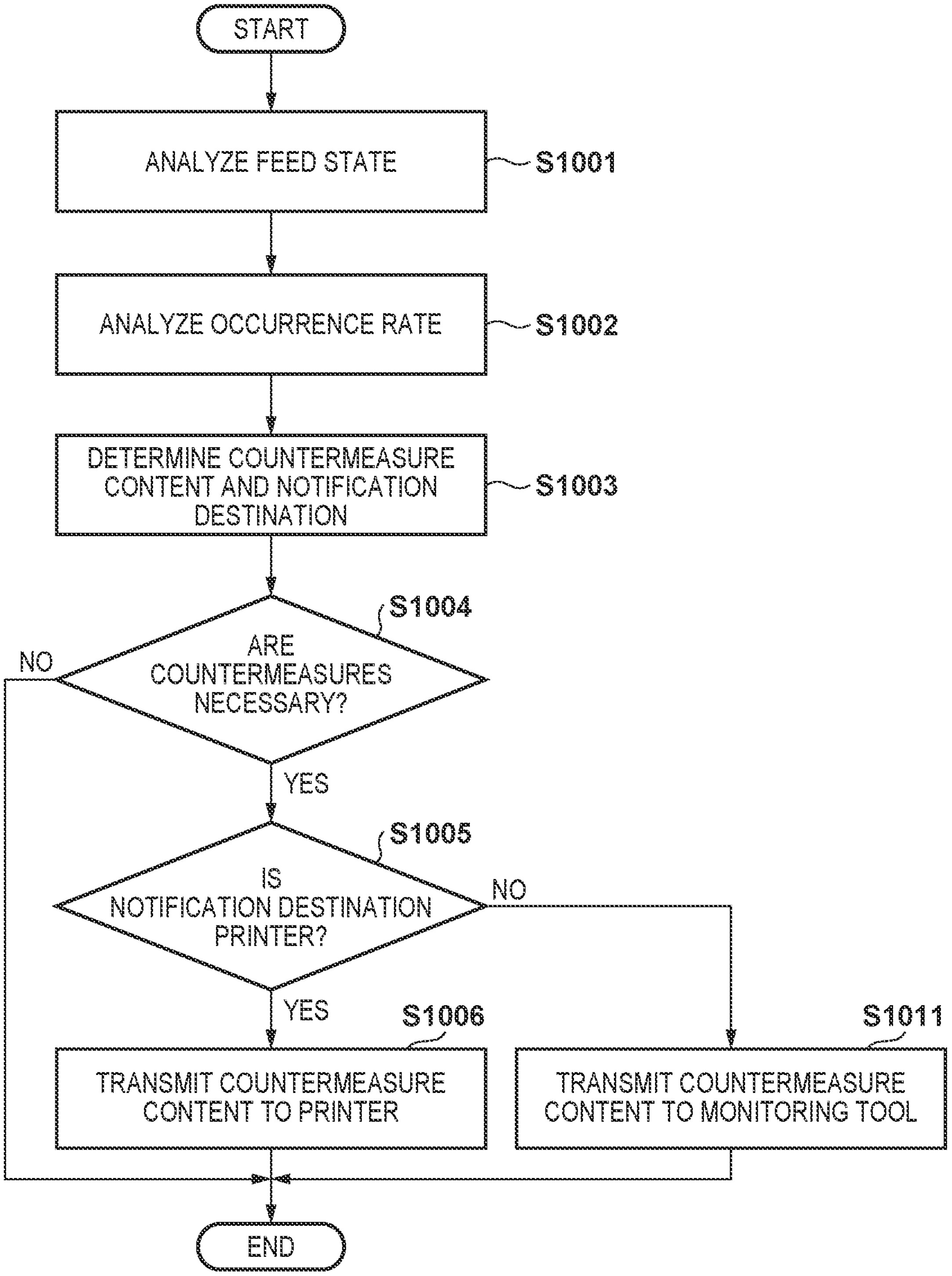
FIG. 10 is a flowchart illustrating a method for determining countermeasure content and a notification destination executed by a server apparatus.

FIG. 10 is a flowchart illustrating a sequence of processing executed by the server apparatus 400.

In step S1001, the CPU 85 (the first analyzing unit 521) analyzes the feed state (the operating state of the feed section 20) based on the operation history collected from the printer 100. For example, the first analyzing unit 521 calculates the variance V based on the operation history, and classifies the feed state based on the variance V.

In step S1002, the CPU 85 (the second analyzing unit 522) analyzes the jam occurrence rate J based on the operation history. For example, the second analyzing unit 522 calculates the occurrence rate J by counting the number D of feed times set to "−1" and dividing the number D by the parameter M.

In step S1003, the CPU 85 (the countermeasure determination unit 523) determines the countermeasure content and the notification destination based on the analysis result from the first analyzing unit 521 and the analysis result from the second analyzing unit 522. The countermeasure determination unit 523 may determine the countermeasure content and the notification destination by referring to a determination table stored in the storage device 86, such as that illustrated in FIG. 7.

In step S1004, the CPU 85 (the countermeasure transmitting unit 524) determines whether countermeasures (maintenance) are necessary based on the countermeasure content. If the countermeasure content is "none", countermeasures are not necessary, and the CPU 85 therefore ends the sequence of processing. On the other hand, if the countermeasure content corresponds to transmitting a command or the like, the CPU 85 moves the sequence to step S1005.

In step S1005, the CPU 85 (the countermeasure transmitting unit 524) determines whether the notification destination is the printer 100. If the notification destination is the printer 100, the CPU 85 moves the sequence to step S1006. If the notification destination is the monitoring tool 460 (the client apparatus 450), the CPU 85 moves the sequence to step S1011.

In step S1006, the CPU 85 (the countermeasure transmitting unit 524) transmits the countermeasure content (e.g., an activation command or a deactivation command) to the printer 100. The network address of the printer 100 may be obtained from the operation history.

In step S1011, the CPU 85 (the countermeasure transmitting unit 524) transmits the countermeasure content (e.g., the preparation display or the replacement required display) to the monitoring tool 460 (the client apparatus 450). Note that the network address of the monitoring tool 460 (the client apparatus 450) is stored in the storage device 86 in advance. Additionally, the network address of the monitoring tool 460 (the client apparatus 450) may be associated with the identification information of the printer 100. Through this, the CPU 85 may identify the network address of the monitoring tool 460 (the client apparatus 450) based on the identification information of the printer 100.

Figure 11:
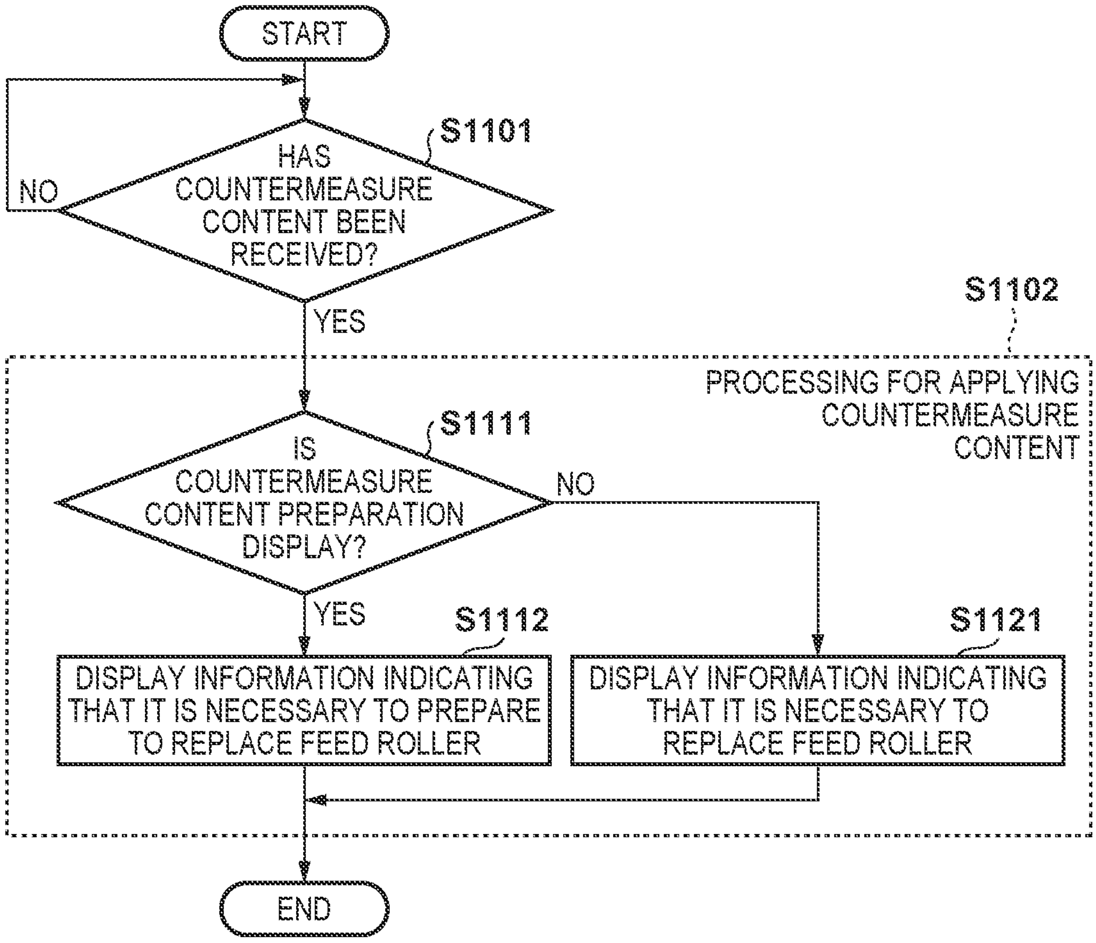
FIG. 11 is a flowchart illustrating processing for applying countermeasure content executed by a client apparatus.

FIG. 11 illustrates a sequence of processing executed by the monitoring tool 460 (the client apparatus 450).

In step S1101, the CPU 87 (the countermeasure receiving unit 561) determines whether countermeasure content has been received from the server apparatus 400. When the countermeasure content is received, the CPU 87 moves the sequence to step S1102.

In step S1102, the CPU 85 (the countermeasure application unit 562) applies the countermeasure content to the monitoring tool 460 (the client apparatus 450). The processing for applying the countermeasure content may include steps S1111, S1112, and S1121, for example.

In step S1111, the CPU 85 (the countermeasure application unit 562) determines whether the countermeasure content is a replacement preparation display. For example, if the countermeasure content is a replacement preparation display of the feed roller 22, the CPU 85 moves the sequence to step S1103. If the countermeasure content is a replacement required display for the feed roller 22, the CPU 85 moves the sequence to step S1121.

In step S1112, the CPU 85 (the countermeasure application unit 562) controls the display processing unit 563, and displays, in the operation unit 89, information indicating that it is necessary to prepare to replace the feed roller 22.

FIG. 12A illustrates an example of the information (a message) indicating that it is necessary to prepare to replace the feed roller 22. The message may include a customer name, a customer address, a printer name, and a component to be replaced (a component code). The message may include information reading "order a replacement part" as the information indicating the specific content of the preparations.

In step S1121, the CPU 85 (the countermeasure application unit 562) controls the display processing unit 563, and displays, in the operation unit 89, information indicating that it is necessary to replace the feed roller 22.

FIG. 12B illustrates an example of the information (a message) indicating that it is necessary to replace the feed roller 22. The message may include a customer name, a customer address, a printer name, and a component to be replaced (a component code). The message may include information indicating how urgent the maintenance is, such as "visit customer and replace part immediately".

According to the present embodiment, the countermeasure content and the notification destination are determined according to the usage status (the extent of wear) of the printer 100. This reduces service costs for the dealer. Note that the invention is not limited to the present embodiment. Although the present embodiment illustrates a single feed section 20, a plurality of feed sections 20 may be present. In this case, the threshold time used in step S803 may be set for each feed section 20 selected for feeding.

In the present embodiment, the countermeasure content and the notification destination are determined based on analysis results for the operation history of the feed section 20. However, this is also merely one example. The fixing apparatus 30 or the intermediate transfer member 11 may be the subject of the analysis. For example, a sheet sensor may be disposed downstream from the fixing apparatus 30, and the feed time and the jam occurrence rate J may be obtained based on a detection result from that sheet sensor. The server apparatus 400 may determine the countermeasure content and the notification destination based on the feed time for the fixing apparatus 30 and the jam occurrence rate J. Similarly, a sheet sensor may be disposed downstream from the secondary transfer roller 14, and the feed time and the jam occurrence rate J may be obtained based on a detection result from that sheet sensor. The server apparatus 400 may determine the countermeasure content and the notification destination based on the feed time for the intermediate transfer member 11 and the jam occurrence rate J.

Furthermore, the countermeasure content and the notification destination are not limited to those described in the present embodiment. "Cleaning the feed section" may be selected as the countermeasure content, and the "printer user" may be selected as the notification destination. In this case, the countermeasure content may be displayed in the operation unit 412 of the printer 100. Upon receiving the countermeasure content for the user, the CPU 80 of the printer 100 may display the countermeasure content in a display apparatus of the user's host computer (e.g., a printer driver settings screen or a pop-up screen).

Second Embodiment

In the present embodiment, the countermeasure determination unit 523 determines the countermeasure content and the notification destination based on the analysis result for the feed state from the first analyzing unit 521 and the analysis result of maintenance person information from the second analyzing unit 522. "Maintenance person information" is information pertaining to whether a maintenance person can be dispatched. In the second embodiment, descriptions that are the same as in the first embodiment will be omitted, and parts that are different from those in the first embodiment will be described in detail.

Descriptions of Functions

Figure 13:
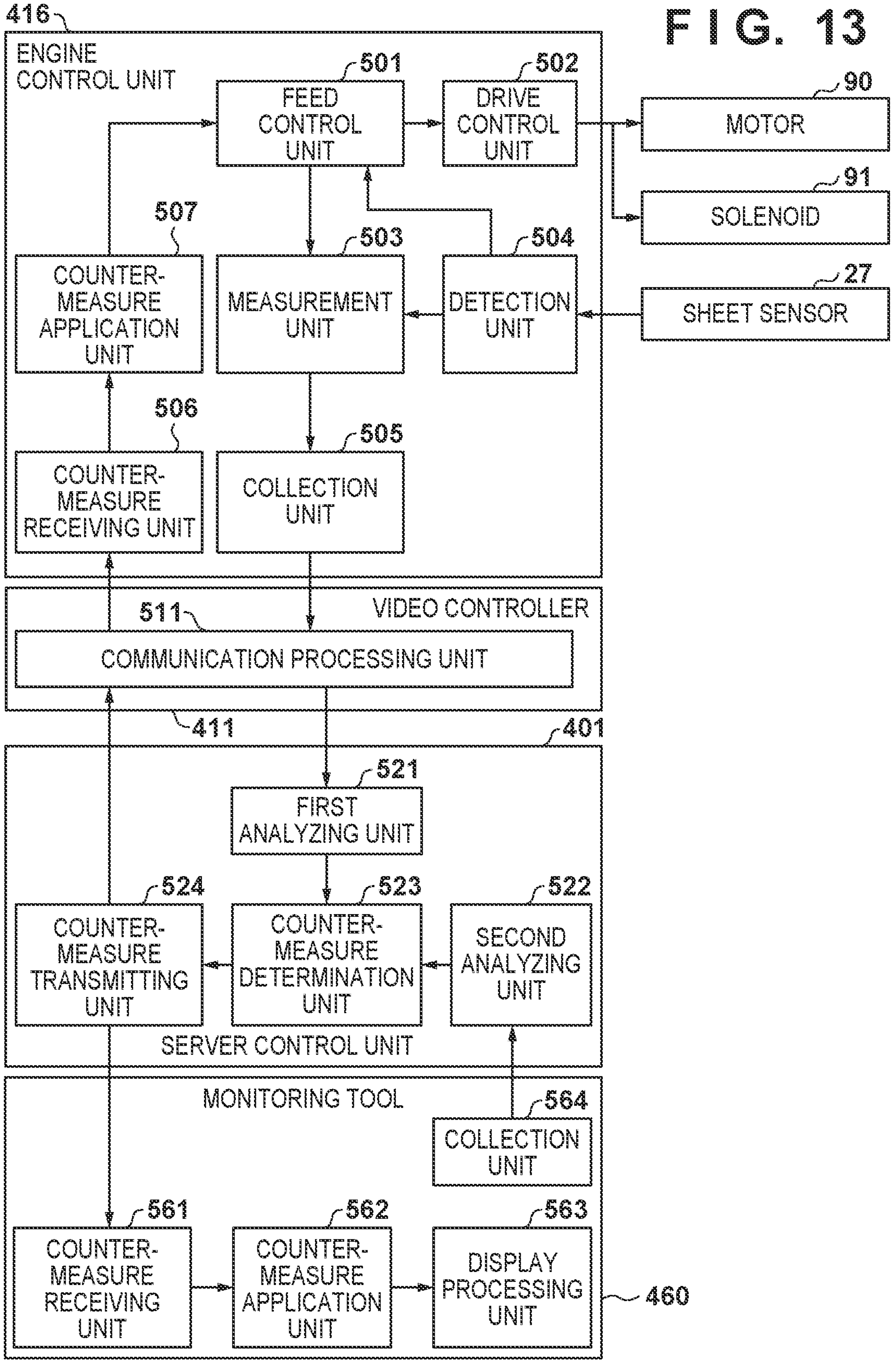
FIG. 13 is a block diagram illustrating functions according to a second embodiment.

FIG. 13 is a block diagram illustrating the engine control unit 416, the server control unit 401, and the monitoring tool 460 according to the present embodiment. The differences from the first embodiment are the following three points. The first is that a collection unit 564 collects predetermined maintenance person information pertaining to the dispatch of a maintenance person (e.g., a dispatch schedule). The second is that the second analyzing unit 522 analyzes the maintenance person information collected from the collection unit 564. The third is that the countermeasure determination unit 523 determines the countermeasure content and the notification destination based on the analysis result from the first analyzing unit 521 and the analysis result from the second analyzing unit 522 (whether a maintenance person can be dispatched).

The monitoring tool 460 includes the collection unit 564, which collects the predetermined maintenance person information. The collection unit 564 is implemented by the CPU 87 executing a program stored in the storage device 88. For example, the collection unit 564 collects schedule information determined in advance by the dealer (days of the week and time periods during which a maintenance person can be dispatched) from the storage device 88. In the present embodiment, when the dealer has installed the printer 100 at a customer location, the dealer may generate schedule information through the monitoring tool 460 and store the schedule information in the storage device 88.

FIG. 14 is a settings screen illustrating the schedule information displayed by the collection unit 564 in the display apparatus of the operation unit 89. A maintenance person of the dealer checks check boxes corresponding to the days of the week on which they can be dispatched, and enters a time period in which they can be dispatched. In the example illustrated in FIG. 14, the maintenance person can be dispatched between 10:00 AM and 5:00 PM, Monday to Friday.

The second analyzing unit 522 of the server control unit 401 obtains the schedule information from the collection unit 564, and determines whether the maintenance person can be dispatched by analyzing the schedule information. For example, the second analyzing unit 522 obtains the current time from the timer 403, verifies the current time against the schedule information, and determines whether the maintenance person can be dispatched at the current time. More specifically, when the current time falls within the time period in which the maintenance person can be dispatched, the second analyzing unit 522 determines that the state of the maintenance person is "able to be dispatched". On the other hand, when the current time falls outside of the time period in which the maintenance person can be dispatched, the second analyzing unit 522 determines that the state of the maintenance person is "unable to be dispatched".

The countermeasure determination unit 523 of the server control unit 401 determines the countermeasure content and the notification destination based on a combination of the analysis result from the first analyzing unit 521 and the analysis result from the second analyzing unit 522. In the present embodiment, the countermeasure content and the notification destination are determined based on the combination of the feed state and the state of the maintenance person.

FIG. 15 illustrates a determination table stored in the storage device 88. The countermeasure determination unit 523 refers to the determination table and determines the combination of the countermeasure content and notification destination corresponding to the combination of the feed state and the state of the maintenance person.

- If the state of the maintenance person is "able to be dispatched" and the feed state is "unknown", "very good", or "good", the countermeasure content is "none", and the notification destination is also "none".
- If the state of the maintenance person is "able to be dispatched" and the feed state is "poor", the countermeasure content is "replacement preparation display", and the notification destination is "monitoring tool".
- If the state of the maintenance person is "able to be dispatched" and the feed state is "very poor", the countermeasure content is "replacement required display", and the notification destination is "monitoring tool".
- If the state of the maintenance person is "unable to be dispatched" and the feed state is "unknown", "very good", or "good", the countermeasure content is "none", and the notification destination is also "none".
- If the state of the maintenance person is "unable to be dispatched" and the feed state is "poor", the countermeasure content is "retry active", and the notification destination is "printer".
- If the state of the maintenance person is "unable to be dispatched" and the feed state is "very poor", the countermeasure content is "retry active", and the notification destination is "printer".

In this manner, if the state of the maintenance person is "able to be dispatched", the notification destination is the monitoring tool 460. If the state of the maintenance person is "unable to be dispatched", the notification destination is the printer. This reduces the occurrence of jams, as well as the number of service dispatches, even when the feed state deteriorates on days of the week or in time periods when a maintenance person cannot be dispatched.

Flowcharts

In the present embodiment, the operations of the printer 100 are as described in the first embodiment. The countermeasure application processing by the monitoring tool 460 is also the same as that described in the first embodiment. The following will therefore describe in detail processing for collecting the schedule information by the monitoring tool 460, and processing for determining countermeasures by the server apparatus 400.

Figure 16:
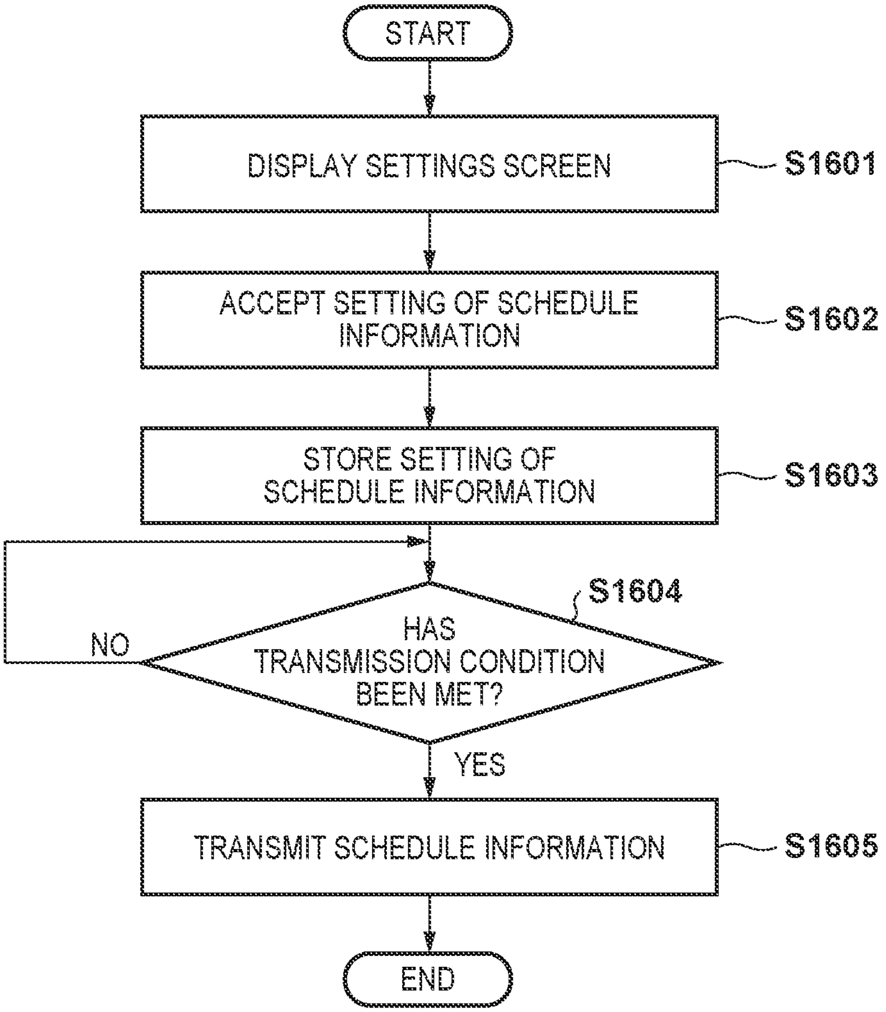
FIG. 16 is a flowchart illustrating a method for setting schedule information executed by the client apparatus.

FIG. 16 illustrates schedule information collection processing executed by the CPU 87 (the monitoring tool 460) of the client apparatus 450.

In step S1601, the CPU 87 (the collection unit 564) displays a schedule information settings screen in the display apparatus of the operation unit 89. A settings screen such as that illustrated in FIG. 14 is displayed, for example.

In step S1602, the CPU 87 (the collection unit 564) accepts the setting of the schedule information through the input apparatus of the operation unit 89. For example, a time period in which a maintenance person can be dispatched is set for each day of the week. Although schedule information for one week is indicated in this example, the schedule information may be set on a monthly basis.

In step S1602, the CPU 87 (the collection unit 564) stores the schedule information in the storage device 88.

In step S1604, the CPU 87 (the collection unit 564) determines whether a schedule information transmission condition has been met. The transmission condition may be, for example, that a transmission instruction has been received from the server apparatus 400. The transmission condition may be that the current date/time has reached a predetermined transmission date/time. If the transmission condition is met, the CPU 87 moves the sequence to step S1605.

In step S1605, the CPU 87 (the collection unit 564) reads out the schedule information from the storage device 88 and transmits the schedule information to the server apparatus 400.

Figure 17:
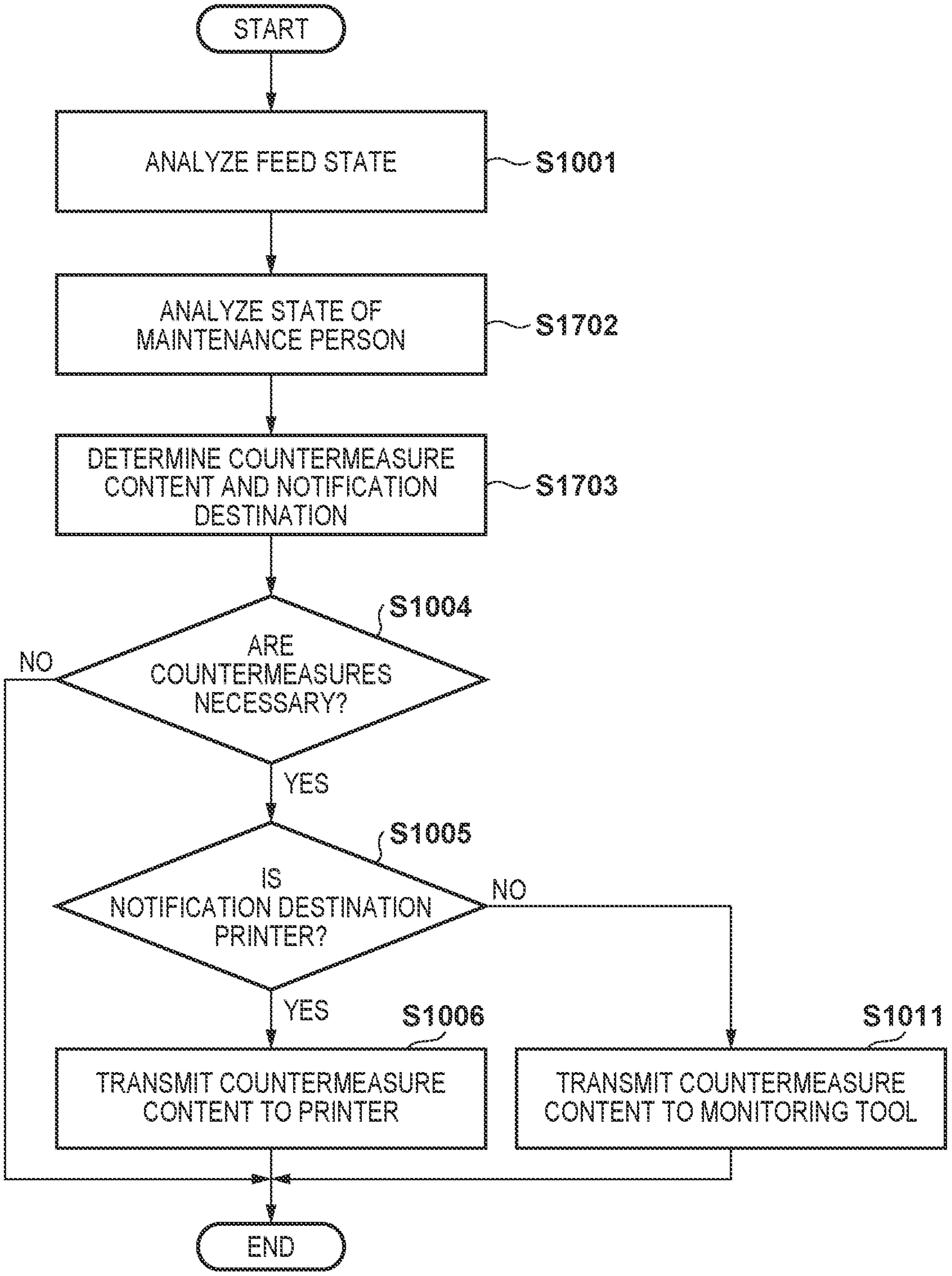
FIG. 17 is a flowchart illustrating a method for determining countermeasure content and a notification destination executed by the server apparatus.

FIG. 17 is a diagram illustrating countermeasure determination processing executed by the CPU 85 of the server apparatus 400. Of the plurality of instances of processing illustrated in FIG. 17, the processing described in the first embodiment will be given the same reference signs and will not be described. Steps S1002 and S1003 in FIG. 10 have been replaced with steps S1702 and S1703, respectively.

In step S1702, the CPU 85 (the second analyzing unit 522) obtains the schedule information from the client apparatus 450 of the dealer, and analyzes the state of the maintenance person based on the schedule information. For example, the second analyzing unit 522 obtains the current day of the week and the current time from the timer 403, verifies those items against the schedule information, and determines whether the maintenance person can be dispatched.

In step S1703, the CPU 85 (the countermeasure determination unit 523) determines the countermeasure content and the notification destination based on the analysis result of the feed state from the first analyzing unit 521 and the analysis result of the state of the maintenance person from the second analyzing unit 522. The countermeasure determination unit 523 may determine the countermeasure content and the notification destination by referring to the determination table illustrated in FIG. 15.

According to the present embodiment, the countermeasure content and the notification destination are determined in consideration of predetermined schedule information of a maintenance person. Through this, on days of the week or in time periods when the maintenance person is not working, the occurrence of jams is suppressed by countermeasures taken by the printer 100, without relying on the maintenance person. Furthermore, the likelihood of service dispatch requests is reduced, which reduces service costs for the dealer.

In the present embodiment, the countermeasure content and the notification destination are determined based on predetermined schedule information, but this is merely one example. The countermeasure content and the notification destination may be determined based on a management policy for each dealer, such as "perform maintenance more actively" or "perform maintenance less actively". For example, when "perform maintenance more actively" is selected by the dealer, the notification destination is the monitoring tool 460. On the other hand, when "perform maintenance less actively" is selected by the dealer, the notification destination is the printer 100. Note that the countermeasure content is determined depending on the feed state, as illustrated in FIG. 15.

Third Embodiment

In the present embodiment, the countermeasure determination unit 523 determines the countermeasure content and the notification destination based on an analysis result for the feed state from the first analyzing unit 521 and an analysis result for the maintenance person information from the second analyzing unit 522. The maintenance person information may be obtained, for example, through an interaction between the server apparatus 400 and the client apparatus 450. In the present embodiment, matters that are the same as in the first embodiment or the second embodiment will not be described, and matters that are different from those in the first embodiment and the second embodiment will be described in detail.

Descriptions of Functions

Figure 18:
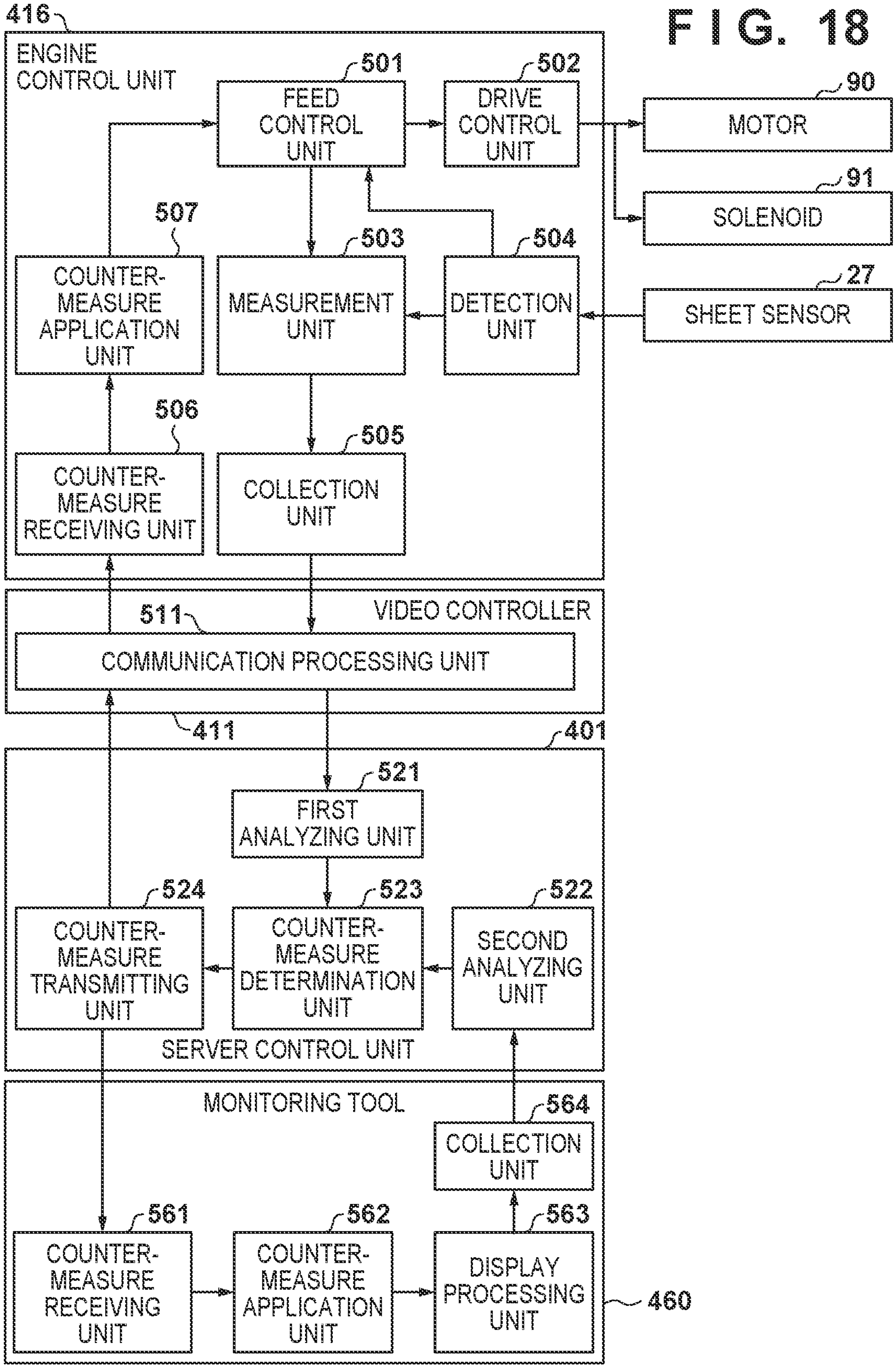
FIG. 18 is a block diagram illustrating functions according to a third embodiment.

FIG. 18 is a block diagram illustrating the server control unit 401 and the monitoring tool 460. The differences from the second embodiment are the following two points. The first is that the collection unit 564 collects maintenance person information indicating whether the maintenance person can immediately execute the countermeasure content displayed in the operation unit 89 through the display processing unit 563. The second is that the second analyzing unit 522 analyzes the maintenance person information collected by the collection unit 564.

In the present embodiment, the collection unit 564 collects maintenance person information indicating whether the maintenance person can immediately execute the countermeasure content for a dealer displayed in the display apparatus of the operation unit 89. For example, when the countermeasure receiving unit 561 receives a command for the "replacement preparation display" or the "replacement required display" from the server apparatus 400, the countermeasure application unit 562 displays the countermeasure content in the operation unit 89 through the display processing unit 563 in accordance with the command. Furthermore, the display processing unit 563 displays, in the operation unit 89, a message (a response screen) prompting the maintenance person to input a response as to whether the countermeasure content can be executed immediately. The collection unit 564 collects the response entered through the response screen and transmits the response to the second analyzing unit 522.

The second analyzing unit 522 of the server control unit 401 analyzes the response received from the collection unit 564 (information indicating whether the maintenance person can immediately execute the countermeasure content) and determines the state of the maintenance person. For example, if the maintenance person can execute the countermeasure content immediately, the state of the maintenance person is determined to be "able to be dispatched". On the other hand, if the maintenance person cannot execute the countermeasure content immediately, the state of the maintenance person is determined to be "unable to be dispatched".

Through this, when the maintenance person cannot be dispatched immediately due to unexpected trouble or the like, the occurrence of jams is reduced by countermeasures taken by the printer 100. This also reduces the likelihood of requests for service dispatches.

Flowcharts

Figure 19:
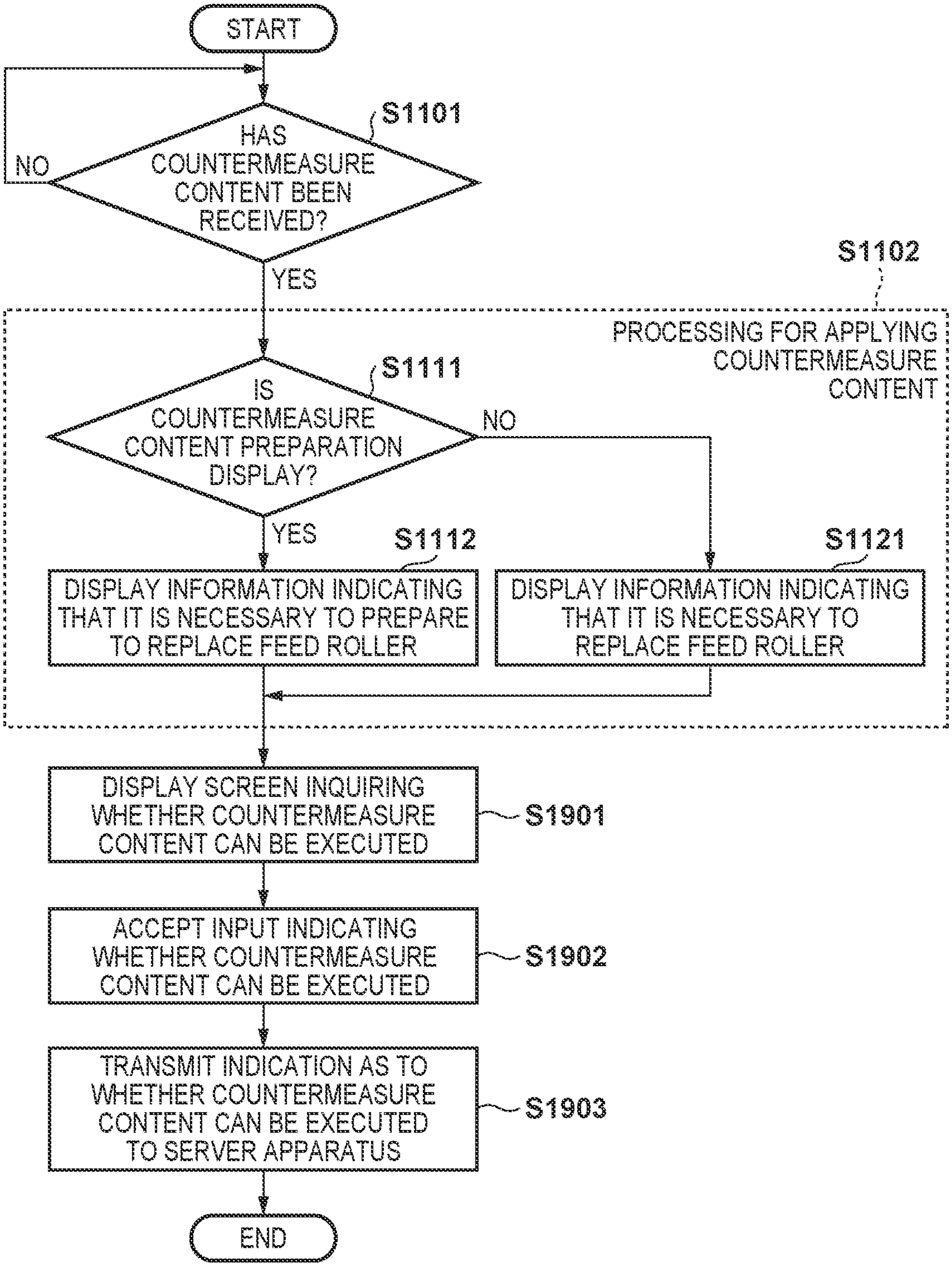
FIG. 19 is a flowchart illustrating processing for applying countermeasure content executed by the client apparatus.

FIG. 19 is a flowchart illustrating operations performed by the monitoring tool 460. Steps S1901 to S1903 have been added after steps S1112 and S1121.

Figure 20:
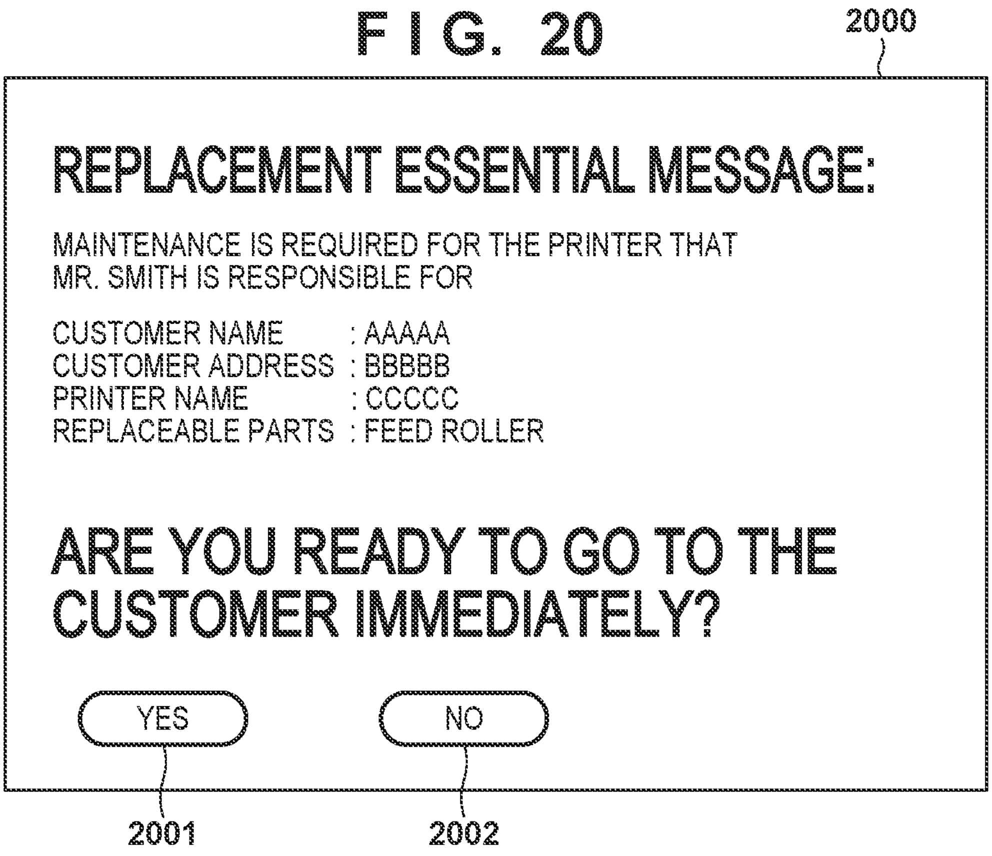
FIG. 20 is a diagram illustrating a screen for inquiring whether a maintenance person can be dispatched.

In step S1901, the CPU 87 (the display processing unit 563) displays, in the display apparatus of the operation unit 89, a screen inquiring whether the countermeasure content can be executed. FIG. 20 illustrates an example of an inquiry screen 2000. In this example, the inquiry screen 2000 is used in conjunction with a countermeasure content display screen. The inquiry screen 2000 includes a button 2001 for making a response indicating that the countermeasure content can be executed immediately, and a button 2002 for making a response indicating that the countermeasure content cannot be executed immediately. In this example, the button 2001 is pressed when the maintenance person can be dispatched immediately. The button 2002 is pressed when the maintenance person cannot be dispatched immediately.

In step S1902, the CPU 87 (the collection unit 564) accepts an input indicating whether the countermeasure content can be executed through the operation unit 89. For example, the collection unit 564 may detect that the button 2001 or the button 2002 has been pressed through the operation unit 89, and determine whether the maintenance person can be dispatched.

In step S1903, the CPU 87 (the collection unit 564) transmits, to the server apparatus 400, an indication as to whether the countermeasure content can be executed.

Figure 21:
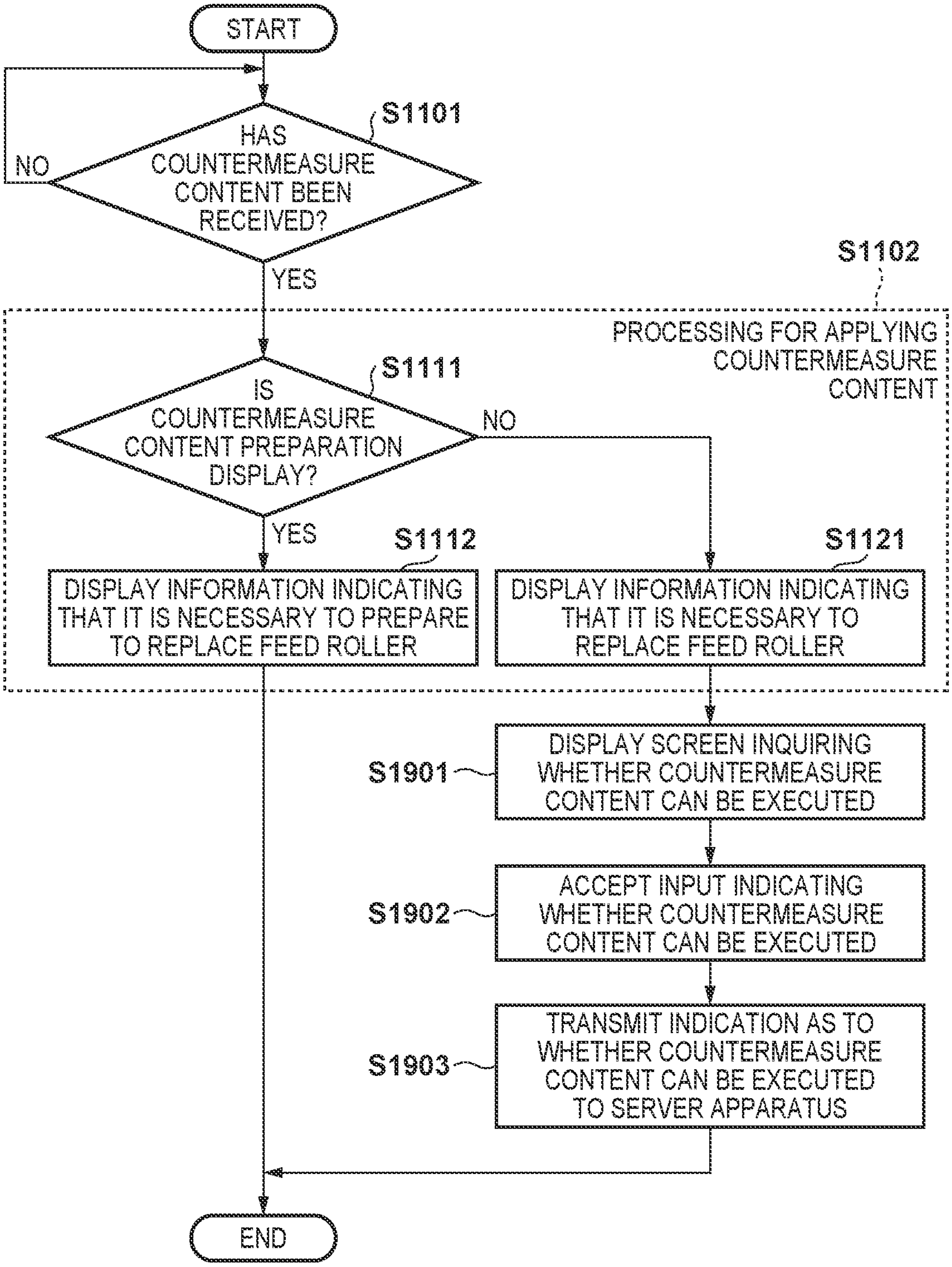
FIG. 21 is a flowchart illustrating processing for applying countermeasure content executed by the client apparatus.

In FIG. 19, whether the countermeasure content can be executed is entered even when the countermeasure content is the "replacement preparation display". However, as illustrated in FIG. 21, steps S1901 to S1903 may be added only after step S1121. In other words, whether the countermeasure content can be executed may be entered only when the countermeasure content is the "replacement required display".

Figure 22:
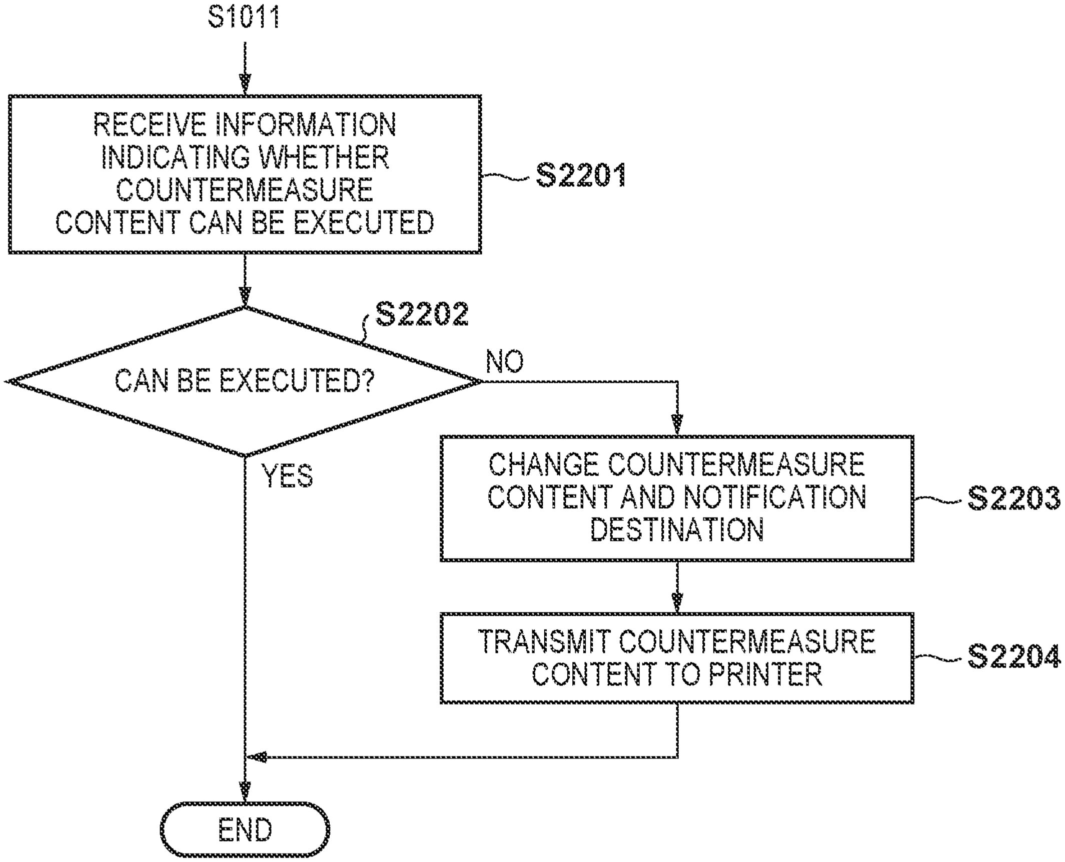
FIG. 22 is a flowchart illustrating part of a method for determining countermeasure content and a notification destination executed by the server apparatus.

FIG. 22 is a diagram illustrating countermeasure content and notification destination determination processing executed by the CPU 85 of the server apparatus 400. Steps S2201 to S2204 are added after step S1011 in FIG. 10 or step S1011 in FIG. 17.

In step S2201, the CPU 85 (the second analyzing unit 522) receives information indicating whether the countermeasure content can be executed from the client apparatus 450.

In step S2202, the CPU 85 (the second analyzing unit 522) determines whether the maintenance person can execute the countermeasure content immediately based on the information indicating whether the countermeasure content can be executed. If the countermeasure content can be executed immediately, the countermeasure content and the notification destination are kept as-is. On the other hand, if the countermeasure content cannot be executed, the CPU 85 moves the sequence to step S2203. Note that the second analyzing unit 522 outputs a signal indicating that the countermeasure content cannot be executed to the countermeasure determination unit 523. Note also that the second analyzing unit 522 may change the state of the maintenance person from "able to be dispatched" to "unable to be dispatched".

In step S2203, the CPU 85 (the countermeasure determination unit 523) changes the countermeasure content and the notification destination. In other words, the countermeasure determination unit 523 refers to the determination table illustrated in FIG. 15, and determines a combination of the countermeasure content and the notification destination corresponding to the combination of "unable to be dispatched" and the feed state. In this example, the countermeasure content is changed to "retry active", and the notification destination is changed to the printer.

In step S2203, the CPU 85 (the countermeasure transmitting unit 524) transmits the countermeasure content to the printer 100, which is the updated notification destination. In this case, a "retry activation" command is transmitted as the countermeasure content.

According to the present embodiment, the countermeasure content and the notification destination are determined according to an unexpected change in the plans of the maintenance person. This reduces the occurrence of jams even when the maintenance person cannot be dispatched to the customer immediately. Furthermore, the likelihood of service dispatch requests is reduced, which reduces service costs for the dealer.

In the present embodiment, the countermeasure content and the notification destination determined from the feed state and the schedule information are updated in accordance with whether the maintenance person can currently be dispatched, but this is merely one example. The countermeasure content and the notification destination may be determined according to the feed state and whether the maintenance person can currently be dispatched. In the latter case, the schedule information described in the second embodiment need not be taken into account.

Technical Spirit Derived from Embodiments

The countermeasure content may be determined based on state information of the image forming apparatus. The notification destination is determined according to the countermeasure content. This optimizes the notification destination.

The CPU 85 may execute a second analysis on the state information or as to whether a maintenance person for the image forming apparatus can be dispatched, and take into account both the analysis result of a first analysis and an analysis result of the second analysis. This further optimizes the notification destination.

By analyzing the operation history from two different perspectives, the countermeasure content and the notification destination can be optimized.

The countermeasure content and the notification destination thereof may be optimized according to the number of occurrences of a jam or the occurrence rate J.

The image forming apparatus includes a plurality of parts that require maintenance, such as the feed section 20. Accordingly, the maintenance content (countermeasure content) for a part is determined appropriately by obtaining the operation history for that part.

Variation in measurement results of sheet transport performance is correlated with the extent of wear in the feed roller. Accordingly, the extent of wear in the feed roller can be accurately estimated by taking this variation into account. The countermeasure content and notification destination are appropriately determined based on the extent of wear and error parameters.

The countermeasure content (e.g., a retry activation command) may be transmitted to the printer 100. In this case, the CPU 80 or the video controller 411 may display information indicating that retrying the feed operation has been activated in the operation unit 412 (the operation panel).

The replacement preparation display or the replacement required display may be transmitted to the client apparatus 450 as the countermeasure content.

As described in the second and third embodiments, dispatch state information pertaining to whether the maintenance person can be dispatched may be used to determine the countermeasure content and the notification destination. The dispatch state information may be, for example, the schedule information of the maintenance person, or may be information indicating whether the maintenance person can be dispatched at the current time.

If the maintenance person cannot be dispatched, retrying the feed operation may be activated. Through this, jams in the image forming apparatus are reduced even if the maintenance person cannot be dispatched.

As illustrated in FIG. 20, an inquiry message may be provided to the client apparatus 450 along with the countermeasure content. A response as to whether the maintenance person can be dispatched is an example of a "response". As illustrated in FIG. 22, in cases where it is necessary to prepare to replace the feed roller, dispatching the maintenance person is not very urgent, and thus the inquiry message need not be displayed.

If it is necessary (required) to replace the feed roller, dispatching the maintenance person is highly urgent, and thus the inquiry message may be displayed.

In cases where maintenance is necessary for the feed roller and the maintenance person cannot be dispatched immediately, the countermeasure content and the notification destination may be changed. This makes jams less likely to occur, and also reduces the number of service dispatches, which reduces service costs.

The information indicating whether a jam has occurred may be indicated by predetermined unique time information (e.g., a negative value), as the elapsed time.

This reduces the amount of information transmitted from the image forming apparatus to the server apparatus. Additionally, the memory required to store the operation history from the image forming apparatus can be reduced in the server apparatus.

Fourth Embodiment

Image Forming Apparatus

The printer 100 is as illustrated in FIG. 1. Note that the sheet sensor 27 illustrated in FIG. 1 and the like will be referred to as a "sheet sensor 27*a*" hereinafter.

Feed Section

Figure 23A:
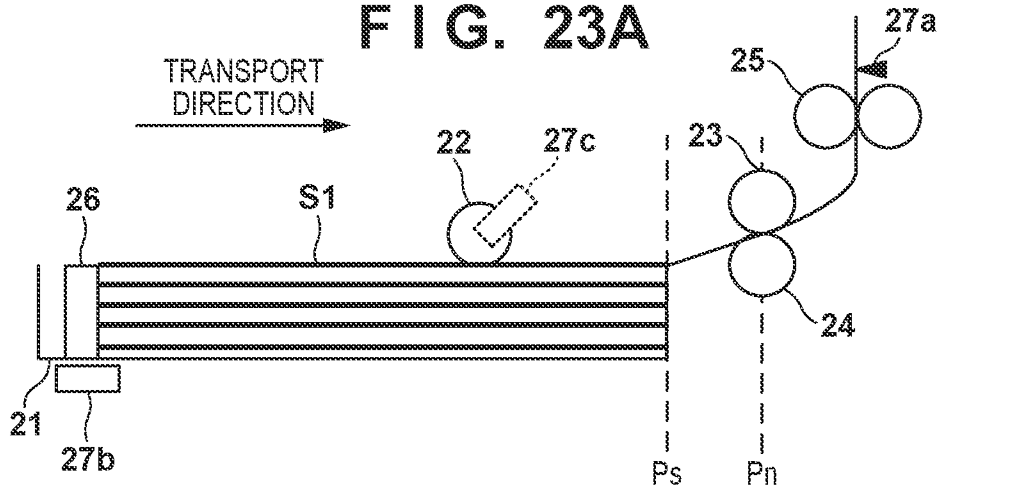
FIGS. 23A to 23C are cross-sectional views of a feed section.
Figure 23B:
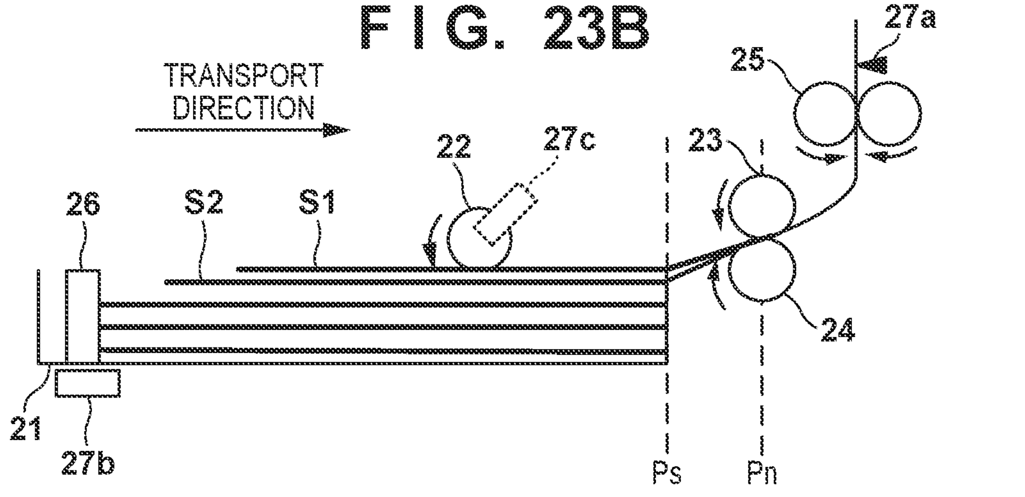
Figure 23C:
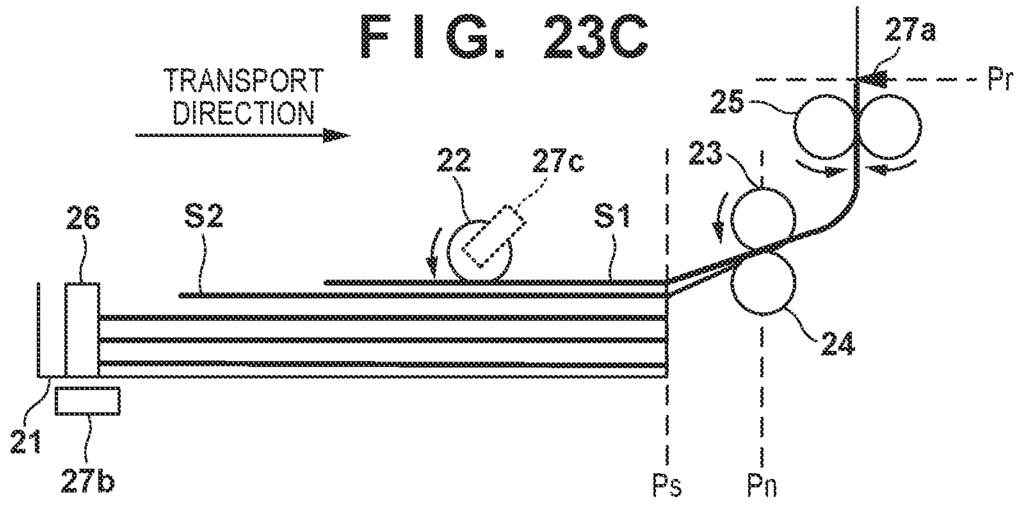

FIGS. 23A to 23C illustrate a feed operation performed by the feed section 20. As illustrated in FIG. 23A, the sheet S1, which is the uppermost of the plurality of sheets S held in the feed cassette 21, is fed by the feed roller 22. The plurality of sheets S in the feed cassette 21 are positioned by the trailing edge regulation plate 26. The trailing edge regulation plate 26 is configured to freely move in both the transport direction and the direction opposite thereto. The user changes the installation position of the trailing edge regulation plate 26 as appropriate in accordance with the size of the sheet S. A cassette sensor 27*b* is a sensor that detects the opening and closing of the feed cassette 21. Here, "open" refers to the feed cassette 21 being pulled out from the printer 100. "Closed" refers to the feed cassette 21 being inserted into the printer 100. The user pulls out the feed cassette 21 and refills the sheets S, changes the size of the sheets S, changes the installation position of the trailing edge regulation plate 26, and the like.

When the trailing edge regulation plate 26 is installed such that the trailing edge regulation plate 26 contacts the trailing edge of the sheet S, the leading edge of the sheet S1 is located at the transport start position Ps. When the feed operation is started, the feed roller 22 and the transport roller 23 both rotate. The sheet S1 moves to the right (the transport direction) due to friction between the feed roller 22 and the sheet S1. A component sensor 27*c* is optional, and is a sensor that detects whether the feed roller 22 has been replaced. For example, the component sensor 27*c* may detect that a feed roller 22 which had been used for a long period of time has been replaced with a new feed roller 22.

Then, as illustrated in FIG. 23B, the sheet S1 reaches the separation nip Pn formed by the transport roller 23 and the separation roller 24. Friction also acts between the sheet S1 and the sheet S2 located under the sheet S1. Accordingly, the sheet S2 may also move in the transport direction. When at least two sheets S are transported to the separation nip Pn by the feed roller 22, the separation nip Pn separates one sheet S from the at least two sheets S and transports the one sheet S downstream. A torque limiter (not shown) is connected to the separation roller 24. A predetermined torque is applied to the separation roller 24. As a result, the separation roller 24 applies resistance to the sheet S2 in a direction opposite from the transport direction of the sheet S1. This torque is set such that the separation roller 24 is rotated along with the transport roller 23 when there is one sheet S at the separation nip Pn, and the separation roller 24 is stopped when at least two sheets S enter the separation nip Pn. Accordingly, the separation nip Pn can separate and transport the sheets S one at a time.

Thereafter, as the feed roller 22 and the transport roller 23 continue to rotate, the sheet S1 passes through the registration roller pair 25, as illustrated in FIG. 23C. As a result, the leading edge of the sheet S1 reaches a position at which that leading edge is detected by the sheet sensor 27*a* (the detection position Pr). The time that passes from the timing at which the feed operation starts to the timing at which the sheet S1 reaches the sheet sensor 27*a* is called a "feed time".

Figure 24A:
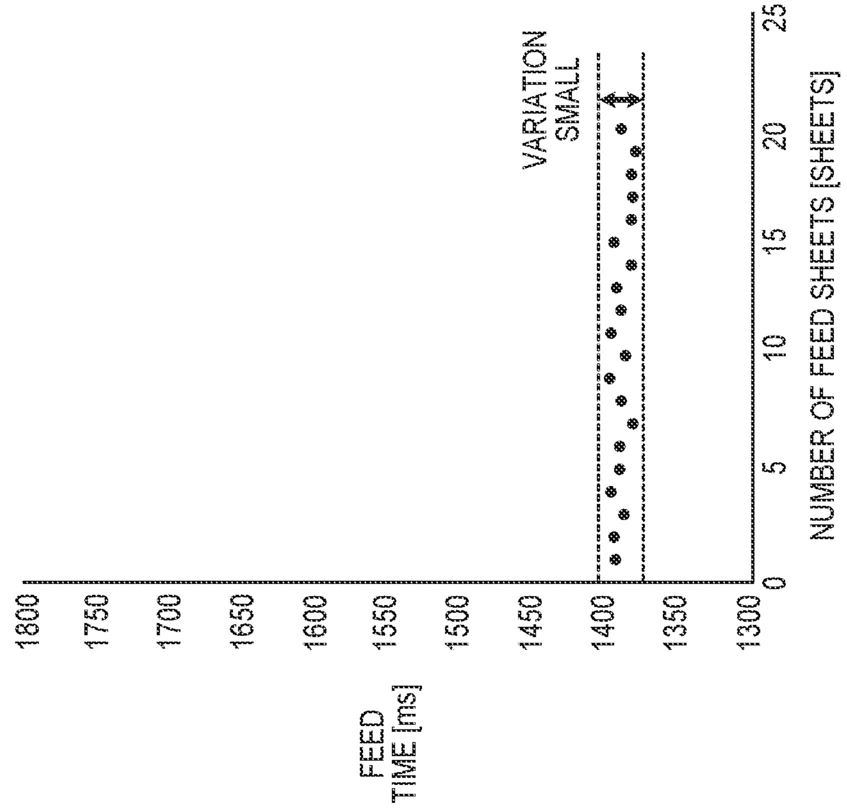
FIGS. 24A and 24B are diagrams illustrating variation in a feed time.
Figure 24B:
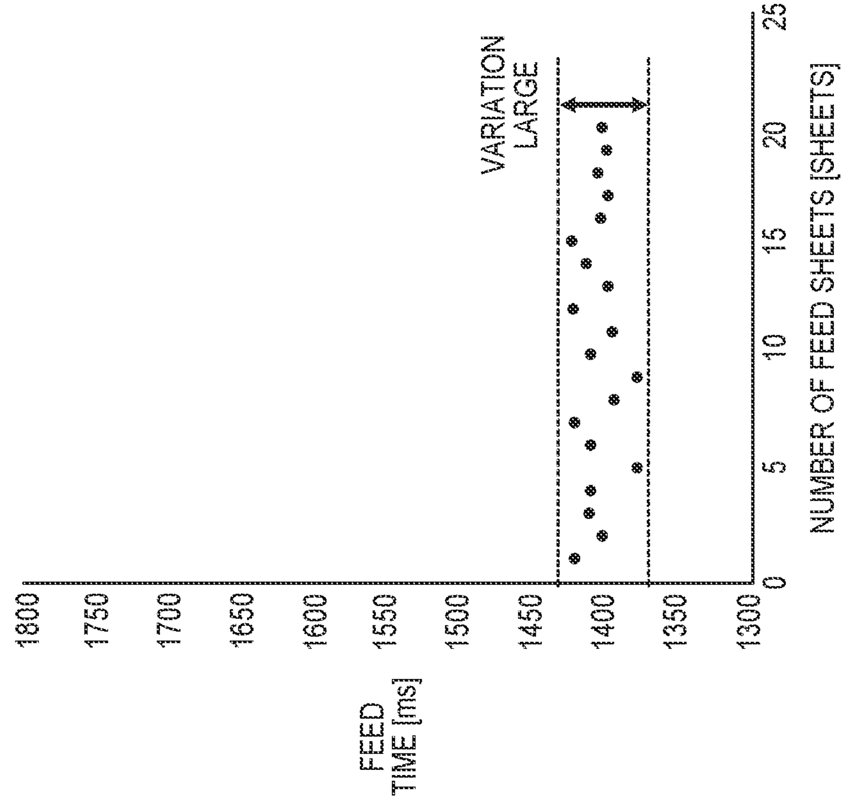

FIGS. 24A and 24B illustrate a plurality of feed times when the feed operation is repeatedly executed. In particular, FIG. 24A illustrates the feed time when 20 feed operations are executed while the leading edge of the sheet S is at the transport start position Ps and the trailing edge of the sheet S is in contact with the trailing edge regulation plate 26. FIG. 24B illustrates the feed time when 20 feed operations are executed while the leading edge of the sheet S is at the transport start position Ps and the trailing edge of the sheet S is about 5 mm from the trailing edge regulation plate 26. As illustrated in FIG. 24A, variation in the feed time decreases when the trailing edge regulation plate 26 is installed in an appropriate position. As illustrated in FIG. 24B, variation in the feed time increases when the trailing edge regulation plate 26 is installed in an inappropriate position. The printer 100 may detect the occurrence of a jam due to the installation position of the trailing edge regulation plate 26 being inappropriate.

Hardware

Figure 25:
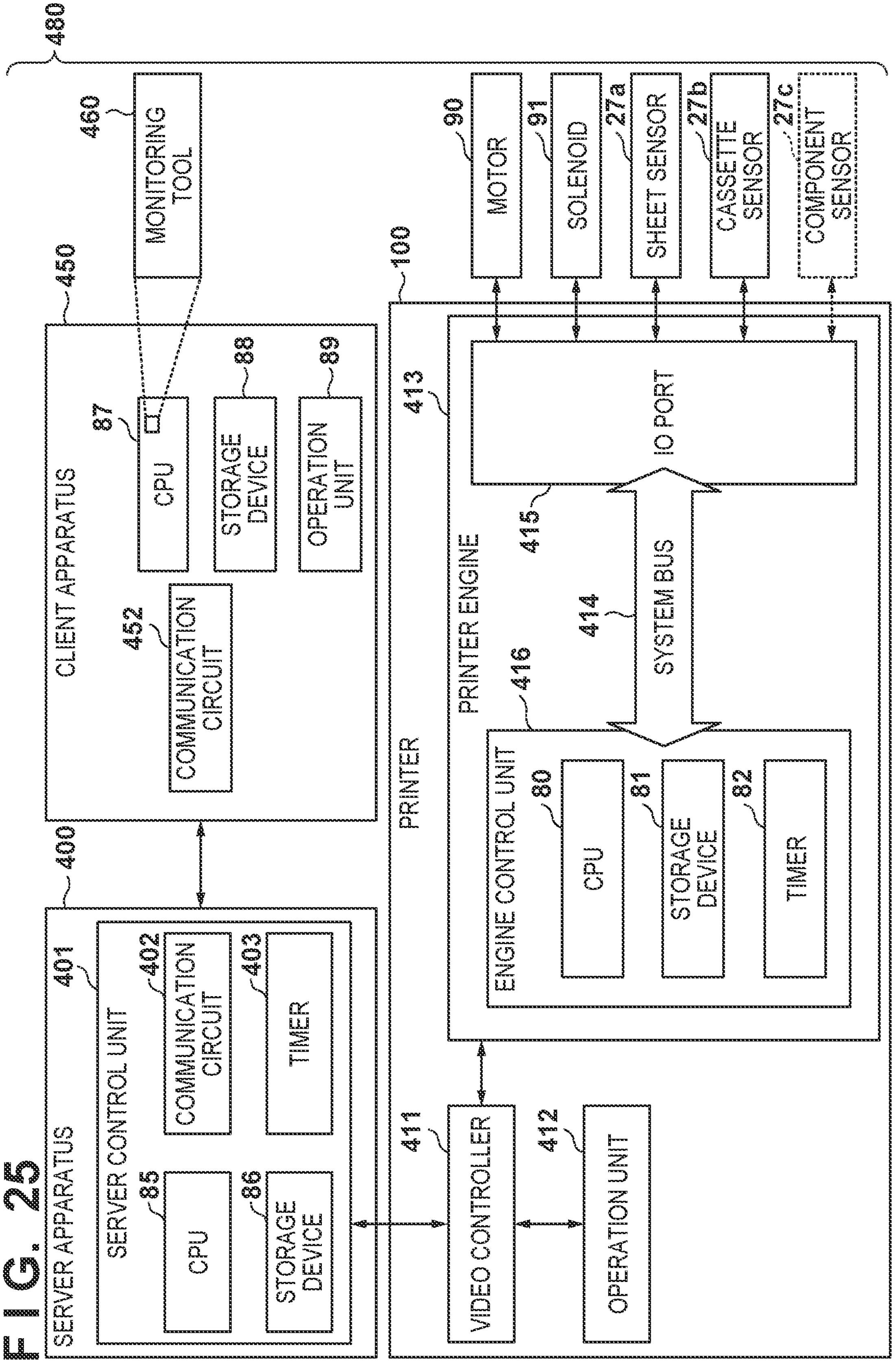
FIG. 25 is a diagram illustrating hardware.

FIG. 25 is a diagram illustrating the hardware configurations of the printer 100, the server apparatus 400, and the client apparatus 450 included in an image forming system 480. The following will describe the differences between the components illustrated in FIG. 25 and FIG. 4.

The timer 82 can include a real-time clock (RTC), a counter circuit that counts clock signals, or the like. The CPU 80 obtains the date/time using the timer 82, measures the length of time from one timing to another, and the like.

The CPU 80 implements various functions by executing programs. The CPU 80 receives detection results from the sheet sensor 27*a*, the cassette sensor 27*b*, and the component sensor 27*c* through the system bus 414 and the IO port 415, and supplies drive signals to the motor 90 and the solenoid 91.

Descriptions of Functions

Figure 26:
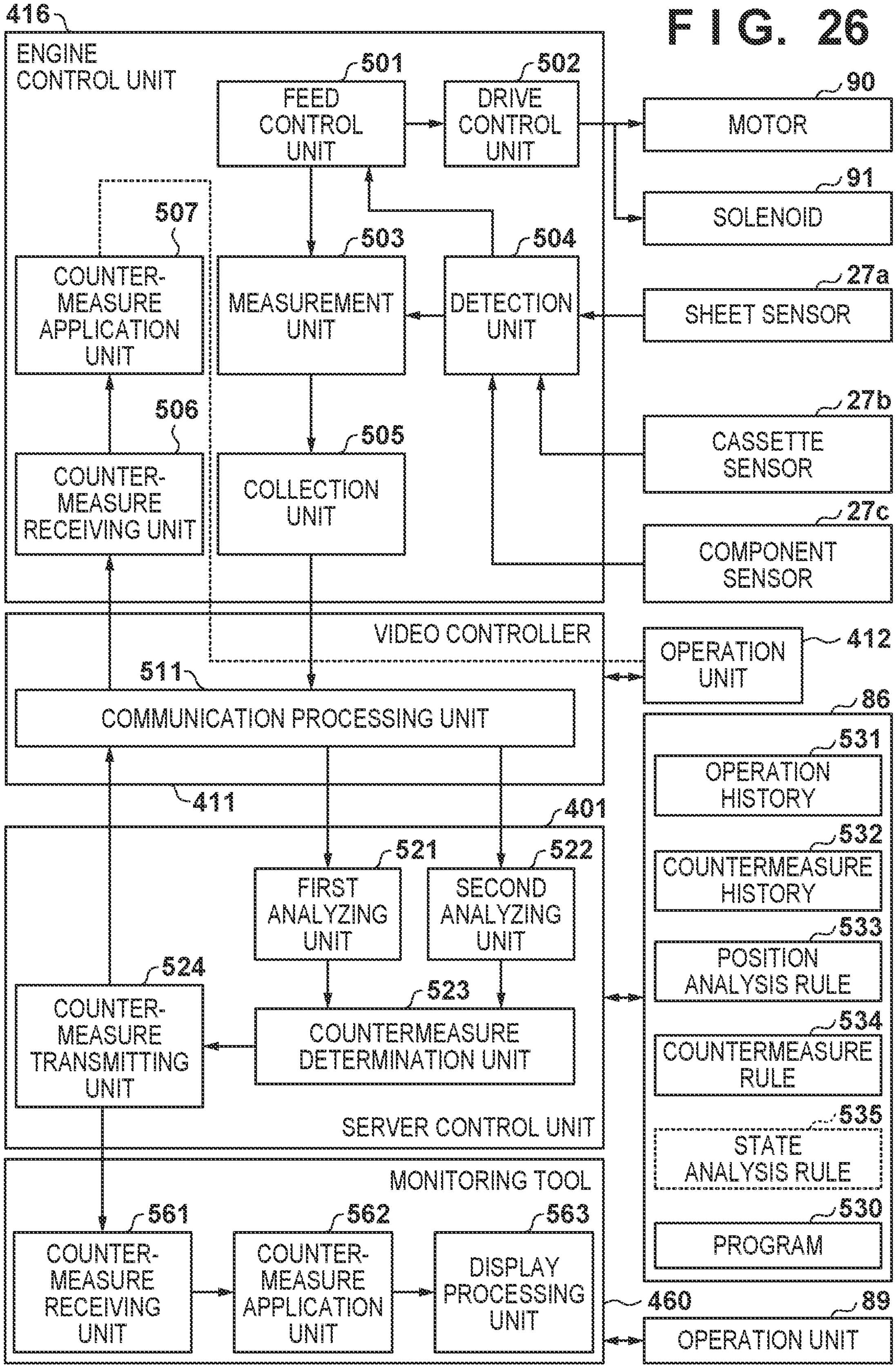
FIG. 26 is a block diagram illustrating functions of a control unit.

FIG. 26 illustrates the functions of the engine control unit 416, the video controller 411, the server control unit 401, and the monitoring tool 460. The following will describe the differences from FIG. 5.

The detection unit 504 determines whether the feed cassette 21 has been opened/closed based on the detection result from the cassette sensor 27*b*, and writes the result of the determination to the storage device 81 or passes the result to the collection unit 505. The detection unit 504 determines whether a component (e.g., the feed roller 22) has been replaced based on the detection result from the component sensor 27*c*, and writes the result of the determination to the storage device 81 or passes the result to the collection unit 505. Date/time data indicating the date/time obtained from the timer 82 may be associated with these determination results.

The measurement unit 503 measures the feed time. Using the timer 82, the measurement unit 503 measures the time that passes from the timing at which the feed control unit 501 instructs the feed operation to be performed to the timing at which the leading edge of the sheet S reaches the sheet sensor 27*a*. The measurement unit 503 adds date/time data indicating the date and time at which the measurement was executed (called a "feed date/time" hereinafter) to the elapsed time each time a single sheet S is fed, and saves the resulting data in the storage device 81. Note that if a jam has occurred, a negative value (e.g., −1), indicating that a measurement cannot be taken, is stored as the feed time.

The collection unit 505 collects the operation history of the printer 100. For example, the collection unit 505 reads out the feed date/time and the feed time saved in the storage device 81 by the measurement unit 503, and transmits those items to the communication processing unit 511 of the video controller 411. The communication processing unit 511 communicates the feed date/time, the feed time, and identification information of the printer 100 (e.g., a model number or a manufacturing serial number) to the server control unit 401. The server control unit 401 stores the feed date/time, a type code, the feed time, and the identification information that have been received in the storage device 86.

FIG. 27A illustrates an example of an operation history 531 stored in the storage device 86. The operation history 531 is stored in association with the identification information of the printer 100. In this example, one record includes the date/time data, the type code, and the feed time. Here, the type code is a code indicating the type of information included in the record. A type code of "0" indicates that the measurement result included in the record is the feed time. A type code of "1" indicates that the feed cassette 21 has been opened/closed at the date/time indicated by the date/time data. In other words, the date/time data indicates the date/time at which the feed cassette 21 was opened/closed (an opening/closing date/time). The date/time data may indicate a date/time at which the feed cassette 21 has been opened, or may indicate a date/time at which the feed cassette 21 has been closed. Alternatively, the date/time data may indicate both the date/time at which the feed cassette 21 has been opened and the date/time at which the feed cassette 21 has been closed. As described above, −1, indicating that the jam cannot be measured, is stored for the feed time when a jam occurs.

The engine control unit 416 further includes the countermeasure receiving unit 506 and the countermeasure application unit 507. In the fourth embodiment, the operation of the feed control unit 501 may be changed by the server apparatus 400 based on the operating state of the feed section 20 and the analysis result for the jam occurrence rate. The countermeasure receiving unit 506 receives countermeasure content from the countermeasure transmitting unit 524 of the server control unit 401.

The countermeasure content is, for example, a message prompting the user to change the installation position of the trailing edge regulation plate 26 being displayed in the operation unit 412. The countermeasure application unit 507 displays the countermeasure content received by the countermeasure receiving unit 506 in the operation unit 412.

The countermeasure content may be an instruction to activate/deactivate feed retry. The instruction to activate/deactivate feed retry may be expressed, for example, as a command to the engine control unit 416. The countermeasure application unit 507 sets the countermeasure content received by the countermeasure receiving unit 506 in the feed control unit 501.

The CPU 80 of the server control unit 401 implements various functions by executing a program 530 stored in the storage device 86. State analysis rules 535 stored in the storage device 86 will be described in a fifth embodiment. The server control unit 401 includes the first analyzing unit 521 for analyzing the operating state of the feed section 20. The first analyzing unit 521 divides the operation history 531 into a plurality of groups and finds a variance V among the feed times of the groups. For example, the first analyzing unit 521 groups a plurality of records based on a record indicating that the feed cassette 21 has been opened/closed. For example, a plurality of records obtained before the date/time at which the feed cassette 21 was opened/closed are classified into a single group. A plurality of records obtained after the date/time at which the feed cassette 21 was opened/closed are classified into another group. Additionally, a plurality of records obtained after a date/time on which the feed cassette 21 was opened/closed and then before a date/time on which the feed cassette 21 was opened/closed are classified into a single group. However, records having a feed time of −1 are excluded from the groups. The first analyzing unit 521 finds the variance V in the feed times for each group. For example, a variance Vi indicates the variance in an i-th group. However, if the number of records included in a group is less than a threshold X, the variance of that group is not calculated, and is taken as "unknown" or "not calculated".

The first analyzing unit 521 may determine whether the installation position of the trailing edge regulation plate 26 is appropriate based on the magnitude of the variance Vi. As illustrated in FIG. 24A, the variance Vi decreases when the installation position of the trailing edge regulation plate 26 is appropriate. As illustrated in FIG. 24B, the variance Vi increases when the installation position of the trailing edge regulation plate 26 is inappropriate. Accordingly, the first analyzing unit 521 can estimate the installation position of the trailing edge regulation plate 26 by comparing the variance Vi with a threshold Vth.

Furthermore, the first analyzing unit 521 finds a difference Di between variances Vi and Vi+1 of two adjacent groups. The difference Di indicates an amount of change in the feed state between before and after the feed cassette 21 is opened/closed. In other words, the difference Di indicates whether the feed state has changed due to a change in the installation position of the trailing edge regulation plate 26, made by the user after the feed cassette 21 has been opened/closed. For example, the opening/closing of the feed cassette 21 is detected after the user or a maintenance person has instructed the installation position of the trailing edge regulation plate 26 to be changed as the countermeasure content. The first analyzing unit 521 can determine whether the feed state has been improved based on the difference Di between the two groups obtained from the division based on the opening/closing date/time.

FIG. 27B illustrates position analysis rules 533 stored in the storage device 86. The first analyzing unit 521 can analyze the installation position of the trailing edge regulation plate 26 using the difference Di and the position analysis rules 533. If the difference Di is not calculated, the first analyzing unit 521 determines that the analysis result is "unknown". If the difference Di is greater than a lower limit threshold (e.g., −50) but is less than an upper limit threshold (e.g., +50), the first analyzing unit 521 determines that the analysis result is "no change". If the difference Di is at least the upper limit threshold (e.g., +50), the first analyzing unit 521 determines that the analysis result is "installation position inappropriate". In other words, when the variance Vi+1 from after the feed cassette 21 was opened/closed is much higher than the variance Vi from before the feed cassette 21 was opened/closed, it is highly likely that the installation position of the trailing edge regulation plate 26 has been changed to an inappropriate position. If the difference Di is no greater than the lower limit threshold (e.g., −50), the first analyzing unit 521 determines that the analysis result is "improved". When the variance Vi+1 from after the feed cassette 21 was opened/closed is much lower than the variance Vi from before the feed cassette 21 was opened/closed, it is highly likely that the installation position of the trailing edge regulation plate 26 has been modified to an appropriate position.

The server control unit 401 further includes the second analyzing unit 522. The second analyzing unit 522 analyzes a countermeasure history 532 stored in the storage device 86. FIG. 28A is a diagram illustrating an example of the countermeasure history 532. The countermeasure history 532 includes the countermeasure content determined by the countermeasure determination unit 523, the notification destination of the countermeasure content, and the date/time when the countermeasure content was transmitted. The second analyzing unit 522 refers to the countermeasure history 532, analyzes the number of times the same countermeasure content has been communicated to the same notification destination (a notification number), and outputs an analysis result (the notification number) to the countermeasure determination unit 523. Note that the countermeasure history 532 may be cleared when the analysis result for the installation position of the trailing edge regulation plate 26 is determined to be "improved" by the first analyzing unit 521 or the second analyzing unit 522.

The countermeasure determination unit 523 determines the countermeasure content and the notification destination of the countermeasure content based on a combination of the analysis result from the first analyzing unit 521 and the analysis result from the second analyzing unit 522. The countermeasure determination unit 523 determines the countermeasure content and the notification destination of the countermeasure content by referring to countermeasure rules 534 stored in the storage device 86, for example.

FIG. 28B illustrates an example of the countermeasure rules 534. The countermeasure content in the present embodiment is displaying a message in the display of the operation unit 412 of the printer 100 or in the display of the operation unit 89 of the monitoring tool 460. Accordingly, a display command is transmitted to the notification destination. The basic policy is to transmit a command for displaying a predetermined message when the installation position of the trailing edge regulation plate 26 is estimated to be inappropriate due to the opening/closing of the feed cassette 21. The predetermined message includes prompting the user of the printer 100 to modify the installation position of the trailing edge regulation plate 26. Even if a message is displayed in the operation unit 412 of the printer 100, the user may not be able to correctly modify the installation position of the trailing edge regulation plate 26. In this case, it is highly likely that the problem will not improve even if the server apparatus 400 repeatedly transmits the message. If the problem does not improve even if the number of notifications to the user exceeds a threshold number, the countermeasure determination unit 523 changes the notification destination. For example, the countermeasure determination unit 523 changes the notification destination from the printer 100 to the monitoring tool 460 of the dealer than manages the printer 100. In general, a problem with the installation position of the trailing edge regulation plate 26 is a problem that can be solved easily by the user of the printer 100. As such, basically, the dealer is not notified. This has the effect of reducing unnecessary service costs. If the user continues to be unable to modify the installation position of the trailing edge regulation plate 26, the server apparatus 400 makes a notification to the dealer. Upon receiving the notification, the dealer can visit the user's location, confirm the status of the printer 100, and show the user how to modify the installation position of the trailing edge regulation plate 26. Alternatively, the dealer can contact the user by telephone or email and tell the user how to modify the installation position of the trailing edge regulation plate 26. This reduces the occurrences of jams, which are disadvantageous to the user.

As illustrated in FIG. 28B, according to the countermeasure rules 534, the countermeasure content is determined to be "none" and the notification destination is also determined to be "none" in cases where the analysis result of the feed time is unknown, and in cases where the analysis result is "no change" and the notification number N is 0.

The countermeasure content is determined to be "instruction to modify installation position of regulation plate", and the notification destination is determined to be "printer", in cases where the analysis result is "inappropriate" and the notification number N is 0. The countermeasure content is determined to be "instruction to modify installation position of regulation plate", and the notification destination is determined to be "printer", in cases where the analysis result is "no change" and the notification number N is at least 1 and less than 3. In other words, in this example, the maximum number of notifications to the printer 100 is 3. This upper limit number is merely an example.

The countermeasure content is determined to be "instruction to modify installation position of regulation plate", and the notification destination is determined to be "monitoring tool", in cases where the analysis result is "no change" and the notification number N is at least 3. Because the number of notifications to the printer 100 has become at least the upper limit number, the notification destination is changed.

In cases where the analysis result is "improved", the countermeasure content is "none", and the notification destination is also determined to be "none". The number of notifications is not taken into consideration when the analysis result is "improved".

FIG. 29A is a diagram illustrating an example of a message displayed in the printer 100. The message may include an indication that the installation position of the trailing edge regulation plate 26 is inappropriate, and a method of modifying the installation position.

FIG. 29B illustrates an example of a message displayed in the monitoring tool 460. The message can include a customer name, a customer address, a printer name, and an indication that the installation location of the trailing edge regulation plate 26 is inappropriate. The maintenance person from the dealer can be dispatched to the customer address, make contact with the customer, and the like according to this message.

In FIG. 26, if the notification destination is "printer", the countermeasure transmitting unit 524 of the server control unit 401 transmits the countermeasure content to the countermeasure receiving unit 506 of the engine control unit 416 via the communication processing unit 511 of the video controller 411. The countermeasure receiving unit 506 passes the received countermeasure content to the countermeasure application unit 507. The countermeasure application unit 507 sets the feed control unit 501, displays a maintenance message in the operation unit 412, and the like in accordance with the countermeasure content.

If the notification destination is "monitoring tool", the countermeasure transmitting unit 524 transmits the countermeasure content to the countermeasure receiving unit 561 of the monitoring tool 460. In the present embodiment, the countermeasure content may be communicated as a command to the notification destination. The monitoring tool 460 includes the countermeasure receiving unit 561, the countermeasure application unit 562, and the display processing unit 563. The countermeasure receiving unit 561 receives the countermeasure content transmitted from the countermeasure transmitting unit 524 of the server control unit 401. The countermeasure content is displaying, in the monitoring tool 460, an instruction to the dealer, such as "modify installation position of trailing edge regulation plate 26". The countermeasure receiving unit 561 passes the countermeasure content to the countermeasure application unit 562. The countermeasure application unit 562 displays "modify installation position of trailing edge regulation plate 26" or the like in the operation unit 89 through the display processing unit 563.

Flowcharts

Figure 30:
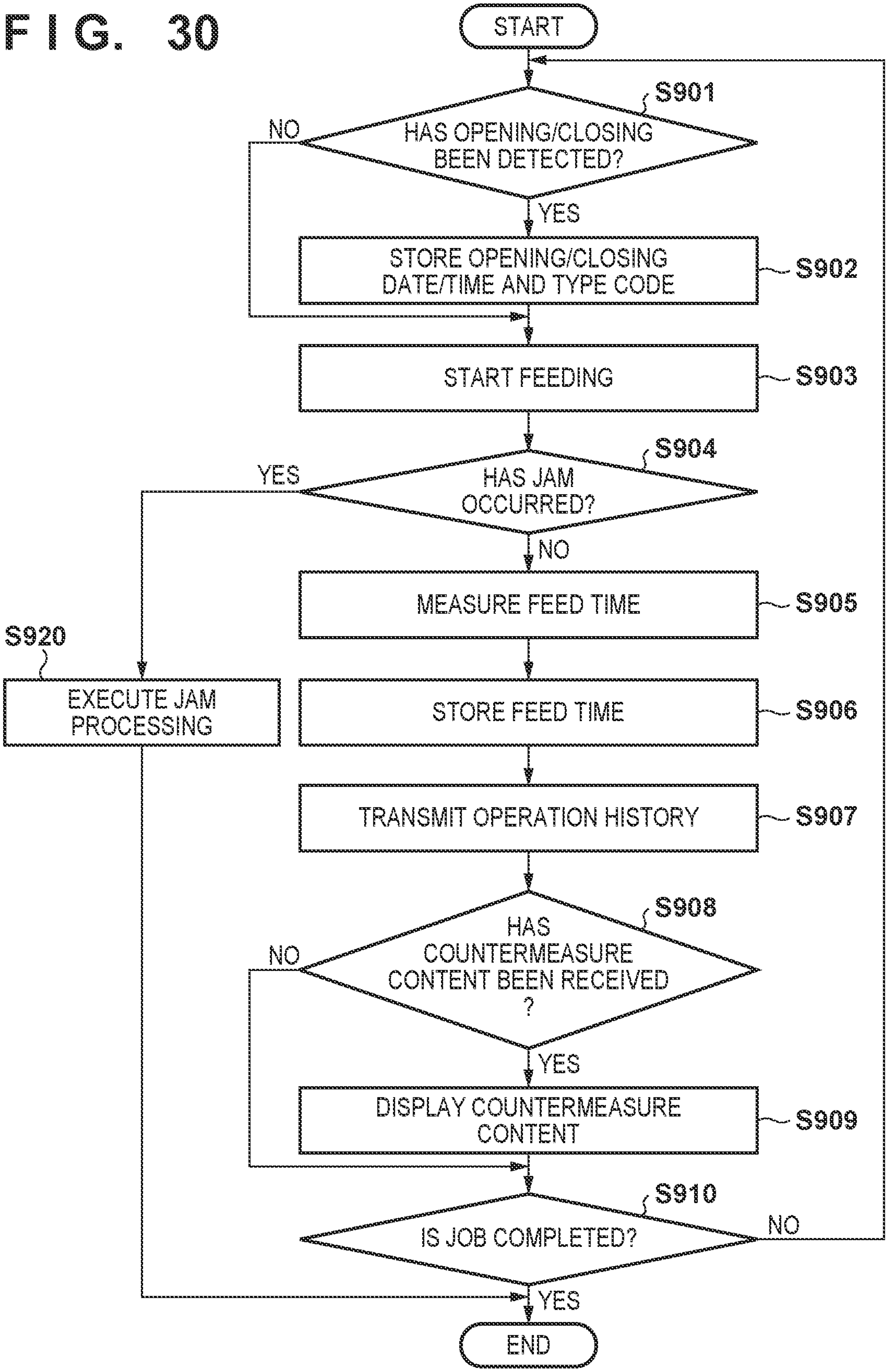
FIG. 30 is a flowchart illustrating a method for controlling a printer.

FIG. 30 is a flowchart illustrating a sequence of processing executed by the printer 100. This processing is started using the printer engine 413 receiving a print instruction as a trigger.

In step S901, the CPU 80 (the detection unit 504) determines whether the opening/closing of the feed cassette 21 has been detected by the cassette sensor 27*b* based on the detection result of the cassette sensor 27*b*. If no opening/closing of the feed cassette 21 is detected, the CPU 80 skips step S902 and moves the sequence to step S903. If opening/closing of the feed cassette 21 is detected, the CPU 80 moves the sequence to step S902.

In step S902, the CPU 80 (the detection unit 504 or the collection unit 505) stores, in the storage device 81, the open/close date/time and the type code for which the opening/closing of the feed cassette 21 has been detected. The storage device 81 records a record, including the opening/closing date/time and the type code, in the operation history 531.

In step S903, the CPU 80 (the feed control unit 501) starts feeding a sheet S. The feed control unit 501 rotates the motor 90 through the drive control unit 502 and drives the solenoid 91. The feeding of the sheet S is started as a result. Meanwhile, the feed control unit 501 instructs the measurement unit 503 to start measuring the elapsed time (the feed time). The measurement unit 503 measures the elapsed time using the timer 82.

In step S904, the CPU 80 (the feed control unit 501) determines whether the jam of the sheets S has occurred based on the elapsed time and the detection result from the sheet sensor 27*a*. For example, when the sheet sensor 27*a* detects the leading edge of the sheet S before the elapsed time reaches a threshold time, the feed control unit 501 determines that a jam has not occurred. In this case, the CPU 80 moves the sequence to step S905. On the other hand, if the leading edge of the sheet S cannot be detected by the sheet sensor 27*a* by the time the elapsed time reaches the threshold time, the feed control unit 501 determines that a jam has occurred. In this case, the CPU 80 moves the sequence to step S920. In step S920, the CPU 80 (the feed control unit 501) executes jam processing. For example, the feed control unit 501 stops the motor 90, creates a record in the operation history by substituting the current time for the feed date/time, substituting 0 for a feed type, and substituting −1 for the feed time, and transmits the record of the operation history 531 to the server apparatus 400.

In step S905, the CPU 80 (the measurement unit 503) measures the feed time. The measurement unit 503 sets the time that has passed from the timing at which the feed operation was started to the timing at which the leading edge of the sheet S was detected by the sheet sensor 27*a* as the feed time.

In step S906, the CPU 80 (the measurement unit 503) stores the feed date/time, the type code (=0), and the feed time in the storage device 81.

In step S907, the CPU 80 (the collection unit 505) reads out the feed date/time, the type code, and the feed time from the storage device 81, creates the operation history 531, and notifies the server apparatus 400. The identification information of the printer 100 may be appended to the operation history 531.

In step S908, the CPU 80 (the countermeasure receiving unit 506) determines whether countermeasure content has been received from the server apparatus 400. If no countermeasure content has been received, the CPU 80 moves the sequence to step S910. If countermeasure content has been received, the CPU 80 moves the sequence to step S909.

In step S909, the CPU 80 (the countermeasure application unit 507) displays the countermeasure content in the operation unit 412.

In step S910, the CPU 80 (the feed control unit 501) determines, based on the print instruction, whether a next page which needs to be printed remains. If no next page remains, the CPU 80 ends the print job. If a next page remains, the CPU 80 moves the sequence to step S901.

Figure 31:
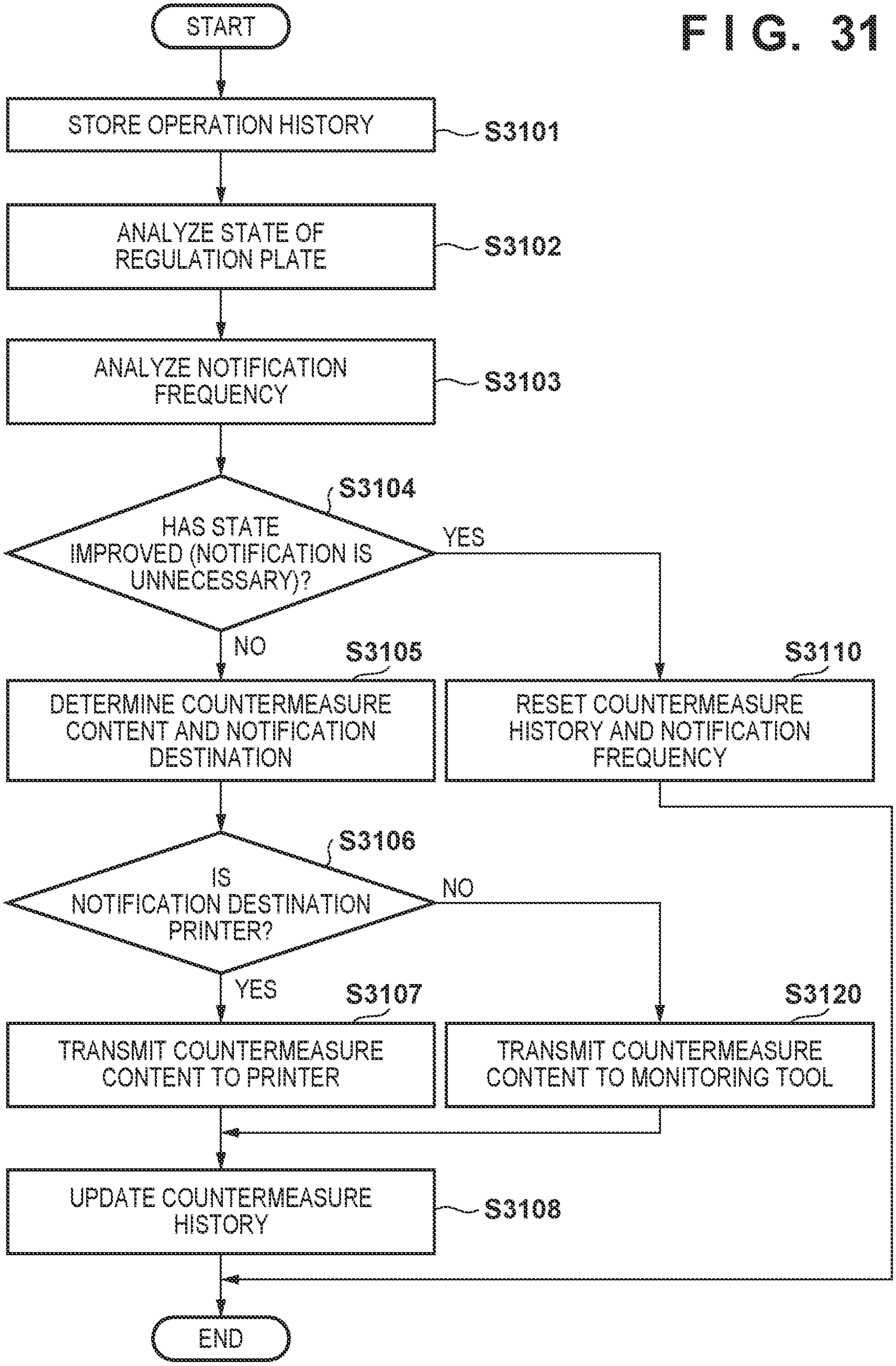
FIG. 31 is a flowchart illustrating a method for controlling a server apparatus.

FIG. 31 is a flowchart illustrating a sequence of processing executed by the server apparatus 400.

In step S1001, the CPU 85 (the first analyzing unit 521) stores the operation history 531 in the storage device 86.

In step S1002, the CPU 85 (the first analyzing unit 521) analyzes the state of the trailing edge regulation plate 26 (the installation position of the trailing edge regulation plate 26) based on the operation history 531 collected from the printer 100. For example, the first analyzing unit 521 finds a record in which the type code is set to "1" based on the operation history 531, and forms groups of a plurality of records using the record which has been found as a boundary. For example, an i-th group and an i+1th group are formed. Furthermore, the first analyzing unit 521 calculates the variances Vi and Vi+1, further calculates the difference Di, and classifies the state of the trailing edge regulation plate 26 based on the difference Di. At this time, the state (analysis result) of the trailing edge regulation plate 26 is determined from the difference Di by referring to the position analysis rules 533.

In step S1003, the CPU 85 (the second analyzing unit 522) analyzes the notification number N based on the countermeasure history 532. The second analyzing unit 522 refers to the countermeasure history 532, and counts the number of times the same countermeasure content has been communicated to the same notification destination (the notification number N).

In step S1004, the CPU 85 (the countermeasure determination unit 523) refers to the countermeasure rules 534 based on the analysis result from the first analyzing unit 521 and the analysis result from the second analyzing unit 522, and determines whether the installation position of the trailing edge regulation plate 26 has improved. In other words, the countermeasure determination unit 523 determines whether a notification is unnecessary. If the installation position of the trailing edge regulation plate 26 has improved, or if the installation position of the trailing edge regulation plate 26 was already appropriate, the CPU 85 moves the sequence to step S1010. In step S1010, the CPU 85 (the second analyzing unit 522) resets (clears) the countermeasure history 532 and the notification number N. If the installation position of the trailing edge regulation plate 26 has not improved, or if the installation position of the trailing edge regulation plate 26 was already inappropriate, the CPU 85 moves the sequence to step S1005.

In step S1005, the CPU 85 (the countermeasure determination unit 523) determines the countermeasure content and the notification destination by referring to the countermeasure rules 534 based on the analysis result from the first analyzing unit 521 and the analysis result from the second analyzing unit 522. The countermeasure determination unit 523 may determine the countermeasure content and the notification destination by referring to the countermeasure rules 534 (the determination table) stored in the storage device 86, such as that illustrated in FIG. 28B.

In step S1006, the CPU 85 (the countermeasure transmitting unit 524) determines whether the notification destination is the printer 100. If the notification destination is the printer 100, the CPU 85 moves the sequence to step S1007. If the notification destination is the monitoring tool 460 (the client apparatus 450), the CPU 85 moves the sequence to step S1020.

In step S1007, the CPU 85 (the countermeasure transmitting unit 524) transmits the countermeasure content to the printer 100. The network address of the printer 100 may be obtained from the operation history 531. The countermeasure content may be transmitted as a command to "display instruction to open/close feed cassette" or a command to "display instruction to confirm installation position of trailing edge regulation plate", for example.

In step S1020, the CPU 85 (the countermeasure transmitting unit 524) transmits the countermeasure content to the monitoring tool 460 (the client apparatus 450). The countermeasure content may be transmitted as a command to "display instruction to open/close feed cassette" or a command to "display instruction to confirm installation position of trailing edge regulation plate", for example. Note that the network address of the monitoring tool 460 (the client apparatus 450) is stored in the storage device 86 in advance. Additionally, the network address of the monitoring tool 460 (the client apparatus 450) may be associated with the identification information of the printer 100. Through this, the CPU 85 may identify the network address of the monitoring tool 460 (the client apparatus 450) based on the identification information of the printer 100.

In step S1008, the CPU 85 (the countermeasure transmitting unit 524) updates the countermeasure history 532. The countermeasure transmitting unit 524 generates a record including the countermeasure content determined in step S1005, the notification destination, and the countermeasure content transmission date/time, and adds the record to the countermeasure history 532.

Figure 32:
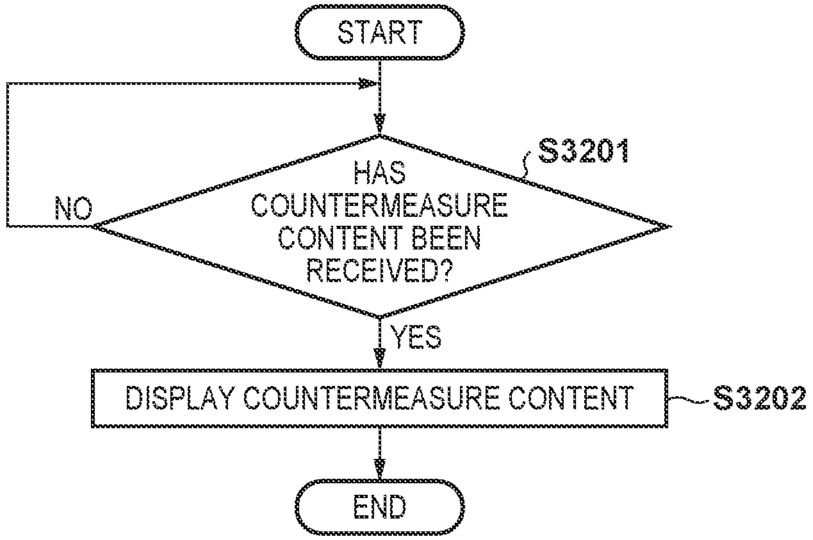
FIG. 32 is a flowchart illustrating a control method executed by a client apparatus.

FIG. 32 illustrates a sequence of processing executed by the monitoring tool 460 (the client apparatus 450).

In step S1101, the CPU 87 (the countermeasure receiving unit 561) determines whether countermeasure content has been received from the server apparatus 400. When the countermeasure content is received, the CPU 87 moves the sequence to step S1102.

In step S1102, the CPU 85 (the countermeasure application unit 562) displays the countermeasure content for the monitoring tool 460 (the client apparatus 450) in the operation unit 89.

According to the fourth embodiment, the countermeasure content and the notification destination are determined in accordance with the feed state (operation history 531) of the printer 100 and the number of notifications of messages. This reduces service costs for the dealer. Note that the invention is not limited to the present embodiment. Although the present embodiment illustrates a single feed section 20, a plurality of feed sections 20 may be present.

In the present embodiment, the countermeasure content and the notification destination are determined based on the analysis result for the operation history 531 of the feed section 20 and the analysis result for the countermeasure history (e.g., the number of notifications). However, this is also merely one example. The fixing apparatus 30 or the intermediate transfer member 11 may be the subject of the analysis. For example, a sheet sensor may be disposed downstream from the fixing apparatus 30, and the feed time may be obtained based on a detection result from that sheet sensor. The server apparatus 400 may determine the countermeasure content and the notification destination based on the feed time for the fixing apparatus 30 and the number of notifications. Similarly, a sheet sensor may be disposed downstream from the secondary transfer roller 14, and the feed time may be obtained based on a detection result from that sheet sensor. The server apparatus 400 may determine the countermeasure content and the notification destination based on the feed time for the intermediate transfer member 11 and the number of notifications. In this manner, the fixing apparatus 30 and the secondary transfer roller 14 are also examples of components involved in transporting the sheets S, and the descriptions pertaining to the feed roller 22 in the fourth and fifth embodiments can be replaced with the descriptions of the fixing apparatus 30 and the secondary transfer roller 14.

Furthermore, the countermeasure content and the notification destination are not limited to those described in the present embodiment. The printer user may be selected as the notification destination. Upon receiving the countermeasure content for the user, the CPU 80 of the printer 100 may display the countermeasure content in a display apparatus of the user's host computer (e.g., a printer driver settings screen or a pop-up screen).

Fifth Embodiment

In the present embodiment, the countermeasure determination unit 523 determines the countermeasure content and the notification destination based on the analysis result for the feed state from the first analyzing unit 521 and an analysis result pertaining to the replacement of a component (e.g., the feed roller 22) from the second analyzing unit 522. Matters already described in the fourth embodiment will be given the same reference signs, and will not be described again.

Figure 33:
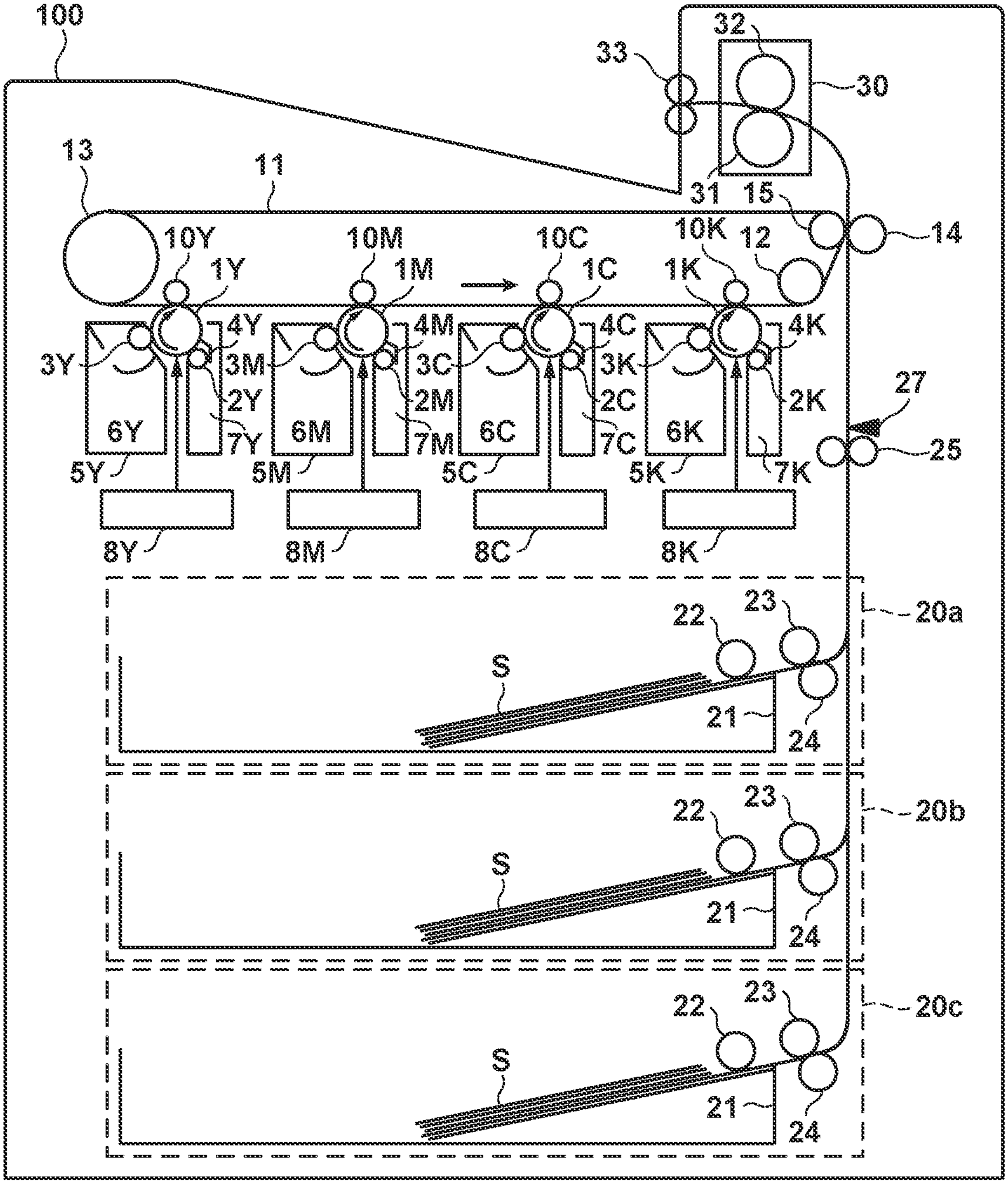
FIG. 33 is a diagram illustrating an image forming apparatus.

FIG. 33 illustrates another example of the printer 100. The printer 100 includes three feed sections 20_a_, 20_b_, and 20_c_. The user selects one feed section 20 from the three feed sections 20_a_, 20_b_, and 20_c_ through the operation unit 412. The configurations of the feed sections 20_a_, 20_b_, and 20_c_ are the same as those described in the fourth embodiment. Note that when items common to the feed sections 20_a_, 20_b_, and 20_c_ are described, the feed sections 20_a_, 20_b_, and 20_c_ may simply be denoted as "the feed section 20".

FIGS. 3A and 3B illustrate a plurality of feed times when the feed operation is repeatedly executed. Specifically, FIG. 3A illustrates the feed time from the first sheet to the 2,000th sheet when the feed operation is executed for 400,000 sheets. FIG. 3B illustrates the feed time from the 398,001th sheet to the 400,000th sheet. When the feed operation is repeated, sudden delays arise in the sheets S, which produces increased variation in the feed times. The feed roller 22 gradually wears out as the feed operation is repeated. As a result, the friction acting between the feed roller 22 and the sheet S decreases at locations on the circumferential surface of the feed roller 22 that are more worn. This leads to variations in the feed time.

Additionally, when a worn feed roller 22 is replaced with a new feed roller 22, the variation in the feed times decreases. As such, if records of the worn feed roller 22 and records of the new feed roller 22 are distinguished from each other in the operation history 531, the accuracy of determining the feed state based on the feed time will be improved, and the accuracy of determining the countermeasure content and the notification destination will also be improved.

FIG. 34A illustrates the operation history 531 according to the fifth embodiment, collected by the engine control unit 416. “2” has been added as a type code. The date/time data of a record for which a type code of “2” is set indicates the date/time at which the component sensor 27*c* detected that a component (e.g., the feed roller 22) has been replaced. When the component sensor 27*c* is a sensor that detects that the feed roller 22 has been replaced with a new one, the date/time data of the record in which the type code is set to “2” indicates the date/time when the component sensor 27*c* detected that the feed roller 22 was replaced with a new one. Accordingly, the server control unit 401 confirms that the feed roller 22 has been replaced when a record for which the type code is set to “2” is found in the operation history 531.

The first analyzing unit 521 analyzes the state of the feed roller 22 (the feed state) by excluding records indicating the occurrence of a jam from the operation history 531. For example, the first analyzing unit 521 finds the variance V for N feed times received from the collection unit 505. Here, of the plurality of feed times, −1 is a unique value indicating the occurrence of a jam, and is therefore not used to calculate the variance V. Additionally, the N feed times are the feed times for the N most recent sheets of the sheets S, excluding the sheet S that caused the jam. For example, N=1000. When the number of collected feed times is less than 1000, the first analyzing unit 521 does not calculate the variance V, and thus the variance V remains uncalculated. Furthermore, the first analyzing unit 521 may classify the current performance or wear state of the feed section 20 based on the variance V.

FIG. 34B illustrates an example of the state analysis rules 535. If the number of samples of feed times is low, the first analyzing unit 521 determines that the variance V is “not calculated”. If the variance V is not calculated, the first analyzing unit 521 determines that the analysis result is “unknown”. If the variance V is less than a first threshold (e.g., 240), the first analyzing unit 521 determines the analysis result to be “good”. If the variance V is at least the first threshold (e.g., 240) but less than a second threshold (e.g., 280), the first analyzing unit 521 determines the analysis result to be “normal”. If the variance V is at least the second threshold, the first analyzing unit 521 determines the analysis result to be “not good”. The analysis result being “not good” means that the feed roller 22 has little or no lifespan remaining. In other words, this is a feed state in which it is recommended that the feed roller 22 be replaced.

FIG. 35A illustrates an example of the countermeasure history 532 analyzed by the second analyzing unit 522. Here, “instruction to replace roller” and “instruction to change feed section” are given as examples of the countermeasure content. “Instruction to replace roller” means instructing the dealer to replace the feed roller 22. “Instruction to change feed section” means instructing the dealer to change the feed port from the feed section 20 currently in use to another feed section 20 among the feed sections 20*a*, 20*b*, and 20*c*. The second analyzing unit 522 analyzes the countermeasure history 532 and calculates the number of times the same countermeasure content has been transmitted to the same notification destination (the notification number N).

FIG. 35B illustrates the countermeasure rules 534 according to the fifth embodiment. If the analysis result from the first analyzing unit 521 is “unknown”, “good”, or “normal”, the countermeasure determination unit 523 sets the countermeasure content to “none” and the notification destination to “none” as well, regardless of the notification number N. If the analysis result from the first analyzing unit 521 is “not good” and the notification number N is less than a threshold (e.g., 3), the countermeasure determination unit 523 sets the countermeasure content to “instruction to replace roller” and sets the notification destination to “monitoring tool”. If the analysis result from the first analyzing unit 521 is “not good” and the notification number N is at least the threshold (e.g., 3), the countermeasure determination unit 523 sets the countermeasure content to “instruction to change feed section” and sets the notification destination to “monitoring tool”.

In this manner, if the state of the feed roller 22 is not good, a command for displaying a message instructing the feed roller 22 to be replaced is transmitted to the monitoring tool 460 of the dealer. FIG. 36A illustrates an example of the maintenance message. As illustrated in FIG. 36A, a message instructing the feed roller 22 to be replaced with a new one is included.

If the feed roller 22 is not replaced with a new one even after the server apparatus 400 has repeatedly transmitted the message, it is possible that the instruction to the dealer is not appropriate. Also, some dealers may wish to take countermeasures that involve lower service costs. In such a case, a maintenance message instructing the use of a feed section 20 different from the feed section 20 normally used, rather than instructing the feed roller 22 to be replaced with a new one, may be transmitted. FIG. 36B illustrates an example of the maintenance message. As illustrated in FIG. 36B, a message instructing the feed cassette 21 to be changed (switched) is included. The maintenance message may include a message reading “the state of the feed roller is not good, and using a different feed port is recommended”.

Flowcharts

Figure 37:
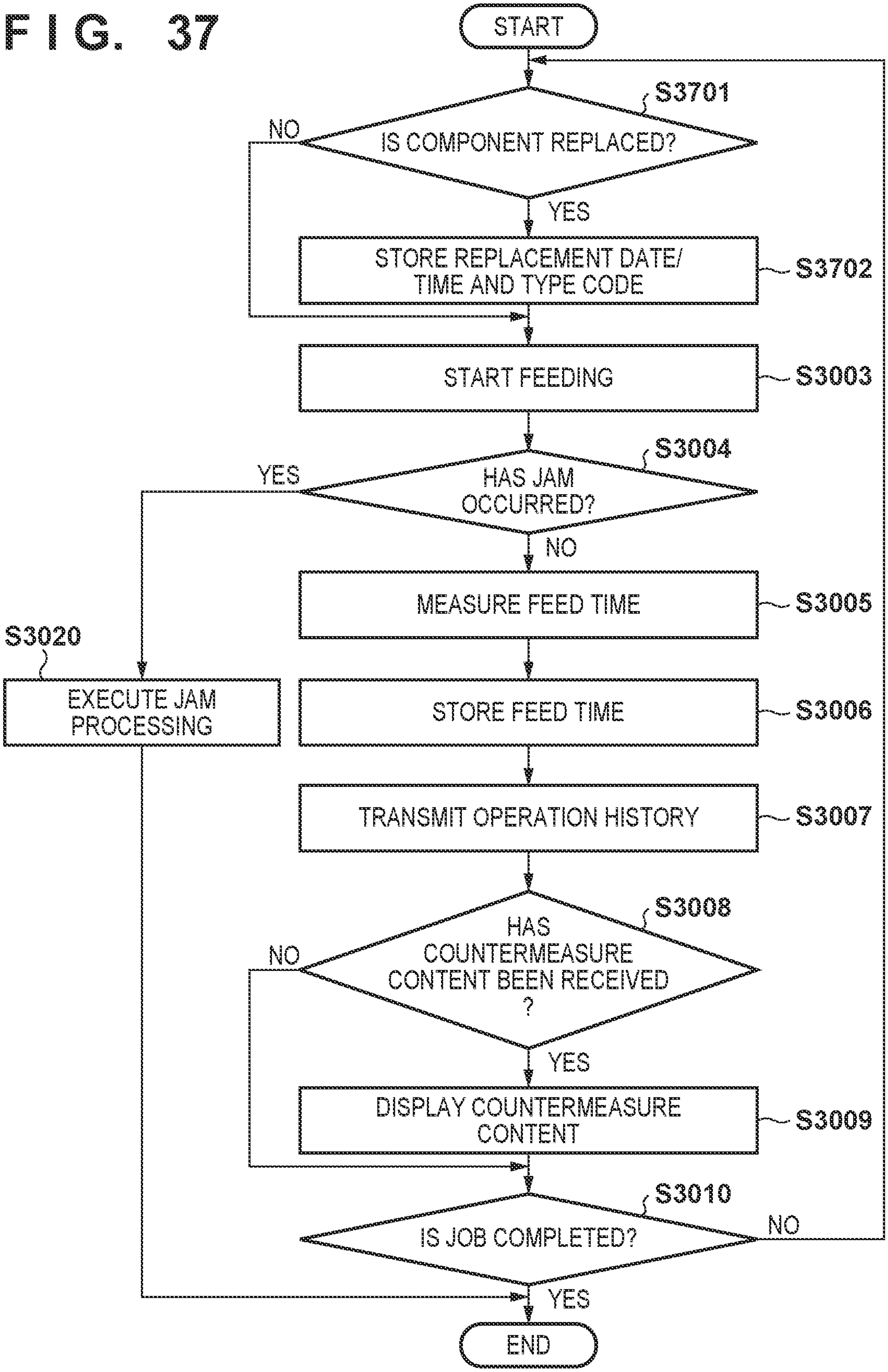
FIG. 37 is a flowchart illustrating a method for controlling a printer.

FIG. 37 is a flowchart illustrating a method executed by the printer 100. Comparing FIG. 37 with FIG. 30, steps S901 and S902 have been replaced with steps S1701 and S1702. The following will therefore describe steps S1701 and S1702 in detail.

In step S1701, the CPU 80 (the detection unit 504) determines whether a predetermined component (e.g., the feed roller 22) has been replaced based on the detection result from the component sensor 27*c*. For example, the detection unit 504 determines whether the feed roller 22 has been replaced with a new one based on the detection result from the component sensor 27*c*. If the predetermined component has been replaced, the CPU 80 moves the sequence to step S1702. If the predetermined component has not been replaced, the CPU 80 skips step S1702 and moves the sequence to step S903.

In step S1702, the CPU 80 (the detection unit 504 and the collection unit 505) stores a replacement date/time and the type code (=2) in the storage device 81. For example, the collection unit 505 obtains the replacement date/time from the timer 82, generates a record including the replacement date/time and the type code, and writes the record into the storage device 81 as the operation history 531. The operation history 531 is transmitted to the server apparatus 400 in step S907.

Figure 38:
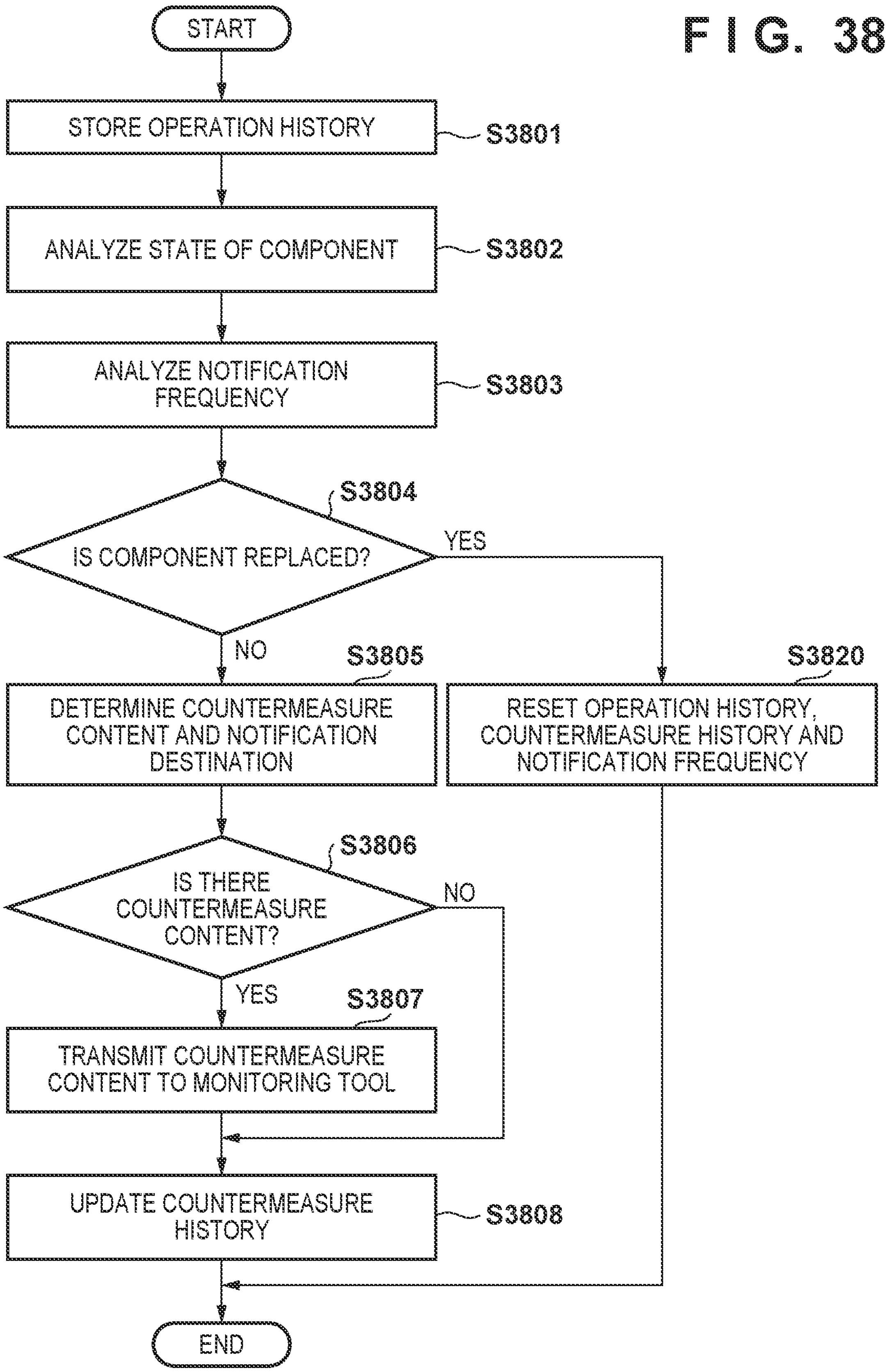
FIG. 38 is a flowchart illustrating a method for controlling a server apparatus.

FIG. 38 is a flowchart illustrating a method executed by the server apparatus 400.

In step S1801, the CPU 85 stores the operation history 531 received from the printer 100 in the storage device 86.

In step S1802, the CPU 85 (the first analyzing unit 521) analyzes the state of the component based on the operation history 531. For example, the first analyzing unit 521 obtains the variance V of the feed times in the operation history 531, and obtains the analysis result corresponding to the variance V from the state analysis rules 535.

In step S1803, the CPU 85 (the second analyzing unit 522) refers to the countermeasure history 532 and analyzes the notification number N. In other words, the number of times the same countermeasure content has been transmitted to the same notification destination is obtained.

In step S1804, the CPU 85 (the countermeasure determination unit 523) determines whether the component has been replaced based on the operation history 531. The countermeasure determination unit 523 determines whether the feed roller 22 has been replaced with a new one based on the type code in the operation history 531. If the component has been replaced, the CPU 85 moves the sequence to step S1820. In step S1820, the CPU 85 resets (clears) the operation history 531, the countermeasure history 532, and the notification number N. If the component has not been replaced, the CPU 85 moves the sequence to step S1805.

In step S1805, the CPU 85 (the countermeasure determination unit 523) determines the countermeasure content and the notification destination based on the analysis result from the first analyzing unit 521 and the analysis result from the second analyzing unit 522. The countermeasure determination unit 523 refers to the countermeasure rules 534, and determines the combination of the countermeasure content and the notification destination corresponding to the combination of the analysis result for the feed state and the notification number N.

In step S1806, the CPU 85 (the countermeasure transmitting unit 524) determines whether countermeasure content is present. If countermeasure content is present, the CPU 85 moves the sequence to step S1807. If the countermeasure content is "none", the CPU 85 skips step S1807 and moves the sequence to step S1808.

In step S1807, the CPU 85 (the countermeasure transmitting unit 524) transmits the countermeasure content to the monitoring tool 460, which is the notification destination. The method for transmitting the countermeasure content is as described in step S1020.

In step S1808, the CPU 85 (the countermeasure transmitting unit 524) updates the countermeasure history 532. The countermeasure transmitting unit 524 generates a record including the countermeasure content determined in step S1005, the notification destination, and the countermeasure content transmission date/time, and adds the record to the countermeasure history 532.

Figure 39:
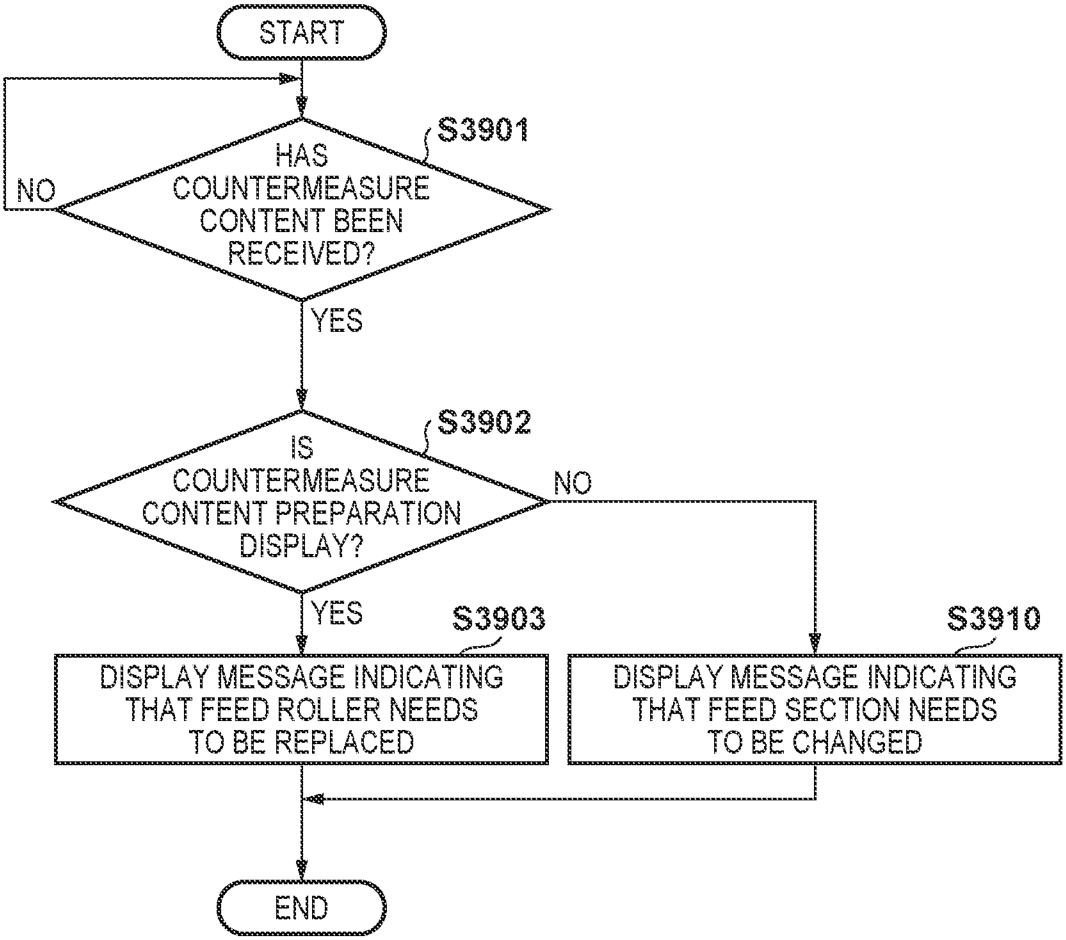
FIG. 39 is a flowchart illustrating a method for controlling a client apparatus.

FIG. 39 is a flowchart illustrating a method executed by the client apparatus (the monitoring tool 460). The CPU 87 executes the following method according to a program stored in the storage device 88.

In step S1901, the CPU 87 determines whether countermeasure content has been received from the server apparatus 400. In step S1902, the CPU 87 determines whether the countermeasure content is a component replacement. For example, when a command to display a message instructing the feed roller 22 to be replaced is received, the CPU 87 moves the sequence to step S1903. In step S1903, the CPU 87 displays, in the operation unit 89, a message indicating that it is necessary to replace the feed roller 22. For example, when a command to display a message instructing the feed section 20 to be changed is received, the CPU 87 moves the sequence to step S1910. In step S1910, the CPU 87 displays, in the operation unit 89, a message indicating that it is necessary to change the feed section 20.

According to the present embodiment, the countermeasure content and the notification destination are determined based on the state of the component and the number of notifications made for the countermeasure content. In particular, the state of the component may not change even after the same countermeasure content is repeatedly communicated to the dealer more than a predetermined number of times. In this case, the countermeasure content for the dealer is changed. For example, even if a message prompting the dealer to replace the feed roller 22 with a new one is repeatedly transmitted, there are situations where the feed roller 22 is not replaced with a new one. In this case, the countermeasure content may be set to changing the feed section 20. In this manner, the countermeasure content may be determined again according to the status of the execution of the countermeasure content on the dealer side. This makes it possible to appropriately execute the countermeasure content which can be executed by the dealer. As a result, there is an advantage to the user in that the occurrence of jams is reduced.

In the present embodiment, the feed time of the feed roller 22 is taken into account as the state of the component, but this is merely one example. For example, the number of occurrences of a jam may be taken into account as the state of the component. In other words, the first analyzing unit 521 may classify the analysis result as "good", "normal", or "not good" in accordance with the number of occurrences of a jam reported as the operation history 531. Alternatively, the first analyzing unit 521 may classify the result of the analysis as "good", "normal", or "not good" in accordance with a combination of the number of occurrences of a jam reported as the operation history 531 and the variance V in the feed times.

In the fifth embodiment, only the monitoring tool 460 is the notification destination of the countermeasure content, but this is merely one example. The printer 100 may also be notified of the same countermeasure content.

The printer 100 may have a first feed mode in which a retry of the feeding of the sheet S is executed, and a second feed mode in which a retry of the feeding of the sheet is not executed. In this case, a change from the second feed mode to the first feed mode may be set as the countermeasure content, instead of changing the feed port.

The printer 100 may have a feed mode that, when the feeding of the sheet S fails, executes a retry of the feeding of the sheet S, and when the number of failed retries reaches a threshold number, stops retrying the feeding of the sheet S. In this case, the countermeasure content when the notification number N reaches at least 3 may be increasing the threshold number.

Although there is only one server apparatus 400 in the first to fifth embodiments, this is merely one example. The processing of the server apparatus 400 may be performed by a plurality of server apparatuses.

Technical Spirit Derived from Embodiments

As illustrated in FIG. 25, the present embodiment provides an image forming system including the printer 100 and the like. According to the present embodiment, at least one of the countermeasure content and the notification destination of the countermeasure content is maintained or changed according to the analysis result of the number of notifications made for the countermeasure content. Through this, at least one of the countermeasure content pertaining to maintenance and the notification destination in the countermeasure is optimized.

The number of notifications made for the same countermeasure content to the same notification destination may be managed by holding a countermeasure history. This makes it possible to accurately analyze the number of notifications.

When the number of notifications is low, the printer 100 may be selected as the notification destination. When the number of notifications is high, the monitoring tool 460 of the dealer may be selected as the notification destination. This makes it possible for the dealer to solve problems that cannot be solved by the user.

Notifications may be stopped immediately when the operating state improves.

Whether the installation position of the trailing edge regulation plate 26 is inappropriate can be estimated based on the feed time. As a result, a message indicating that the installation position of the trailing edge regulation plate 26 should be modified may be displayed in the printer 100 or the monitoring tool 460.

The feed time may be reported to the server apparatus 400 by the printer 100.

When the feed cassette 21 is inserted/removed, it is possible that the installation position of the trailing edge regulation plate 26 has been modified. Accordingly, dividing the operation history 531 based on the date/time at which the feed cassette 21 was inserted/removed makes it possible to accurately estimate whether the installation position of the trailing edge regulation plate 26 is appropriate.

If it is estimated that the installation position of the trailing edge regulation plate 26 has been optimized, notifications of the countermeasure content may be stopped.

Employing a type code having a very small amount of information makes it possible to distinguish between a record including the feed time and a record including the insertion/removal date/time. This makes it possible to simplify the operation history 531.

The client apparatus 450 (the monitoring tool 460) of the dealer may be selected as the notification destination. This makes it possible for the dealer to appropriately solve a problem that cannot be solved by the user.

As described in the fifth embodiment, the countermeasure content communicated to the notification destination based on the number of notifications made for first countermeasure content may be changed from the first countermeasure content (e.g., replacing the feed roller 22) to second countermeasure content (e.g., changing the feed section or activating feed retries). As a result, the countermeasure content is changed in accordance with the state of execution of the countermeasure content at the notification destination. For example, if the notification destination is the dealer, the countermeasure content can be changed according to the state of execution of the countermeasure content by the dealer.

If the component is replaced, the number of notifications is reset, and notifications for the countermeasure content are stopped. On the other hand, if the component is not replaced, the notifications for the countermeasure content are continued. This makes it possible to control the notifications for the countermeasure content according to whether the component has been replaced.

As described in the fifth embodiment, the countermeasure content may be changed while keeping the monitoring tool 460 as the notification destination. This makes it possible to transmit the appropriate countermeasure content, based on the number of notifications, to the appropriate notification destination.

As described in the fifth embodiment, the replacement of components is basically performed by the dealer. This makes it possible to keep the printer 100 in a good state.

As described in the fifth embodiment, for example, an instruction to replace the feed roller 22 may be made. As a result, a worn feed roller 22 will be replaced with a new feed roller 22.

An instruction to change the feed port may be made. Through this, the feed state is improved without changing the feed roller 22.

Switching between activating and deactivating retries makes it possible to temporarily reduce the number of occurrences of jams before replacing a worn feed roller 22.

The CPU 80 may have a feed mode in which the number of failed retries is counted and the number of failures as compared to a threshold number. In this case, using an increase in the threshold number as the countermeasure content makes it possible to temporarily reduce the number of occurrences of jams.

The replacement of the component may be detected by the component sensor 27*c* or the like. Through this, the replacement of components is detected accurately.

Although only one server apparatus 400 is included in the first to fifth embodiments, this is merely one example. The above-described processing by the server apparatus 400 may be distributed among and executed by a plurality of server apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-129000, filed Aug. 12, 2022 and Japanese Patent Application No. 2022-129001, filed Aug. 12, 2022 which are hereby incorporated by reference herein in their entirety.

What is claimed is:

1. An image forming system comprising:

an image forming apparatus; and one or more server computers capable of communicating with the image forming apparatus and a display different from the image forming apparatus, wherein the one or more server computers include a first processor configured to:

obtain data indicating a degree of wear of a predetermined component or a degree of a predetermined error of the image forming apparatus based on operation history of the image forming apparatus;

notify the image forming apparatus so that the image forming apparatus displays information about a countermeasure for wear of the predetermined component or information about a countermeasure for the predetermined error in case the data indicates a first value; and notify the display so that the display displays information about a countermeasure for wear of the predetermined component or information about a countermeasure for the predetermined error in case the data indicates a second value, wherein the second value indicates that the degree of the wear of the predetermined component is greater than the first value, or that the degree of the predetermined error is greater than the first value, wherein the one or more server computers obtain maintenance information indicating whether a maintenance person for the image forming apparatus can be dispatched, and wherein the one or more server computers notify the image forming apparatus so that the image forming apparatus displays information about a countermeasure for wear of the predetermined component or information about a countermeasure for the predetermined error in case the data indicates the second value and the maintenance information indicates that the maintenance person for the image forming apparatus cannot be dispatched.

2. The image forming system according to claim 1, wherein the predetermined error is a transport error for a sheet in the image forming apparatus.

3. The image forming system according to claim 1, wherein the image forming apparatus includes a feed roller, wherein the operation history includes an operation history for a feed roller, and wherein the data indicates a degree of wear of the feed roller.

4. The image forming system according to claim 3, wherein the one or more server computers notify the image forming apparatus so that the image forming apparatus displays information about a retry of feed operation by the feed roller and applies the retry of feed operation in case the data indicates the first value.

5. The image forming system according to claim 4, wherein the one or more server computers notify the display so that the display displays information about replacing the feed roller in case the data indicates a second value.

6. The image forming system according to claim 1, wherein the display is an information processing apparatus of a company that manages maintenance of the image forming apparatus or a company that sells the image forming apparatus.

7. The image forming system according to claim 1, wherein the one or more server computers are further configured to execute an operation of transmitting, to the display, an inquiry message for inquiring whether the maintenance person can be dispatched immediately, and an operation of receiving a response to the inquiry message from the display.

8. The image forming system according to claim 3, wherein the image forming apparatus includes a sheet sensor provided downstream from the feed roller in a transport direction of the sheet and configured to detect the sheet, wherein the operation history for a feed roller includes data based on the detection result of the sheet sensor.

9. The image forming system according to claim 8, wherein the image forming apparatus further includes a jam sensor that detects an occurrence of a jam based on the detection result of the sheet sensor, and the operation history includes information indicating whether or not the jam has occurred.

10. A server computer comprising:

a communication circuit configured to be capable of communicating with an image forming apparatus and a display different from the image forming apparatus; and a processor configured to:

obtain data indicating a degree of wear of a predetermined component or a degree of a predetermined error of the image forming apparatus based on operation history of the image forming apparatus;

notify the image forming apparatus so that the image forming apparatus displays information about a countermeasure for wear of the predetermined component or information about a countermeasure for the predetermined error in case the data indicates a first value; and notify the display so that the display displays information about a countermeasure for wear of the predetermined component or information about a countermeasure for the predetermined error in case the data indicates a second value, wherein the second value indicates that the degree of the wear of the predetermined component is greater than the first value, or that the degree of the predetermined error is greater than the first value, wherein the processor is further configured to obtain maintenance information indicating whether a maintenance person for the image forming apparatus can be dispatched, and wherein the processor is further configured to notify the image forming apparatus so that the image forming apparatus displays information about a countermeasure for wear of the predetermined component or information about a countermeasure for the predetermined error in case the data indicates the second value and the maintenance information indicates that the maintenance person for the image forming apparatus cannot be dispatched.

11. An image forming system comprising:

an image forming apparatus; and one or more server computers capable of communicating with the image forming apparatus and a display different from the image forming apparatus, wherein the one or more server computers include a first processor configured to:

obtain operating history of the image forming apparatus; and notify one of the image forming apparatus and the display so that the one of the image forming apparatus and the display displays information about a countermeasure, wherein the one of the image forming apparatus and the display includes a second processor configured to display the information about the countermeasure, wherein the first processor is further configured to notify the other of the image forming apparatus and the display so that the other of the image forming apparatus and the display displays information about a countermeasure in case a processing about the information about a countermeasure is not performed after the one of the image forming apparatus and the display displays the information about a countermeasure.

12. The image forming system according to claim 11, wherein the first processor is further configured to notify the other of the image forming apparatus and the display so that the other of the image forming apparatus and the display displays information about a countermeasure in case a number of notifications to the one of the image forming apparatus and the display reaches or exceeds a predetermined threshold and the processing about the information about a countermeasure is not performed.

13. The image forming system according to claim 11, wherein the image forming apparatus includes a holding unit that holds a sheet and a regulation plate that regulates a position of the sheet held in the holding unit, and wherein the first processor notifies the image forming apparatus so that the image forming apparatus displays information about modifying a position of the regulation plate.

14. The image forming system according to claim 13, wherein the operation history includes history information of a measurement result from measuring a transport time required to transport the sheet along a transport path.

15. The image forming system according to claim 11, wherein the display is an information processing apparatus of a company that manages maintenance of the image forming apparatus or a company that sells the image forming apparatus.

16. A server computer comprising:

a communication circuit capable of communicating with an image forming apparatus and a display different from the image forming apparatus; and a first processor that controls the communication circuit, wherein the first processor is configured to:

obtain operation history of the image forming apparatus; and notify one of the image forming apparatus and the display so that the one of the image forming apparatus and the display displays information about a countermeasure, wherein the one of the image forming apparatus and the display includes a second processor configured to display the information about a countermeasure, and wherein the first processor is further configured to notify the other of the image forming apparatus and the display so that the other of the image forming apparatus and the display displays information about a countermeasure in case a processing about the information about a countermeasure is not performed after the one of the image forming apparatus and the display displays the information about a countermeasure.

* * * * *